United States Patent
Kurita et al.

(10) Patent No.: US 7,493,635 B2
(45) Date of Patent: Feb. 17, 2009

(54) RECORDING MEDIUM DRIVE DEVICE, ELECTRONIC EQUIPMENT HAVING THE RECORDING MEDIUM DRIVE DEVICE, AND RECORDING MEDIUM CARTRIDGE

(75) Inventors: Kazuhito Kurita, Kanagawa (JP); Mikinori Matsuda, Kanagawa (JP); Takahiro Yamada, Saitama (JP)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 10/550,562

(22) PCT Filed: Feb. 14, 2005

(86) PCT No.: PCT/JP2005/002137

§ 371 (c)(1),
(2), (4) Date: Sep. 26, 2005

(87) PCT Pub. No.: WO2005/078719

PCT Pub. Date: Aug. 25, 2005

(65) Prior Publication Data

US 2006/0179449 A1    Aug. 10, 2006

(30) Foreign Application Priority Data

Feb. 18, 2004  (JP)  ............. 2004-041144
May 10, 2004  (JP)  ............. 2004-140125

(51) Int. Cl.
*G11B 23/03* (2006.01)
(52) U.S. Cl. ............................. 720/738
(58) Field of Classification Search ............. 720/634; 360/99.01
See application file for complete search history.

(56) References Cited

U.S. PATENT DOCUMENTS 6,728,199 B2 *   4/2004   Obata et al. ............. 720/738

(Continued)

FOREIGN PATENT DOCUMENTS

JP            6-30969            4/1994

(Continued)

OTHER PUBLICATIONS

U.S. Appl. No. 10/550,562, filed Sep. 26, 2005, Kurita et al.

(Continued)

*Primary Examiner*—Mark Blouin
(74) *Attorney, Agent, or Firm*—Oblon, Spivak, McClelland, Maier & Neustadt, P.C.

(57) ABSTRACT

To prevent erroneous insertion of a recording medium cartridge into a holder in a recording medium drive device simply and without causing a sharp rise of price of the recording medium drive device.

A shutter opening piece (32*c*) for sliding a shutter (110) supported upon a case (101) of a recording medium cartridge (100) to open a light transparent hole (101*h*) is provided in a holder (8) in a recording medium drive device (6), when the recording medium cartridge (100) is normally inserted into the holder (8), the shutter (110) is slid by the shutter opening piece (32*c*) to open the light transparent hole (101*h*), and when the recording medium cartridge (100) is inserted into the holder (8) in an erroneous direction, the opening edge of a function expansion groove (104) of the case (10) contacts the shutter opening piece (32*c*) to prevent erroneous insertion of the recording medium cartridge (100) into the holder (8).

10 Claims, 40 Drawing Sheets

U.S. PATENT DOCUMENTS

| | | | |
|---|---|---|---|
| 7,057,854 B2 * | 6/2006 | Obata et al. | 360/133 |
| 7,103,902 B2 * | 9/2006 | Abe et al. | 720/743 |
| 7,114,166 B2 * | 9/2006 | Hashizume et al. | 720/738 |
| 7,143,427 B2 * | 11/2006 | Choi et al. | 720/741 |

FOREIGN PATENT DOCUMENTS

| | | |
|---|---|---|
| JP | 7-6493 | 1/1995 |
| JP | 2001-93215 | 4/2001 |
| JP | 2001-222872 | 8/2001 |
| JP | 2002-56601 | 2/2002 |
| JP | 2003-85929 | 3/2003 |
| JP | 2003-173649 | 6/2003 |

OTHER PUBLICATIONS

U.S. Appl. No. 10/565,778, filed Jan. 25, 2006, Kurita et al.

\* cited by examiner

RECORDING MEDIUM DRIVE DEVICE, ELECTRONIC EQUIPMENT HAVING THE RECORDING MEDIUM DRIVE DEVICE, AND RECORDING MEDIUM CARTRIDGE

TECHNICAL FIELD

The present invention relates to a recording medium cartridge in which a disk-shaped recording medium is rotatably accommodated, a recording medium drive device for recording information onto the disk-shaped recording medium accommodated in the recording medium cartridge or reading the information recorded on the recording medium, and an electronic apparatus provided with that recording medium drive device.

In more detail, the present invention relates to a recording medium cartridge and a recording medium drive device able to prevent erroneous insertion of the recording medium cartridge into a holder of the recording medium drive device simply and without causing a sharp rise of price. The present invention further relates to an electronic apparatus using such a recording medium cartridge and recording medium drive device.

BACKGROUND ART

There has known of a recording medium drive device for recording an information signal or reading the information or both of recording and reading information with respect to a recording medium in a disk cartridge rotatably accommodating a disk-shaped recording medium such as a magneto-optic disk or a magnetic disk.

Such a recording medium drive device is provided with a holder for holding the disk cartridge. When the disk cartridge is inserted into the holder, a shutter slidably supported on the case of the disk cartridge is opened. Information is recording on or information is read from the rotating recording medium via the opening.

In a recording medium drive device of a type where a disk cartridge is inserted into a holder, the disk cartridge must be inserted into the holder in the correct direction. For this reason, a unit for preventing erroneous insertion of the disk into the holder is provided.

As such a unit for preventing erroneous insertion in a recording medium drive device, for example Japanese Unexamined Patent Publication (Kokai) No. 8-96463 discloses the technique of providing an erroneous insertion prevention projection at one side of the holder opposite to the side where the shutter opening/closing mechanism is provided. In this recording medium drive device, for example, when the disk cartridge is inserted into the holder in the correct direction, the projection is inserted into an erroneous insertion prevention groove formed in one side of the case of the disk cartridge, so the disk cartridge can be inserted deep into the holder. If the disk cartridge is inserted into the holder in the erroneous direction, however, the side of the case where the groove is not formed is inserted facing the projection, therefore the projection strikes the case. This stops the insertion of the disk cartridge into the holder and thereby prevents erroneous insertion of the disk cartridge into the holder.

DISCLOSURE OF THE INVENTION

Problem to be Solved by the Invention

In a recording medium drive device using the above unit for preventing erroneous insertion, the projection is provided as a unit only for the prevention of erroneous insertion of the disk cartridge into the holder, so the manufacturing cost of the recording medium drive device becomes higher.

Accordingly, the price of an electronic apparatus using such a recording medium drive device becomes higher.

Means for Solving the Problem

An object of the present invention is to provide a recording medium drive device preventing erroneous insertion of a recording medium cartridge into a holder of a recording medium drive device simply and without causing a sharp rise of the price and a recording medium cartridge for the recording medium drive device.

Another object of the present invention is to provide an electronic apparatus able to use such a recording medium cartridge and recording medium drive device.

According to a first aspect of the present invention, there is provided a disk cartridge including: a disk; a case for accommodating the disk, and having an arc-shaped surface formed at an insertion direction side of a holder, and side surfaces continuing both ends of the arc-shaped surface and respectively formed as direct lines at the insertion direction; a light transparent aperture formed contiguous with one side surface of the side surface and input laser beam; an insertion groove formed between the arc-shaped surface and a portion at an ejection direction side than that of the light transparent aperture in the one side; and a function expansion groove formed between the arc-shaped surface and a continuous portion of the arc-shaped surface and another side surface.

Preferably, the disk cartridge further includes a shutter slidably mounted on the one side surface and opening or closing the light transparent aperture, when inserting it into the holder, a shutter opening piece formed on the holder is inserted into the insertion groove and the shutter opening piece is contacted with the shutter to thereby slide and move the shutter.

According to a second aspect of the present invention, there is provided a disk cartridge drive apparatus including: a holder inserted a disk cartridge therein and holding the same, the disk cartridge including: a disk, a case for accommodating the disk, and having an arc-shaped surface formed at an insertion direction side of a holder, and side surfaces continuing both ends of the arc-shaped surface and respectively formed as direct lines at the insertion direction, a light transparent aperture formed contiguous with one side surface of the side surface and input laser beam, an insertion groove formed between the arc-shaped surface and a portion at an ejection direction side than that of the light transparent aperture in the one side, and a function expansion groove formed between the arc-shaped surface and a continuous portion of the arc-shaped surface and another side surface; and a shutter opening piece provided at a position opposed to the side surface of the disk cartridge, in the holder. When the disk cartridge is inserted into the holder, if the shutter opening piece is inserted into the insertion groove, the shutter opening piece is moved to a portion of the ejection direction side of the insertion groove, and if the shutter opening piece is inserted into the function expansion groove, the shutter opening piece is contacted with an aperture edge of the function expansion groove formed at the continuous portion to thereby prevent the insertion of the disk cartridge into the holder.

Preferably, the disk cartridge drive apparatus further includes a posture holding piece provided at an insertion direction side than the shutter opening piece of the holder, for holding a posture of the disk cartridge in the holder when the posture holding piece is inserted into the insertion groove.

Preferably, the holder inserts a disk cartridge with a shutter, the disk cartridge having a disk, a case for accommodating the disk, and including an arc-shaped surface formed at an insertion direction side of a holder, and side surfaces continuing both ends of the arc-shaped surface and respectively formed as direct lines at the insertion direction, a light transparent aperture formed contiguous with one side surface of the side surface and input laser beam, a shutter slidably mounted on the one side surface and opening or closing the light transparent aperture, an insertion groove formed between the arc-shaped surface and a portion at an ejection direction side than that of the light transparent aperture in the one side, and a function expansion groove formed between the arc-shaped surface and a continuous portion of the arc-shaped surface and another side surface.

According to a third aspect of the present invention, there is provided a disk cartridge drive apparatus including: a holder inserting and holding a disk cartridge having a disk, a case for accommodating the disk, and having an arc-shaped surface formed at an insertion direction side of a holder, and side surfaces continuing both ends of the arc-shaped surface and respectively formed as direct lines at the insertion direction, a light transparent aperture formed contiguous with one side surface of the side surface and input laser beam, an insertion groove formed between the arc-shaped surface and a portion at an ejection direction side than that of the light transparent aperture in the one side, and a function expansion groove formed between the arc-shaped surface and a continuous portion of the arc-shaped surface and another side surface; a shutter opening piece provided at a position opposed to the side surface of the disk cartridge; and a recording/reproducing part for executing a recording a data to, and/or, a reproducing a data from the disk accommodated in the disk cartridge held in the holder. When the disk cartridge is inserted into the holder, if the shutter opening piece is inserted into the insertion groove, the shutter opening piece may be moved to a portion of the ejection direction side of the insertion groove, and if the shutter opening piece is inserted into the function expansion groove, the shutter opening piece may be contacted with an aperture edge of the function expansion groove formed at the continuous portion to thereby prevent the insertion of the disk cartridge into the holder.

Preferably, the disk cartridge drive apparatus further includes a disk table mounting the disk, when the disk cartridge is inserted into the holder, if the shutter opening piece is inserted into the insertion groove, the shutter opening piece may be moved to a portion of the ejection direction side of the insertion groove to be mounted the disk on the disk table, and if the shutter opening piece is inserted into the function expansion groove, the shutter opening piece may be contacted with an aperture edge of the function expansion groove formed at the continuous portion to thereby prevent the insertion of the disk cartridge into the holder.

According to a fourth aspect of the present invention, there is provided a recording medium drive device which can be loaded with a recording medium cartridge rotatably accommodating a disk-shaped recording medium therein. The recording medium cartridge has, in planar shape, a semi-circular portion and a substantially rectangular portion contiguous with the semi-circular portion, the semi-circular portion has a first arc surface following along the planar shape of the disk-shaped recording medium and accommodates substantially half of the recording medium, the substantially rectangular portion has parallel sides contiguous with ends of the semi-circular portion and a second arc surface connecting the two ends of the sides and having a larger curvature than the first arc surface, a function expansion groove is provided at the arc surface of the semi-circular portion in the vicinity of at least one side of the substantially rectangular portion, an opening for recording information from the recording medium drive device onto the recording medium or reading information recorded on the recording medium is provided in the semi-circular portion or the substantially rectangular portion. The recording medium drive device has a chassis, a holder which is provided so that it can be opened or closed using one end of the chassis as a pivot and enables insertion or ejection of the recording medium cartridge with respect to the chassis when in the open state, and a recording/reading part for recording information onto the recording medium or reading information from the recording medium via the opening of the recording medium cartridge when the recording medium cartridge is inserted into the holder. The holder is provided at its inner wall with a projection engaging with the function expansion groove provided at the arc surface of the recording medium cartridge to suppress erroneous insertion of the recording medium cartridge when the recording medium cartridge is inserted into the holder in a backward direction.

According to a fifth aspect of the present invention, there is provided an electronic apparatus provided with a recording medium drive device which can be loaded with a recording medium cartridge rotatably accommodating a disk-shaped recording medium therein.

The electronic apparatus has a main body and an outer housing which can be freely opened or closed with respect to said main body, the recording medium drive device is accommodated in a recess of said main body.

The holder of the disk-shaped recording medium accommodated in the recess is configured so as to be opened with respect to the chassis in response to the opening/closing of the outer housing and enables insertion the recording medium cartridge into the holder or ejection of the recording medium cartridge from the holder.

When the recording medium cartridge is normally inserted and held into the holder, the electronic apparatus controls a recording/reading part (18) to record information onto the disk-shaped recording medium or to read information recorded in the recording medium.

According to a sixth aspect of the present invention, there is provided a recording medium drive device able to be loaded with a recording medium cartridge upon which a shutter for opening/closing an opening for recording information onto a disk-shaped recording medium or reading information recorded on the recording medium is slidably supported and formed with the recording medium accommodated in a case having a function expansion groove formed in it. The recording medium drive device is provided with a holder for holding the recording medium cartridge when the recording medium cartridge is inserted and a shutter opening piece provided in the holder, sliding the shutter supported upon the case of the recording medium cartridge to open the opening when the recording medium cartridge is normally inserted into the holder, and contacting an opening edge of the function expansion groove of the case of the recording medium cartridge to prevent erroneous insertion of the recording medium cartridge into the holder when the recording medium cartridge is inserted into the holder in an erroneous direction.

According to a seventh aspect of the present invention, there is provided a recording medium cartridge including a flat case in which a disk-shaped recording medium is rotatably accommodated and used loaded in a recording medium drive device holder provided with a holder having a shutter opening piece. The surface on the insertion direction side of the case to the holder of the recording medium drive device is formed as a substantially arc surface of an arc state having a center angle of substantially 180°, the two surfaces contiguous with the two ends of the arc surface are formed as straight sides, the arc surface of the case is formed with a function expansion groove for expanding the function as a recording medium cartridge, the case is formed with an opening for establishing a signal path for recording information onto the disk-shaped recording medium or reading information recorded on the recording medium at a position nearer one side, an opening edge of an eject direction side of the function expansion groove opposite to the insertion direction is located at a connecting portion of the other side located opposite to the one side and the arc surface, and when the recording medium cartridge is inserted into the holder of the recording medium drive device in an erroneous direction, the opening edge of the function expansion groove of the case contacts the shutter opening piece of the recording medium drive device to prevent erroneous insertion into the holder.

According to an eighth aspect of the present invention, there is provided a recording medium cartridge rotatably accommodating a disk-shaped recording medium and used loaded in a recording medium drive device, wherein the recording medium cartridge has, in its planar shape, a semi-circular portion and a substantially rectangular portion contiguous with the semi-circular portion, the semi-circular portion has a first arc surface following along the planar shape of the disk-shaped recording medium and accommodates substantially half of the recording medium, the substantially rectangular portion has parallel sides contiguous with ends of the semi-circular portion and a second arc surface connecting the two ends of the sides and having a larger curvature than the first arc surface, a function expansion groove is provided in the arc surface of the semi-circular portion in the vicinity of at least one side of the substantially rectangular portion, an opening for recording information from the recording medium drive device onto the recording medium or reading information recorded on the recording medium is provided in the semi-circular portion or the substantially rectangular portion, and, when the recording medium cartridge is inserted into the holder in the upside down direction, a projection provided on the holder is engaged with the function expansion groove provided in the arc surface of the recording medium cartridge to prevent the erroneous insertion of the recording medium cartridge.

LIST OF REFERENCES

Figure 1:
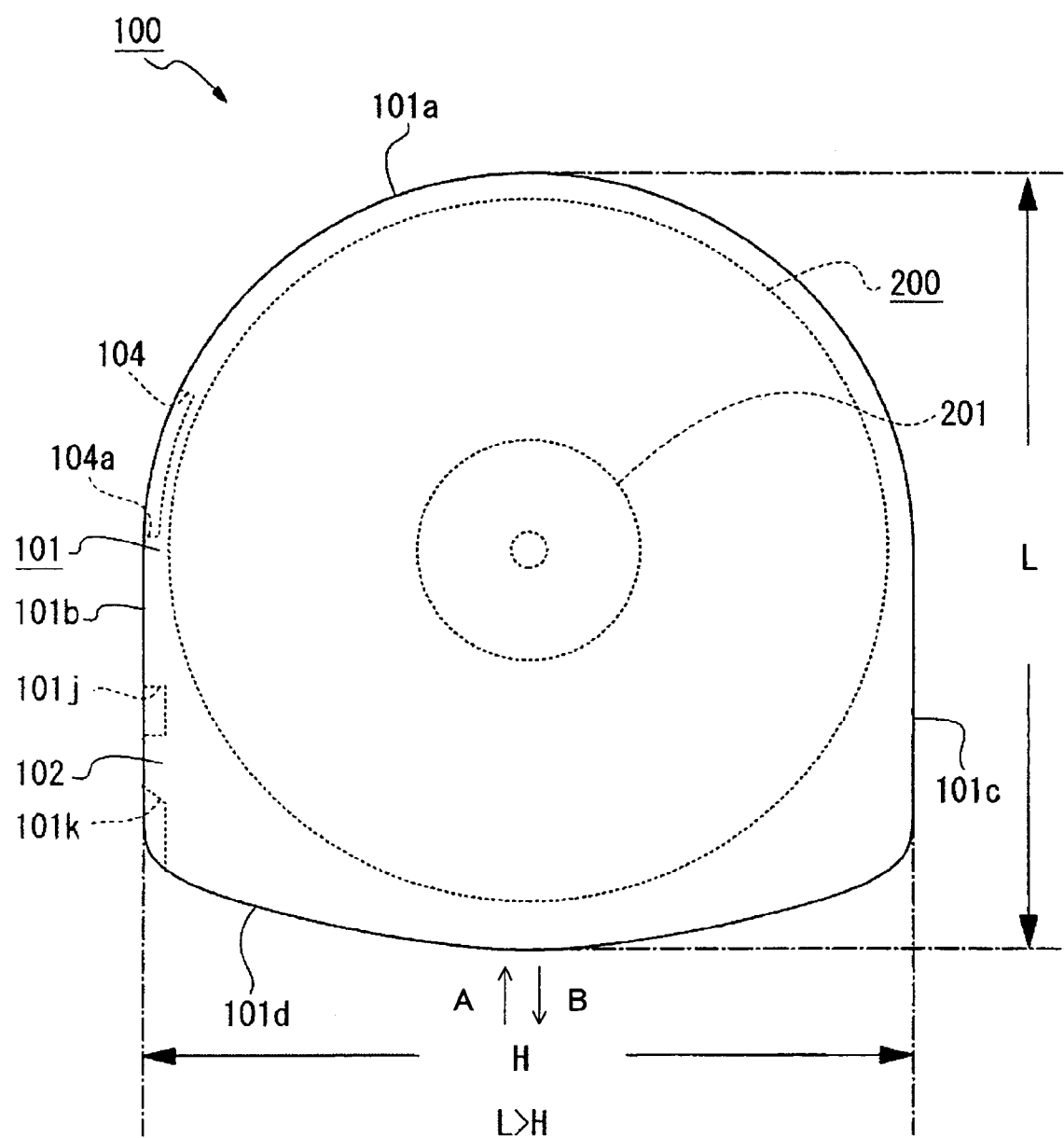
FIG. 1 to FIG. 5 are views illustrating a recording medium cartridge according to an embodiment of the present invention.

1 . . . electronic apparatus
2 . . . outer housing
3 . . . display
4 . . . operation buttons (control keys)
5 . . . lid
6 . . . recording medium drive device
7 . . . chassis
8 . . . holder
9 . . . base
10 . . . support projection
11, 12 . . . mounts
13 . . . positioning pin
14 . . . damper mount
16 . . . disk table
17 . . . base plate
18 . . . optical pick-up
19 . . . moving base
20 . . . object lens drive
21 . . . lead screw
22 . . . guide shaft
23 . . . worm
24 . . . drive motor
25 . . . mount
26 . . . drive gear
27 . . . flexible printed circuit board
28 . . . support shaft
29 . . . transmission gear
30 . . . connection surface
30a . . . weight reduction opening
30b . . . insertion holes
30c . . . tension plates
31, 32 . . . first and second sides
32c . . . projection piece insertion hole
32d . . . shutter opening piece
32e . . . posture holding piece
33, 34 . . . first and second projection surfaces
35 . . . receiving surfaces
36 . . . insertion slot
37 . . . recessed reinforcing rib
38 . . . opening side reinforcing rib
39 . . . protrusion prevention spring
40 . . . shutter spring
41 . . . long spring
42 . . . unlocking projection piece
43 . . . protrusion stopper
44 . . . guide surfaces
45 . . . dampers
46 . . . mounting screws
47 . . . mounting tool
100, 300 . . . recording medium cartridge
101 . . . case (semi circular portion and rectangular portion)
102, 103 . . . upper shell, lower shell
101a . . . arc surface of semi circular portion
101b . . . first and second sides
101b, 101c . . . first and second sides
101d . . . curved surface of rectangular portion
101e . . . engagement groove
101f . . . table hole
101g . . . sliding use recess
101h . . . light transparent hole (aperture)
101i . . . positioning holes
101j . . . engagement recess
104 . . . function expansion groove
105 . . . insertion groove
106 . . . mechanism portion 107 ... spring engagement (latch) shaft
109 ... toggle spring
110 ... shutter
111 ... opening/closing surface
112 ... side
112a ... function hole
113 ... engagement piece
114 ... support surface
115 ... lock lever
200, 400 ... disk-shaped recording medium
201, 401 ... magnetic metal material core

BEST MODE FOR CARRYING OUT THE INVENTION

The objects and features of the present invention and other objects and features will become clearer from the following description given in relation to the attached drawings.

The best modes of the recording medium cartridge, the recording medium drive device, and the electronic apparatus provided with a recording medium drive device according to the present invention will be described.

First, the relationship among the recording medium cartridge, the recording medium drive device, and the electronic apparatus of the embodiments of the present invention will be described.

In the following description of the embodiments, a recording medium cartridge described by referring to FIG. 1 to FIG. 5 is loaded in a holder of a recording medium drive device as illustrated in for example FIG. 22 to FIG. 25 and can be used for recording information onto a recording medium rotatably accommodated in the recording medium cartridge or reading information from the recording medium. An electronic apparatus of an embodiment of the present invention is provided with such a recording medium drive device and performs signal processing by recording information onto the recording medium accommodated in the recording medium cartridge loaded in the recording medium drive device or reproducing information from the recording medium.

The best mode of the present invention will be described with reference to the case where the electronic apparatus of the present invention is, for example, a portable game machine, the recording medium drive device of the present invention is a recording medium drive device provided in this portable game machine, and the recording medium cartridge of the present invention is a recording medium cartridge used in the electronic apparatus or recording medium drive.

As an example of the disk-shaped recording medium accommodated in the recording medium cartridge, for example, an optical disk, a magneto-optic disk, or other recording medium for optically recording information or reading information will be used in the description.

The scope of application of the recording medium cartridge, the recording medium drive, and the electronic apparatus of the present invention is not limited to a portable game machine or a recording medium drive device provided in the same. The electronic apparatus of the present invention includes a broad range of electronic apparatuses handling recording media, for example, a data processing system such as a personal computer, a communication apparatus such as a telephone or facsimile, an information terminal such as a personal digital assistant (PDA), an imaging device such as a still camera, electronic camera, or camcorder, an audio-visual apparatus such as a TV or radio, a recording apparatus or audio apparatus handling various recording media such as disk-shaped recording media and tape cassettes, etc., while the recording medium drive device of the present invention includes a broad range of recording medium drive devices for recording or reproduction of an information signal or both recording and reproduction with respect to a recording medium handled in the various electronic apparatuses.

Also, the recording medium cartridge of the present invention includes a broad range of types of recording medium cartridges used in the recording medium drives and the electronic apparatuses. For example, the disk-shaped recording medium accommodated in the recording medium cartridge is not limited to a recording medium optically recording information or reading the information. The recording medium cartridge also includes a magnetic recording medium magnetically recording information or reading information, for example, a magnetic disk or a hard disk.

Recording Medium Cartridge

First, a recording medium cartridge of an embodiment of the present invention will be described by referring to FIG. 1 to FIG. 5.

Figure 2:
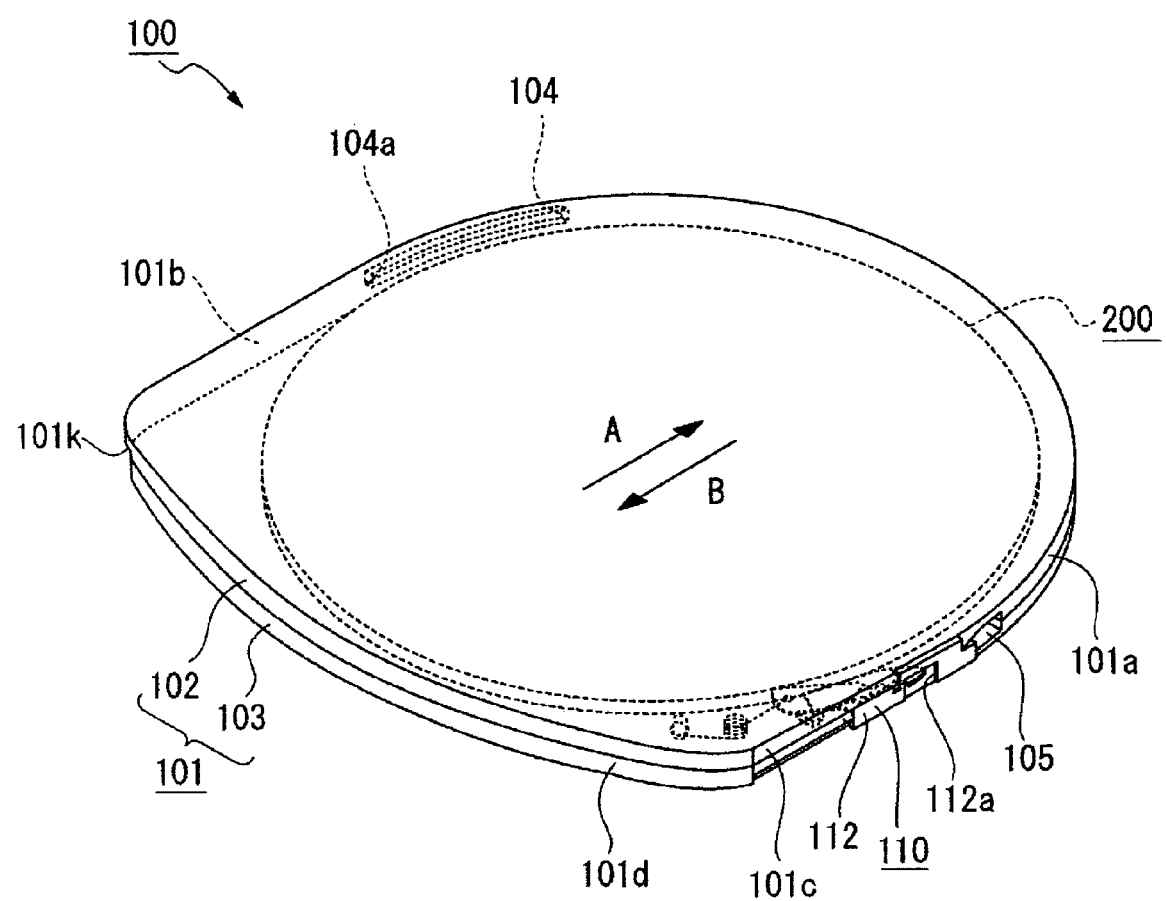
Figure 3:
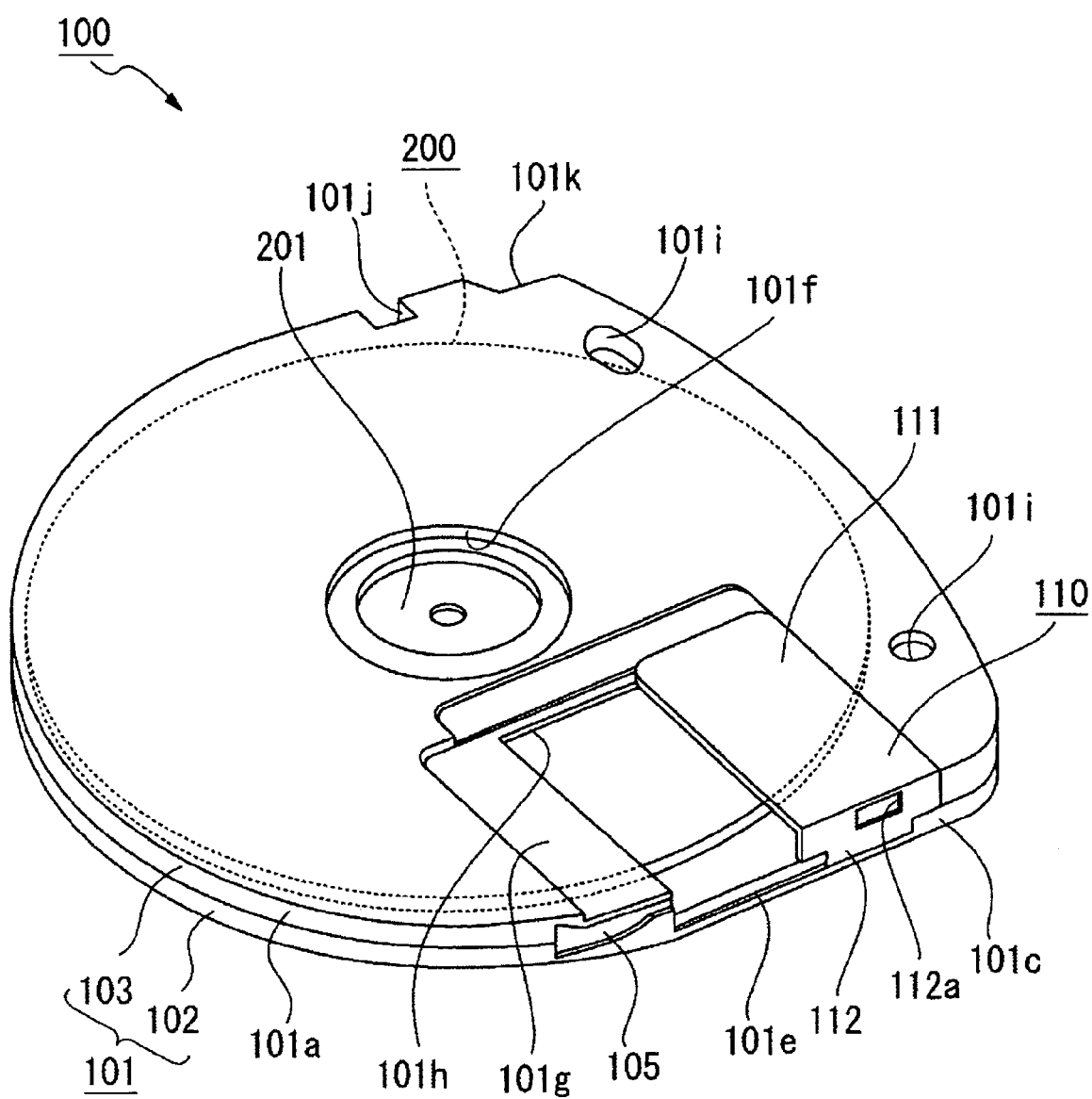
Figure 4:
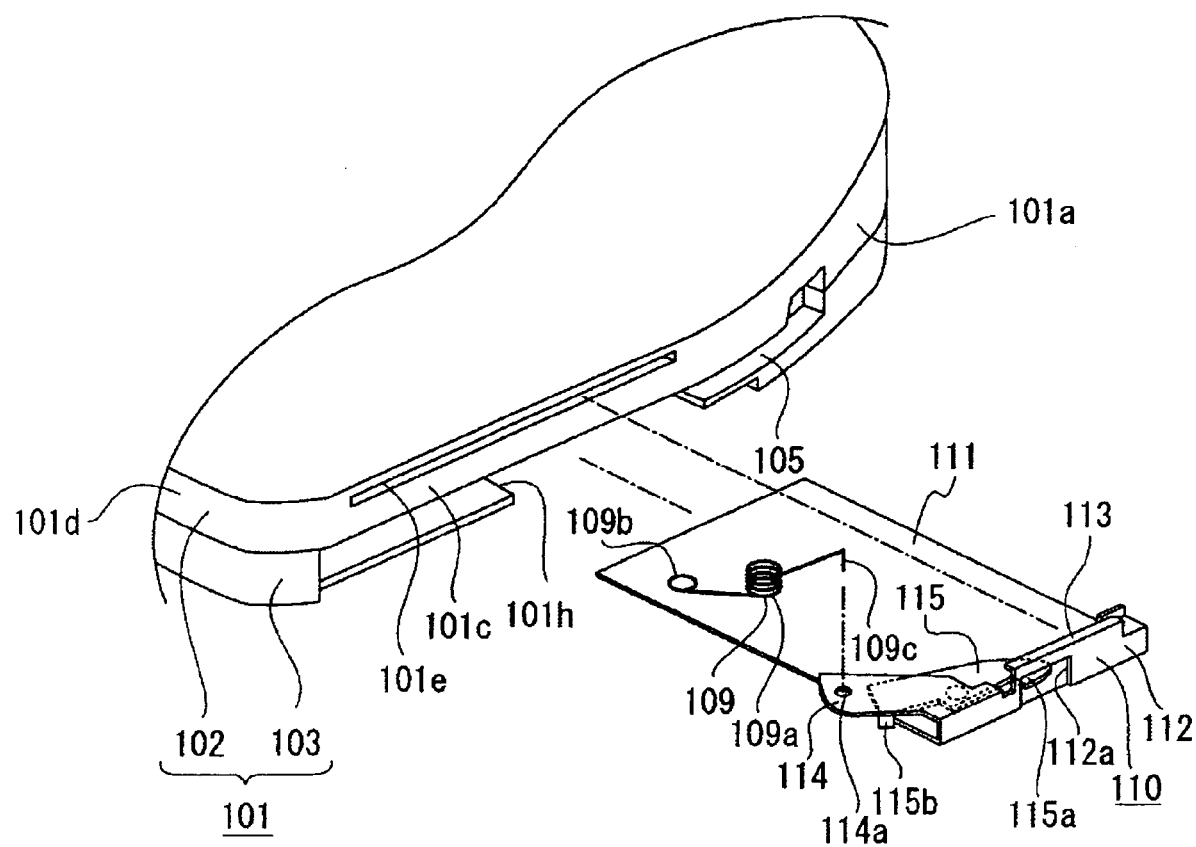
Figure 5:
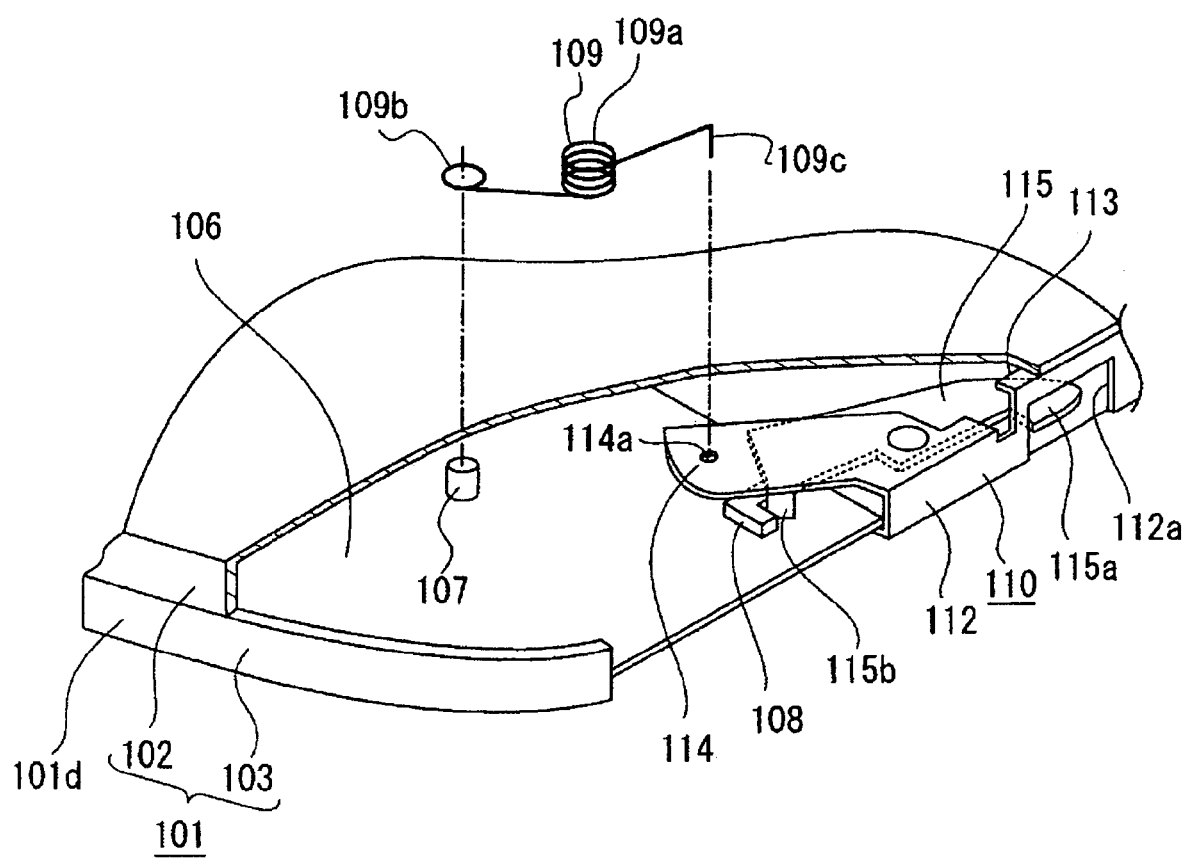

FIG. 1 is an enlarged plan view of the recording medium cartridge of the present embodiment, FIG. 2 is an enlarged perspective view of the front side of the present embodiment, FIG. 3 is an enlarged perspective view of the back side of the present embodiment, FIG. 4 is an enlarged perspective view of part of the recording medium cartridge of the present embodiment shown disassembled, and FIG. 5 is an enlarged perspective view of part of the recording medium cartridge of the present embodiment shown cut away.

As illustrated in FIG. 1 and FIG. 2, a recording medium cartridge 100 of the present embodiment includes a flat case 101 in which a disk-shaped recording medium 200 is rotatably accommodated. The case is shaped to match with the shape of the disk-shaped recording medium 200.

The disk-shaped recording medium 200 of the present embodiment is, for example, an optical disk. The disk-shaped recording medium 200 exhibits a circular outer shape in planar shape.

The case 101 is formed, in planar shape, so that a length L in the insertion and eject directions A and B for inserting and ejecting the recording medium cartridge 100 with respect to the holder to and from a recording medium drive device explained later by referring to FIG. 9 to FIG. 17 (or the insertion and eject directions A and B of the disk-shaped recording medium 200 to and from the recording medium cartridge 100) (hereinafter, referred to as "the first length L") becomes slightly longer than a length H in a direction perpendicular to the insertion and eject directions A and B (L>H) (hereinafter, referred to as "the second length H") as illustrated in FIG. 22 to FIG. 25.

The object and advantages of making L longer than H will be described in detail later, but one is preventing the erroneous insertion of the recording medium cartridge 100 into a holder 8 in a recording medium drive device 6.

In this way, in the case 101 for accommodating the circular disk-shaped recording medium 200, the substantially half region formed following along with the outer shape of the disk-shaped recording medium 200 has a semi-circular shape of a radius of, for example, L/2 (hereinafter this region will be referred to as "the semi-circular portion"), while the remaining half has a substantially rectangular shape of a size of substantially (L/2×H) (hereinafter this region will be referred to as "the rectangular portion"). In this way, in planar shape, the case 101 has a semi-circular portion and a rectangular portion.

The radius r of the disk-shaped recording medium 200 is smaller than half of the first length L (r>L/2) and smaller than half of the second length H (r>H/2).

The recording medium 200 may be able to be freely inserted or ejected from the recording medium cartridge 100 or accommodated so that it cannot be easily ejected.

The case 101 is constituted by an upper shell 102 and a lower shell 103 in cross-section. These upper shell 102 and lower shell 103 are integrally joined in the vertical direction. When the upper shell 102 and the lower shell 103 are connected, a space able to rotatably accommodate the disk-shaped recording medium 200 is defined.

A peripheral surface of the semi-circular portion of the upper half portion of the case 101 has an arc surface 101a formed in arc shape (or circular shape). The rectangular portion of the lower half portion of the case 101 is formed with surfaces contiguous with the two ends of the arc surface 101a as first and second sides 101b and 101c extending in the insertion and eject directions A and B. The first side 101b and the second side 101c are parallel. A circumferential surface connecting the ends of these sides is formed as a curved surface 101d having a gentle outward curvature.

The arc surface 101a of the semi-circular portion of the case 101 is formed with a function expansion groove 104 at a position nearer the first side 101b. An opening edge 104a of the function expansion groove 104 on the first side 101b is located at the connecting portion of the arc surface 101a and the first side 101b. The function expansion groove 104 is provided for expanding the functions of the recording medium cartridge. For example, it is used as a groove for engagement with a pull-in part described later to ensure reliable pull-in when inserting the recording medium cartridge 100 into a holder in a recording medium drive device described later and pulling the recording medium cartridge 100 into the holder. In addition, it can be used as a groove for engagement with a take-out part described later to ensure reliable take-out of the recording medium cartridge when taking out the recording medium cartridge 100 from the holder of the recording medium drive device.

The case 101, as illustrated in FIG. 2 and FIG. 3, is formed with an insertion groove 105 in a portion from the second side 101c of the semi-circular portion to the arc surface 101a. The second side 101c, as illustrated in FIG. 4, is formed with an engagement groove 101e extending parallel to the insertion direction A above the insertion groove 105.

The case 101, as shown in FIG. 3, is formed with a table hole 101f at the center portion of the bottom surface of the case 101 and is formed with a shallow sliding use recess 101g at the right of the table hole 101f. Part of the sliding use recess 101g is formed with a light transparent hole 101h for passing a laser beam emitted from a light emission unit provided in an optical pick-up described later and guiding the same to the disk-shaped recording medium 200 accommodated in the recording medium cartridge 100.

The light transparent hole 101h is an example of the opening in the recording medium cartridge of the present invention.

The bottom surface of the case 101 is formed with a pair of positioning holes 101i and 101i spaced apart horizontally at positions in the vicinity of the curved surface 101d of the rectangular portion.

The approximate center portion of the first side 101b in the rectangular portion of the case 101 is formed with an engagement recess 101j. The engagement recess 101j is formed recessed from the first side 101b in the plane of the case 101.

The end of the first side 101b in the rectangular portion of the case 101 is formed with a relief recess 101k. The relief recess 101k is formed by cutting out part of the end of the rectangular portion of the case 101.

The rectangular portion of the case 101 has spaces at the left and right ends not filled by the recording medium 200. As illustrated in FIG. 5, the space at the right end side among these spaces is formed as a mechanism portion 106.

The mechanism portion 106 is provided with a spring engagement (latch) shaft 107 and a locking projection 108.

A toggle spring 109 is supported at the mechanism portion 106. The toggle spring 109 is constituted by a first arm 109b and a second arm 109c projecting from a first coil 109a and a second coil 109a. The front end of the first arm 109b is supported by the spring engagement shaft 107.

The case 101 has a shutter 110 slidably supported on it. The shutter 110 includes parts integrally formed from a metal plate. As shown in FIG. 4, it has an approximately rectangular shape opening/closing surface 111 having the largest area, a side 112 projecting upward from the right side edge of this opening/closing surface 111, an engagement piece 113 projecting leftward from the portion of this side 112 other than the two ends in the longitudinal direction, and a support surface 114 projecting leftward from one end in the longitudinal direction of the side 112.

The side 112 is formed with a function hole 112a.

The front end of the support surface 114 is formed with a spring engagement (latch) hole 114a. At the bottom surface of the support surface 114, a lock lever 115 long in one direction is rotatably supported. The lock lever 115 is pivoted at the schematic center in its longitudinal direction, has one end in the longitudinal direction formed as a pushed part 115a, and is provided at the other end in the longitudinal direction with an engagement projection 115b projecting downward. The lock lever 115 is biased by a not illustrated biasing spring in a direction so that the pushed part 115a is made to project from the function hole 112a of the side 112.

The shutter 110, the opening/closing surface 111 is supported on the sliding use recess 101g, the side 112 is supported on the second side 101c of the case 101, and the engagement piece portion 113 is slidably engaged with the engagement groove 101e formed in the second side 101c and slidably supported on the case 101. In the state where the shutter 110 is supported upon the case 101, the second arm 109c of the toggle spring 109 is engaged with the spring engagement hole 114a of the support surface 114.

The shutter 110 is slid with respect to the case 101 between a closing position where the opening/closing surface 111 closes the light transparent hole 101h and an opening position where it opens the light transparent hole 101h.

In the state where the shutter 110 is at the closing position, the shutter 110 is biased to the insertion direction A shown in FIG. 2 by the toggle spring 109, whereby the shutter 110 is held at the closing position. At this time, the lock lever 115 supported upon the support surface 114 of the shutter 110 is engaged with the locking projection 108 by the biasing force of the biasing spring (refer to FIG. 5), whereby the shutter 110 is locked at the closing position. The pushed part 115a of the lock lever 115 is located in the function hole 112a formed in the side 112.

In the state where the shutter 110 is at the opening position, the shutter 110 is biased in the eject direction B by the toggle spring 109, and the shutter 110 is held at the opening position.

The recording medium 200 accommodated inside the case 101 has a core 201 made of a magnetic metal material attached to it at its center portion. The core 201 is positioned facing the table hole 101f of the case 101.

Electronic Apparatus

Next, an electronic apparatus of an embodiment of the present invention will be explained by referring to FIG. 6 to FIG. 8.

Figure 6:
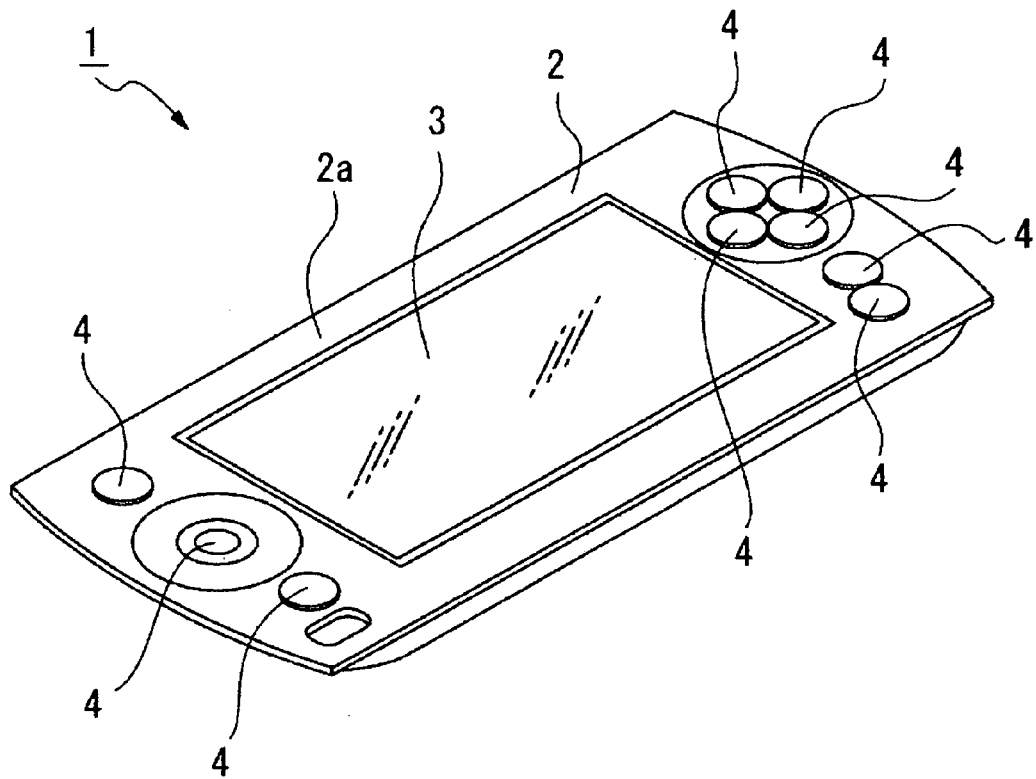
FIG. 6 to FIG. 8 are views illustrating an electronic apparatus according to an embodiment of the present invention.
Figure 7:
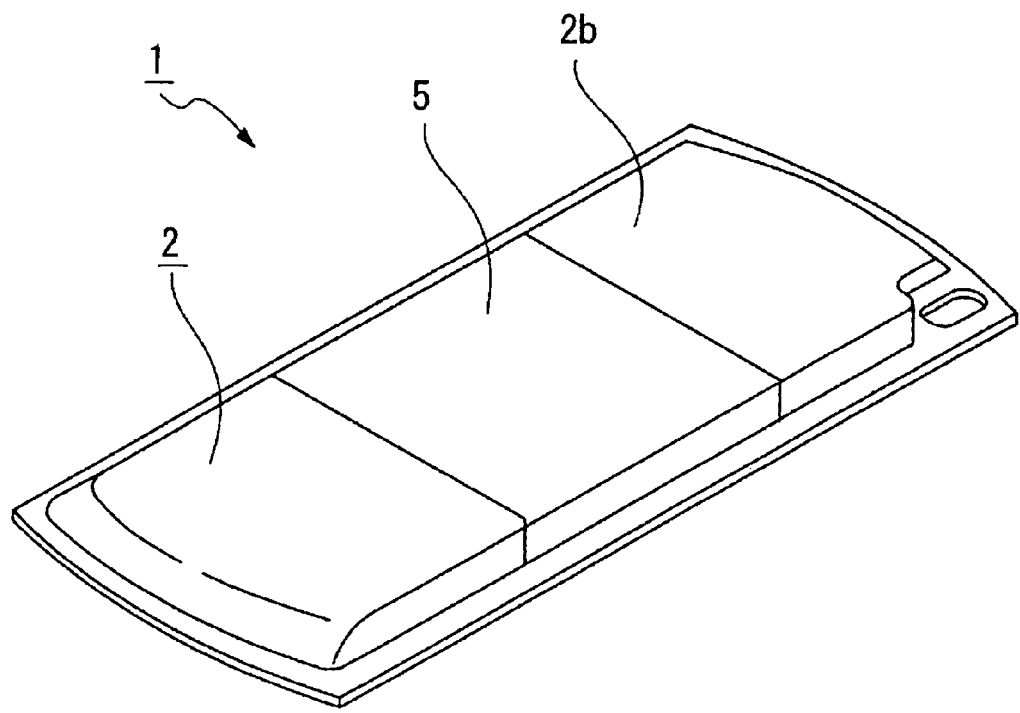
Figure 8:
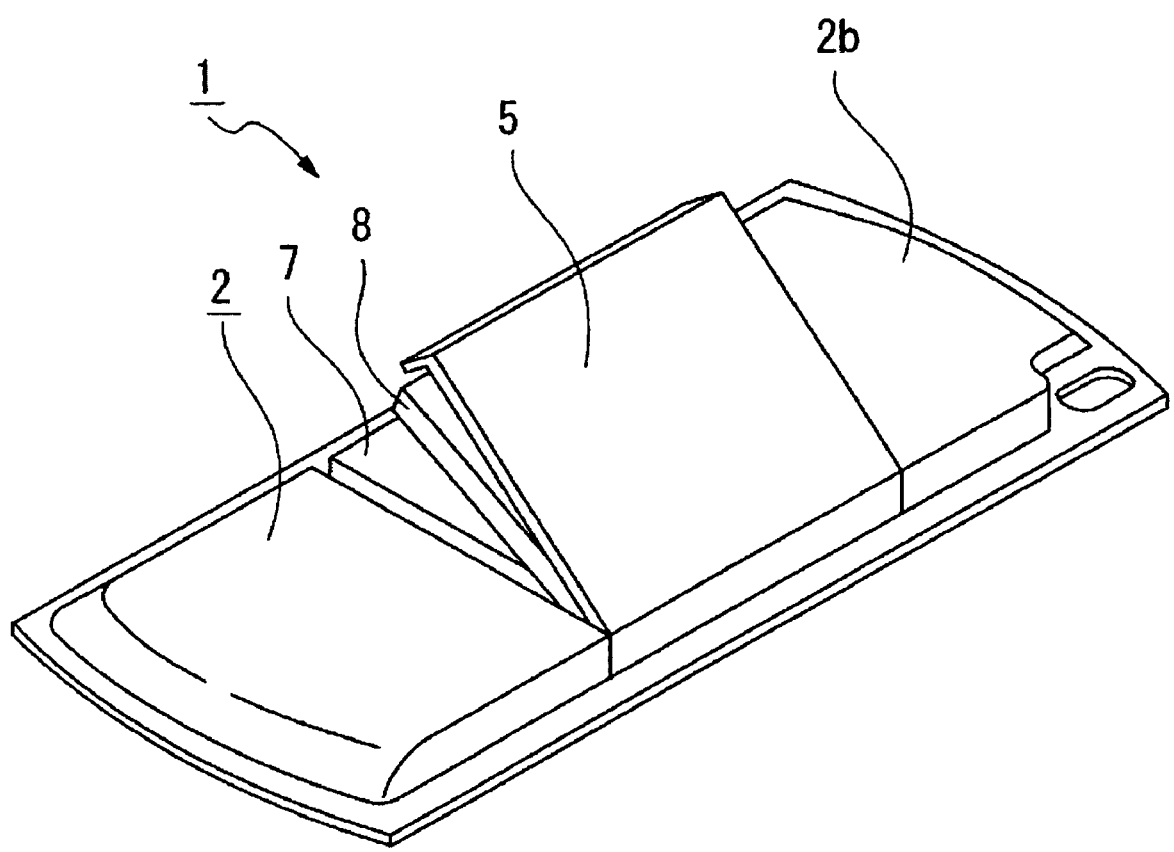

FIG. 6 is a perspective view of the electronic apparatus of the present embodiment, FIG. 7 is a perspective view showing the back side of the electronic apparatus illustrated in FIG. 6, and FIG. 8 is a perspective view of the electronic apparatus in the state where the lid is opened.

The electronic apparatus 1 of the present embodiment, for example, a game machine is formed to a flat, laterally long shape as exemplified in FIG. 6 to FIG. 8. The required parts of the electronic apparatus are arranged in the outer housing 2.

The center of the front surface 2a of the outer housing 2 is provided with a display 3, while both of the left and right ends of the front surface 2a are provided with a plurality of operation buttons (control keys). The center portion in the left-right direction of the back surface 2b of the outer housing 2 is provided as the lid and can be opened or closed. The lid 5 is for example opened and closed pivoting at its lower end.

The inside of the outer housing 2 is provided with the recording medium drive device 6 explained below.

Recording Medium Drive Device

Next, a recording medium drive device according to an embodiment of the present invention will be described by referring to FIG. 9 to FIG. 17.

Figure 9:
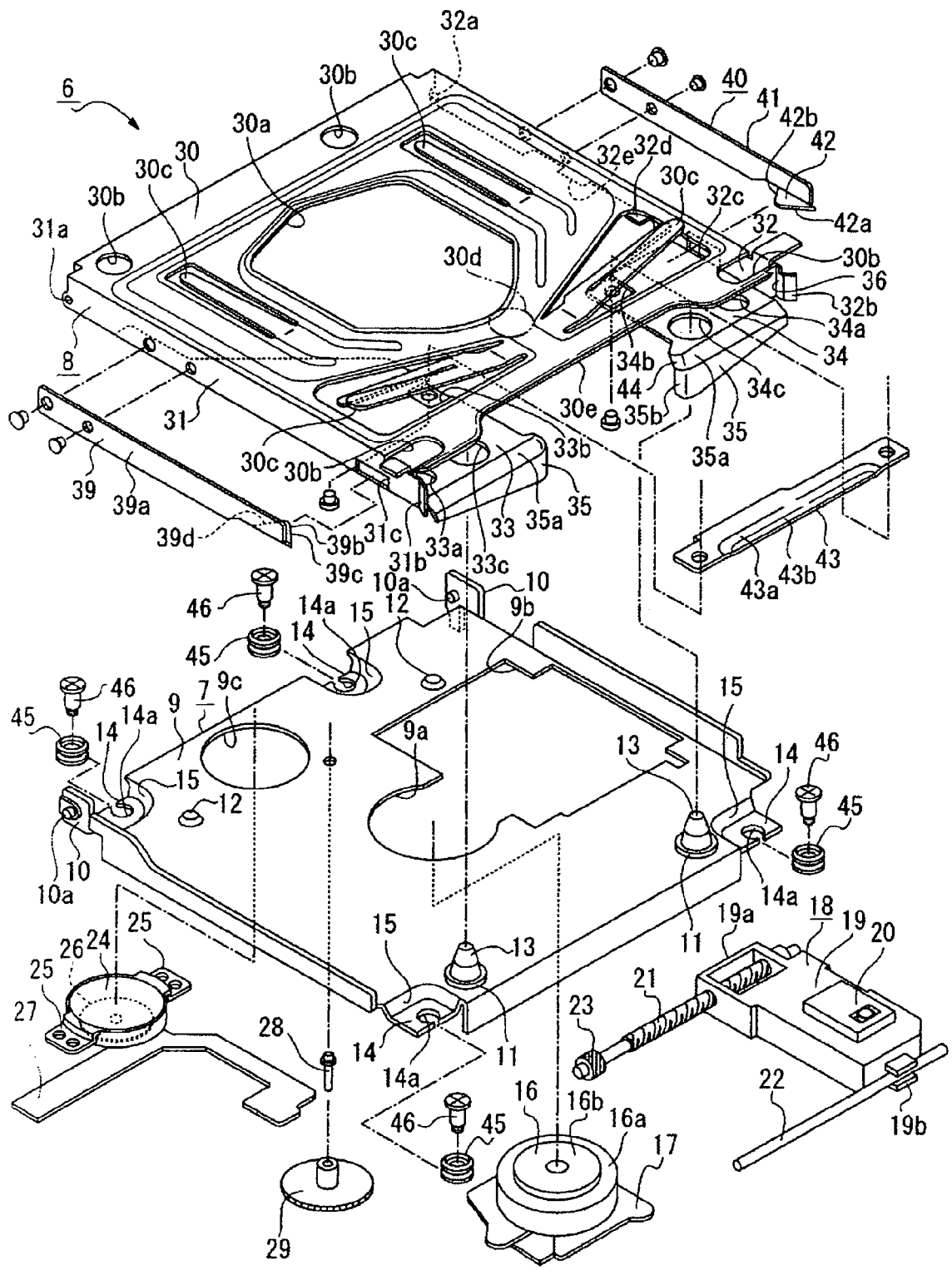
FIG. 9 to FIG. 17 are views illustrating a recording medium drive device according to an embodiment of the present invention.
Figure 10:
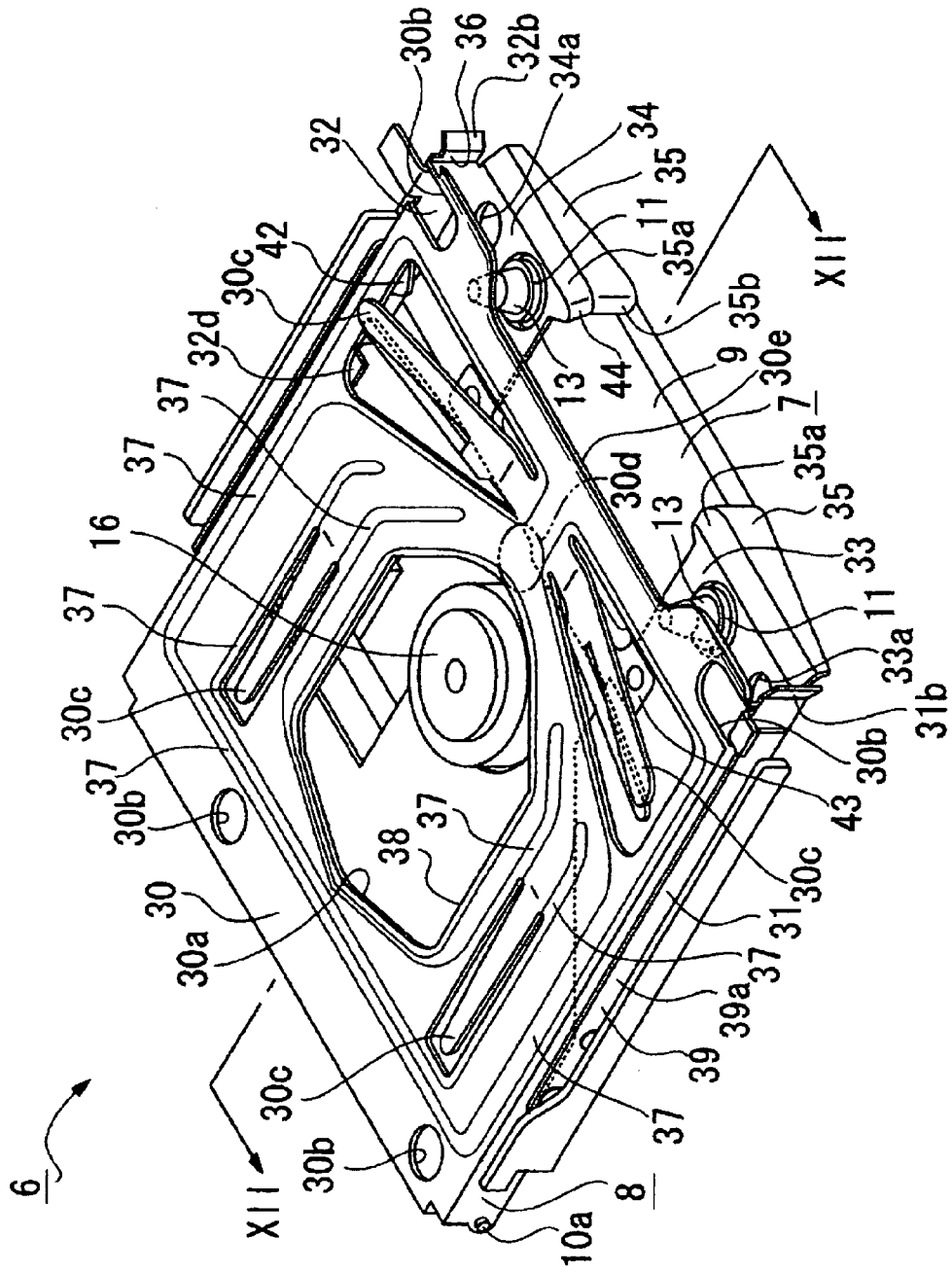

FIG. 9 is an enlarged perspective view of the recording medium drive device of the present embodiment shown disassembled, while FIG. 10 is an enlarged perspective view of the recording medium drive device illustrated in FIG. 9 shown assembled.

Figure 11:
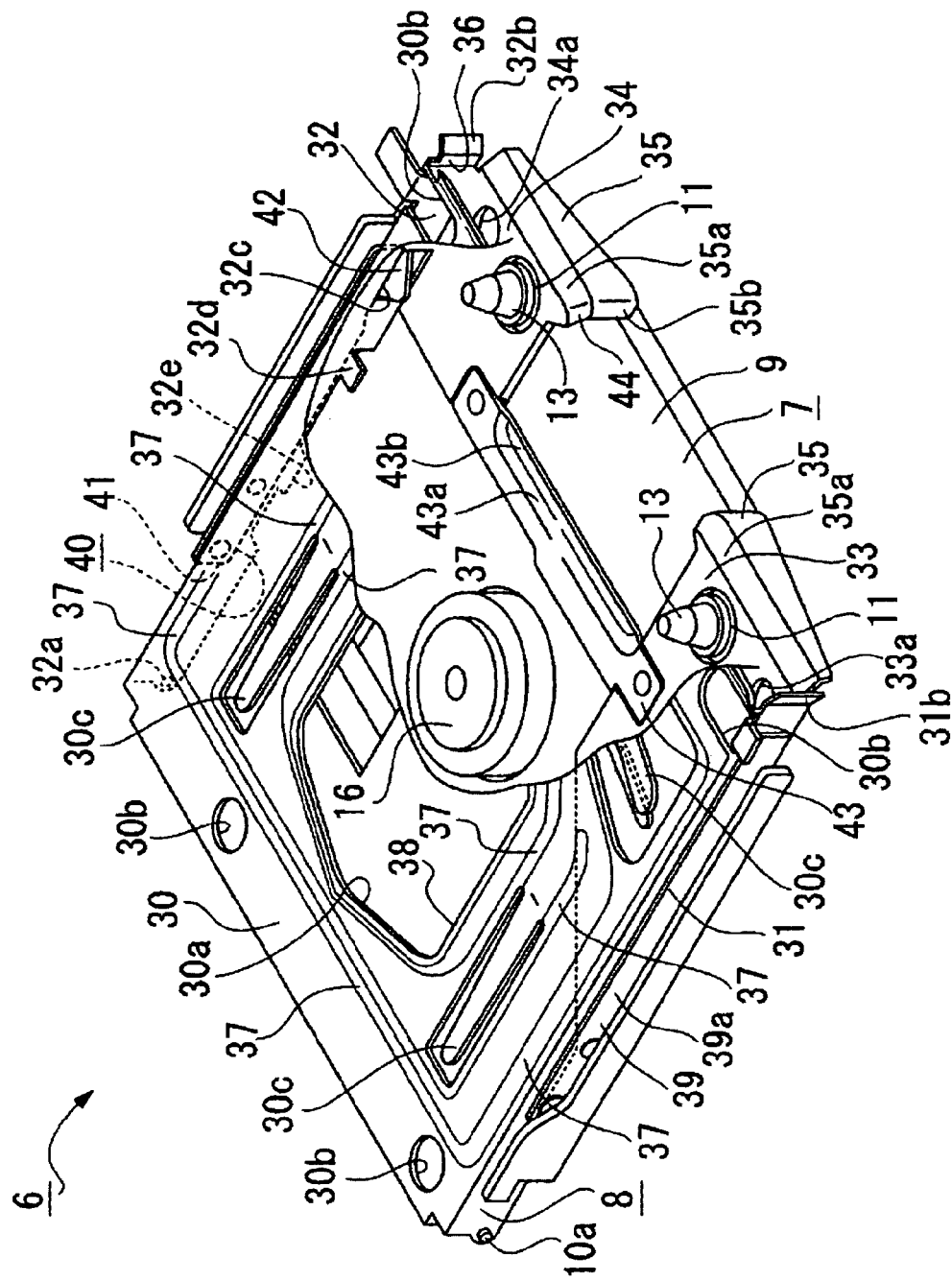
Figure 12:
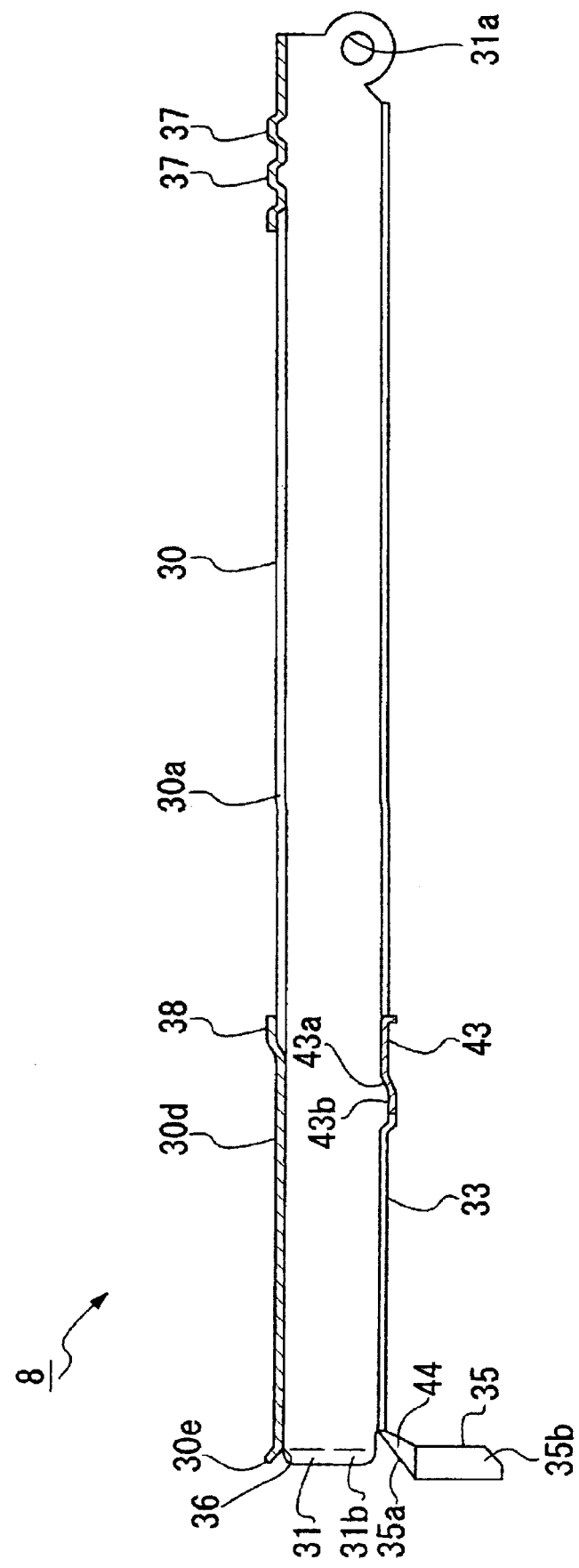

FIG. 11 is an enlarged perspective view of the recording medium drive device shown with part of the holder in the recording medium drive device cut away, while FIG. 12 is an enlarged sectional view of the holder taken along a line XII-XII of FIG. 10.

Figure 13:
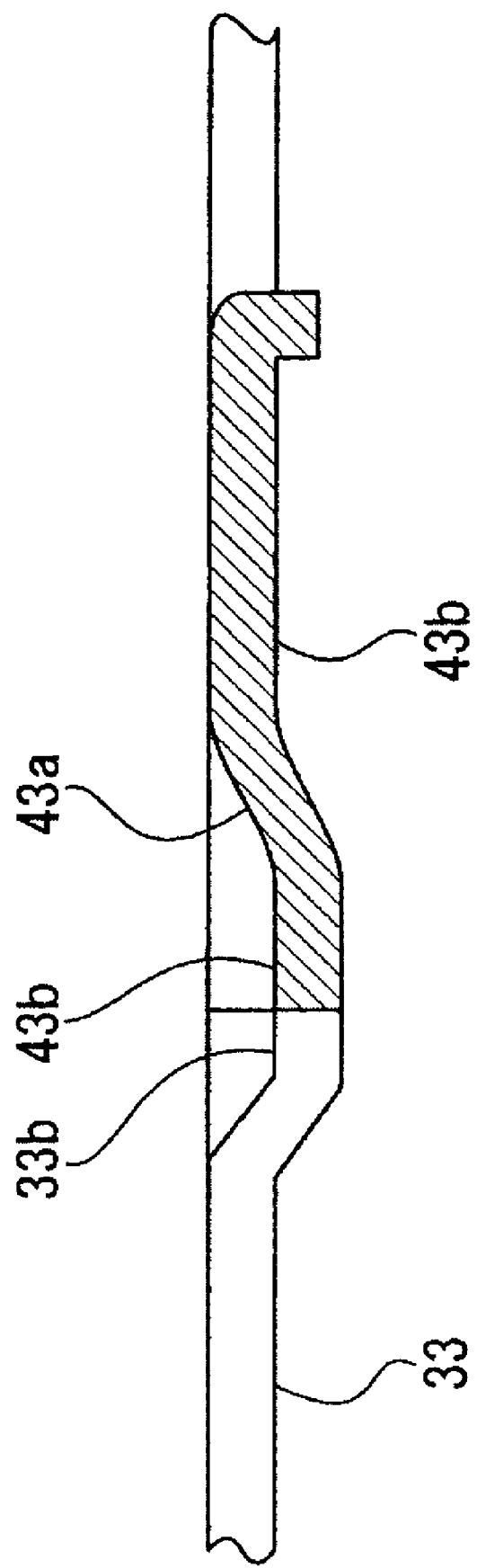
Figure 14:
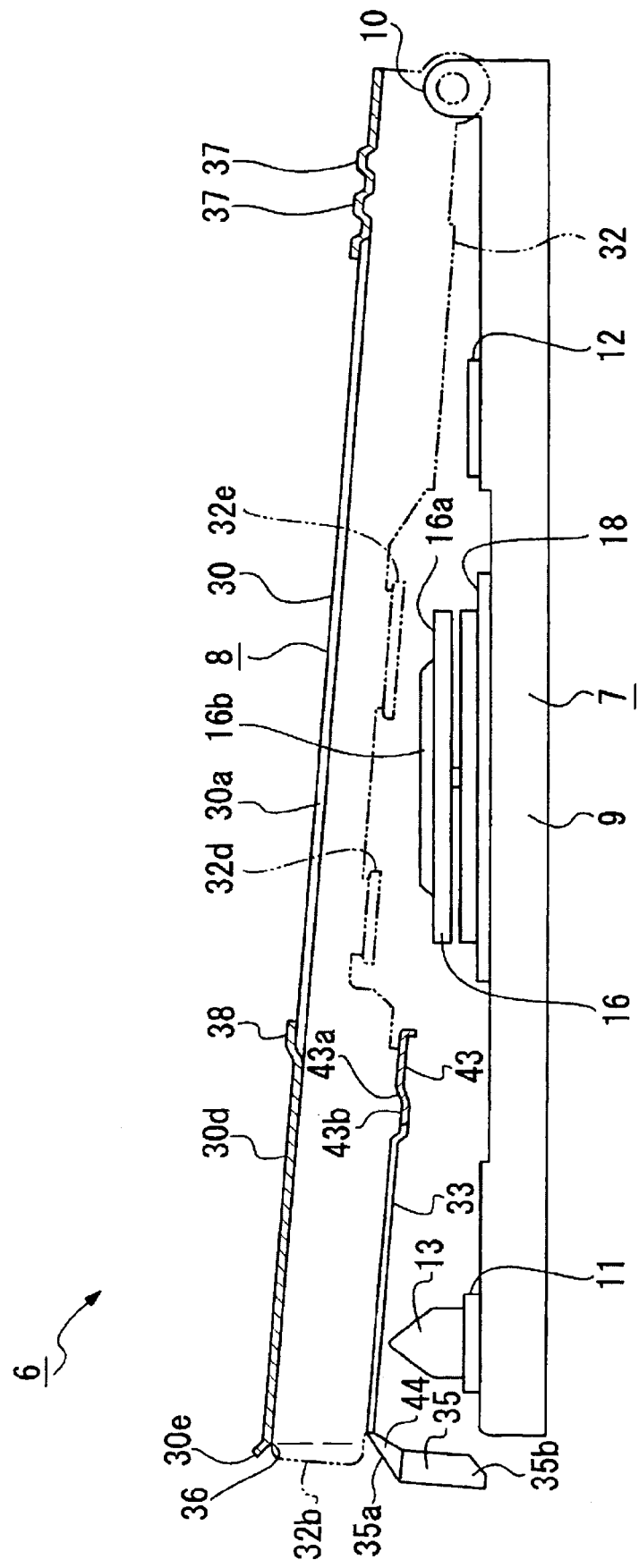

FIG. 13 is an enlarged sectional view showing a protrusion stopper in the recording medium drive device, and FIG. 14 is a schematic side view showing part of the positional relationship of a protrusion stopper and a recording/reproduction unit in cross-section.

Figure 15:
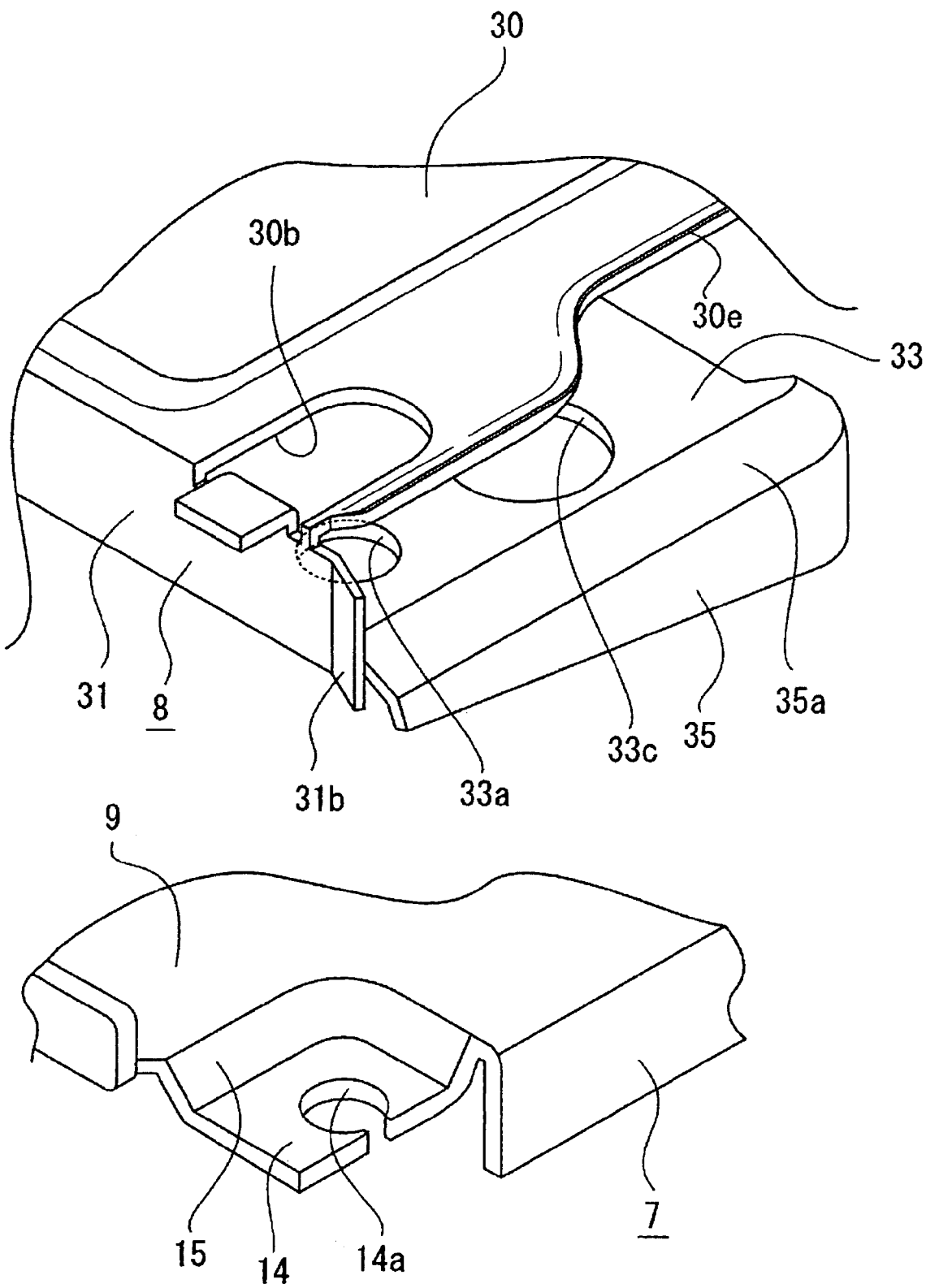

FIG. 15 is an enlarged perspective view showing the positional relationship between an insertion hole of the holder and a damper mount of the chassis.

Figure 16:
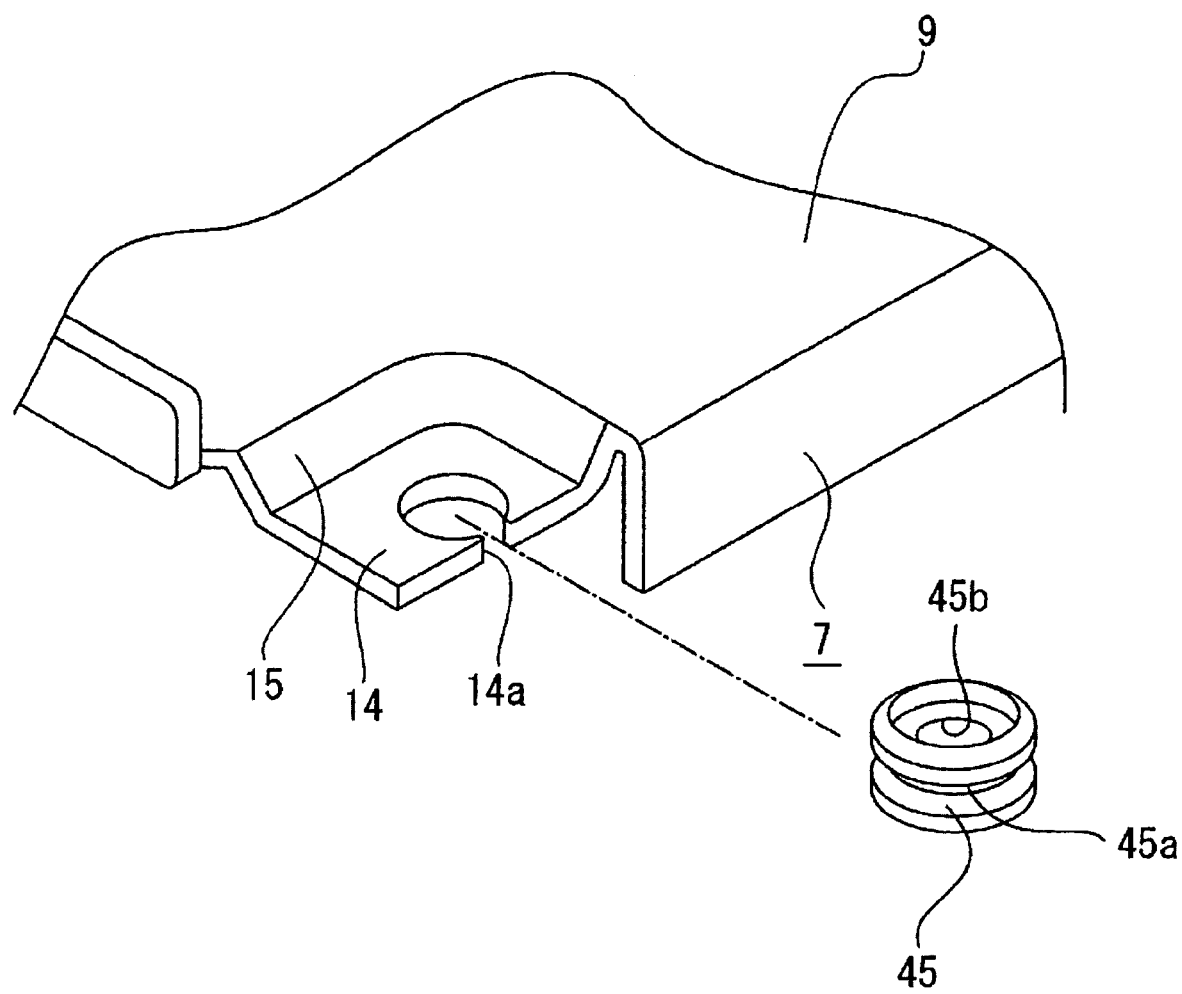
Figure 17:
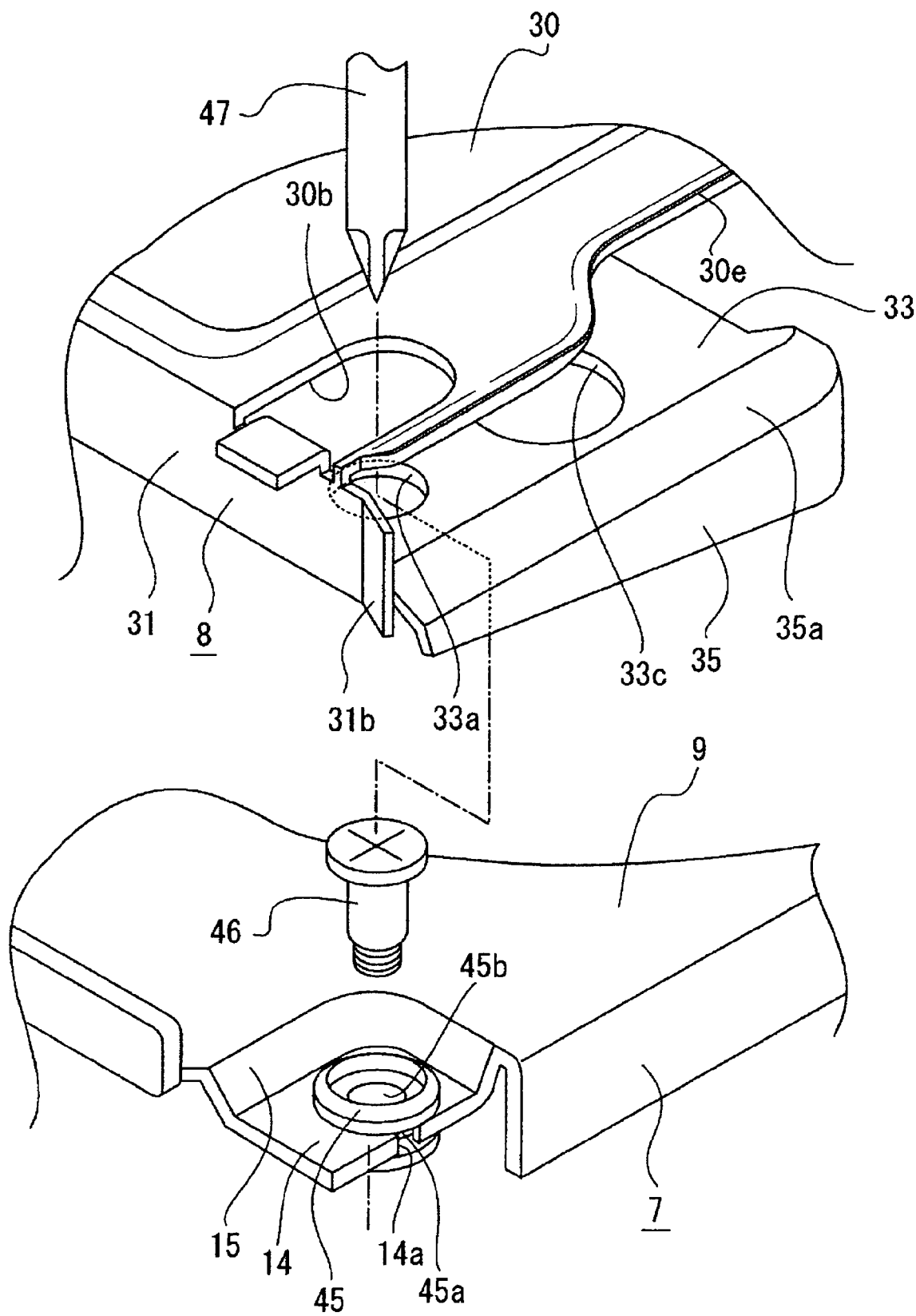

FIG. 16 and FIG. 17 show the procedure for attaching the damper, in which FIG. 16 is an enlarged perspective view showing the state where the damper is attached to the damper mount, and FIG. 17 is an enlarged perspective view showing the state where a mounting screw is inserted into the damper attached to the damper mount and used to fasten the chassis.

As illustrated in FIG. 9 and FIG. 10, the recording medium drive device 6 of the present embodiment includes the chassis 7, required parts arranged in this chassis 7, the holder 8 rotatably supported upon the chassis 7, and various circuits including the drive circuit.

In the description of the recording medium drive device 6, for convenience, the direction of inserting the recording medium cartridge 100 into the holder 8 will be referred to as "back", the direction of taking out the inserted recording medium cartridge 100 from the holder 8 will be explained as "front", the position of the holder 8 will be explained as "above", and the position of the chassis 7 will be explained as "below".

The chassis 7 is formed integrally from metal plate and has a base 9 formed in an approximately square shape and a pair of support projections 10 and 10 projecting upward from both of the left and right edges of the rear end of this base 9.

The center part of the base 9 is formed with a table hole 9a. At its right, an optical pick-up hole 9b for arranging the optical pick-up 18 for focusing light on the recording medium 200 is formed contiguous with the table hole 9a. The rear end of the base 9 is formed with a motor hole 9c used when rotating the recording medium 200.

The base 9 is provided with four mounts 11, 11, 12, and 12 spaced apart at the front, back, left, and right. Two positioning pins 13 and 13 are provided on the two mounts 11 and 11 located at the front. The outside diameters of the positioning pins 13 and 13 are made smaller than the outside diameters of the mounts 11 and At positions at the approximately four corners of the base 9, four damper mounts 14 are formed. The four damper mounts 14 are formed at positions much lower than the rest of the base 9 by steps 15. Each damper mount 14 is formed with a mounting recess 14a. Each mounting recess 14a is open to the side of the base 9.

A disk table 16 is arranged in the table hole 9a of the base 9. The disk table 16 has a table 16a and a center ring projection 16b provided at the center of the table 16a. It is fixed to a motor shaft of a not illustrated spindle motor for rotating the recording medium 200 via the disk table 16. A not illustrated magnet is provided in the center ring projection 16b. The spindle motor is fastened to the base 9 so that a base plate 17 attached to it is attached to the opening edge of the table hole 9a. The disk table 16 is arranged in the state projecting upward from the table hole 9a. The disk table 16 is rotated along with the operation of the spindle motor.

The optical pick-up 18 is arranged in the optical pick-up hole 9b of the base 9. The optical pick-up 18, the disk table 16, and the spindle motor constitute the recording/reproduction unit for recording or reproducing an information signal with respect to the recording medium 200 of the recording medium cartridge 100 or both recording and reproduction.

The optical pick-up 18 has a moving base 19 and an object lens drive 20 supported on the moving base 19. The moving base 19 is provided with bearings 19a and 19b. The bearing 19a has a lead screw 21 passed through and screwed with it, while the bearing 19b is supported on a guide shaft 22. The front end of the lead screw 21 has a worm 23 is fixed to it.

The optical pick-up 18 is arranged in the optical pick-up hole 9b by the lead screw 21 being rotatably supported at the bottom side of the base 9 and by the guide shaft 22 being fastened at the bottom side of the base 9. It is guided by the guide shaft 22 and can be moved in the optical pick-up hole 9b by the rotation of the lead screw 21.

The drive motor 24 is arranged in the motor hole 9c of the base 9. The drive motor 24 is provided with mounts 25, 25 projecting to the sides. The bottom side of the drive motor 24 is provided with a drive gear 26 fastened to the motor shaft. The drive motor 24 has a flexible printed circuit board 27 connected to it. A not illustrated drive circuit supplies the drive motor 24 with drive current via the flexible printed circuit board 27.

The drive motor 24 is arranged in the motor hole 9c by the mounts 25, 25 being attached to the opening edge of the motor hole 9c.

At the bottom side of the base 9, a transmission gear 29 is supported via a support shaft 28. The transmission gear 29 meshes with the drive gear 26 and the worm 23 fastened to the lead screw 21. Accordingly, the driving force of the drive motor 24 is transmitted to the lead screw 21 via the drive gear 26, the transmission gear 29, and the worm 23, whereby the optical pick-up 18 is moved in a direction in accordance with the rotational direction of the drive motor 24.

Support projections 10 and 10 of the chassis 7 are provided with support shafts 10a and 10a projecting to the sides.

The holder 8 is formed integrally from metal plate. As shown in FIG. 9 and FIG. 11, it includes a connection surface 30 formed to an approximately square shape, sides 31 and 32 hanging down from the left and right edges of the connection surface 30, projection surfaces 33 and 34 projecting in directions approaching each other from the bottom edges of the sides 31 and 32, and receiving surfaces 35 and 35 hanging down from the front edges of the projection surfaces 33 and 34. The projection surface 33 located at the left side is provided at a position extending from the front end of the side 31 to the center portion in the front-back direction, while the projection surface 34 provided at the right side is provided at only a position at the front end side of the side 32.

The front end of the holder 8 is formed with a space surrounded by the connection surface 30, the sides 31 and 32, and the projection surfaces 33 and 34. This space becomes the insertion slot 36 into which the recording medium cartridge 100 is inserted.

The connection surface 30 of the holder 8 is formed with an opening 30a at its center. The opening 30a is formed so as to reduce the weight of the holder 8.

The connection surface 30 is formed with four insertion holes 30b at its approximately four corner positions. The connection surface 30 is cut and raised at parts so as to provide a plurality of tension plates 30c. The tension plates 30c function to press the case 101 of the recording medium cartridge 100 against the mounts 11 in the state where the recording medium cartridge 100 is held in the holder 8. Further, they function to maintain a certain distance between the holder 8 and the lid 5 in the state where the lid 5 of the outer housing 2 of the electronic apparatus is opened so as to facilitate insertion and removal of the recording medium cartridge 100 to and from the holder 8.

As illustrated in FIG. 11 and FIG. 12, the connection surface 30 is formed with a plurality of recessed reinforcing ribs 37 opening to the first and second projection surface 33 and 34 sides. The recessed reinforcing ribs 37 are formed at portions other than at least the opening edge of the opening 30a and are not formed at the portion 30d at the front of the opening 30a at the center portion of the connection surface 30 in the left-right direction. Accordingly, the portion 30d at the front of the opening 30a at the center portion of the connection surface 30 in the left-right direction is formed flat.

The opening edge of the opening 30a of the connection surface 30 is formed with opening side reinforcing ribs 38 projecting to the opposite sides of the first and second projection surfaces 33 and 34.

The front edge of the connection surface 30 is formed with a dual-purpose reinforcing rib 30e inclined bent to the opposite sides of the first and second projection surfaces 33 and 34.

The rear ends of the first and second sides 31 and 32 of the holder 8 are formed with support holes 31a and 32a.

The first and second sides 31 and 32 are provided with first and second insertion guides 31b and 32b by bending their front ends in directions away from each other.

As illustrated in FIG. 9, the first side 31 at the left side is formed with a first projection insertion hole 31c at a position near its front end.

As illustrated in FIG. 9 to FIG. 11, the first side 31 is provided with a protrusion prevention spring 39 at its outer surface. The protrusion prevention spring 39 includes a spring 39a long in the front-back direction and an engagement projection 39b projecting to the right from the bottom edge of the front end of the spring 39a. The engagement projection 39b is formed in a triangular shape projecting out to the right. It is formed with a first inclined edge 39c, extending more to the right the further toward the back, and a second inclined edge 39d, extending more to the right the further toward the front, connected in the front-back direction.

The protrusion prevention spring 39 is attached to the outer surface of the first side 31 at its rear end. The engagement projection 39b projects into the holder 8 from the projection insertion hole 31c.

The second side 32 at the right side is formed with a second projection piece insertion hole 32c at a position near the front end. The second side 32 is provided with a shutter opening piece 32d formed bent inward at a position at the back of the second projection piece insertion hole 32c and is provided with a posture holding piece 32e formed bent inward at a position at the back of the shutter opening piece 32d. Both of the shutter opening piece 32d and the posture holding piece 32e are formed as tongue shapes long in the front-back direction.

As illustrated in FIG. 9 and FIG. 11, the second side 32 is provided with a shutter spring 40 at its outer surface. The shutter spring 40 includes a spring 41 long in the front-back direction and an unlocking projection piece 42 projecting to the left from the bottom edge of the front end of the spring 41. The unlocking projection piece 42 is formed as a triangular shape projecting outward to the left. It is formed with a first inclined edge 42c, extending more to the left the further toward the back, and a second inclined edge 42d, extending more to the left the further toward the front, connected in the front-back direction.

The first and second projection surfaces 33 and 34 are located facing the connection surface 30 and function as facing surfaces.

The shutter spring 40 is attached to the outer surface of the second side 32 in its rear end. The unlocking projection piece 42 is projected from the projection piece insertion hole 32c toward the inside of the holder 8.

The first and second projection surfaces 33 and 34 of the holder 8 are formed with first and second insertion holes 33a and 34a. The insertion holes 33a and 34a are formed at positions immediately under the insertion holes 30b and 30b formed at the front end of the connection surface 30.

The first and second projection surfaces 33 and 34 are formed with mounting recesses 33b and 34b at their inside ends. The mounting recesses 33b and 34b are formed much lower than the other portions. The projection surfaces 33 and 34 are formed with projection insertion holes 33c and 34c at their front ends.

A protrusion stopper 43 is attached between the top surfaces of the first and second projection surfaces 33 and 34. The protrusion stopper 43 is formed long in the left-right direction. Its two ends are attached to the first and second mounting recesses 33b and 34b from the top side by for example crimping.

As described above, by attaching the protrusion stopper 43 to the top sides of the projection surfaces 33 and 34, detachment of the protrusion stopper 43 from the holder 8 can be prevented.

Note that it is also possible to form the protrusion stopper 43 integrally with the holder 8. By integrally forming the protrusion stopper 43 with the holder 8, a reduction of number of parts forming the recording medium drive device 6 and a reduction of the manufacturing cost of the recording medium drive device 6 can be achieved.

The portion at the front end side of the protrusion stopper 43 other than the left and right ends includes a first guide 43a and a second guide 43b. The first guide 43a is inclined to displace downward the more to the front, while the second guide 43b is formed in a horizontal plane contiguous with the bottom end of the first guide 43a.

In the state where the protrusion stopper 43 is attached between the projection surfaces 33 and 34, as shown in FIG.

13, the top surfaces of both of left and right ends of the protrusion stopper 43 and the top surfaces of the projection surfaces 33 and 34 are located in approximately the same plane, while the top surface of the second guide 43b of the protrusion stopper 43 is located lower than the top surfaces of the projection surfaces 33 and 34.

As illustrated in FIG. 11, the top ends of the receiving surfaces 35, 35 of the holder 8 are formed as guide surfaces 35a, 35a inclined displaced to the rear the further upward. The ends at the insides of the receiving surfaces 35, 35 of the holder 8 are bent backward and formed as receiving portions 35b, 35b exhibiting gently curved surfaces or flat surfaces. The receiving portions 35b, 35b are displaced so as to become closer to each other the further backward.

The connecting portions of the receiving portions 35b, 35b and the projection surfaces 33 and 34 are formed as the guide surfaces 44 and 44 forming flat surfaces or curved surfaces and displaced so as to become closer to each other the further backward.

The holder 8 is rotatably supported on the chassis 7 about the support shafts 10a and 10a by the support shafts 10a and 10a of the support projections 10 and 10 provided at the rear ends of the chassis 7 being inserted into the support holes 31a and 31a formed at the rear ends of the sides 31 and 32.

As illustrated in FIG. 14, in the state where the holder 8 is supported upon the chassis 7, the protrusion stopper 43 is located immediately in front of the recording/reproduction unit constituted by the optical pick-up 18, disk table 16, etc., that is, between the insertion slot 36 and the recording/reproduction unit.

Further, as illustrated in FIG. 15, the insertion holes 30b, 30b, . . . , 33a, 34a formed in the connection surface 30 or projection surfaces 33 and 34 of the holder 8 are located immediately above the damper mounts 14, 14, . . . of the chassis 7.

The dampers 45 are attached to the damper mounts 14 of the chassis 7. Each damper 45, as shown in FIG. 16, is formed by for example a rubber material as an approximately cylindrical shape in the axial direction and has a recessed groove 45a extending in the circumferential direction at the center portion in the axial direction. A center hole of the damper 45 is formed as screw insertion hole 45b.

The dampers 45 are inserted into the damper mounts 14 from the sides (refer to FIG. 16), parts of the damper mounts 14 are fit in the recessed grooves 45a, mounting screws 46 are inserted into the screw insertion holes 45a, 45b, . . . from above (refer to FIG. 17), and the mounting screws 46 are screwed into for example a not illustrated mounting base which is then fastened to the inside of the outer housing 2 of the electronic apparatus or forms part of the outer housing 2. At this time, since the holder 8 is formed with insertion holes 30b in the connection surface 30, and the first and second projection surfaces 33 and 34 are formed with the first and second insertion holes 33a and 34a, it is possible to insert a mounting tool 47 such as screwdriver into these insertion holes 30b, 30b, . . . , 33a, and 34a and screw each mounting screw 46 into the mounting base forming part of the outer housing 2 of the electronic apparatus 1 in the state where the holder 8 is supported upon the chassis 7.

In this way, in the recording medium drive device 6 of the present embodiment, since the holder 8 is formed with insertion holes 30b, 30b, . . . , 33a, and 34a for inserting a mounting tool 47, it becomes possible to screw each mounting screw 46 into the mounting base forming part of the outer housing 2 of the electronic apparatus 1 in the state where the holder 8 is supported upon the chassis 1 as it is, so an improvement of the work efficiency in the work of mounting the chassis 7 to the mounting base form part of the outer housing 2 via each damper 45 can be achieved.

Further, since each damper mount 14 does not project sideways from the chassis 7, but is located inside the outer shape of the connection surface 30 of the holder 8, a reduction of the size of the recording medium drive device 6 and the electronic apparatus 1 can be achieved by that amount.

In the state where the mounting screws 46 are screwed into the mounting base forming part of the outer housing 2, the chassis 7 is supported floating upon the mounting base forming part of the outer housing 2 by the dampers 45, vibration from the mounting base forming part of the outer housing 2 to the chassis 7 is absorbed, and even if the electronic apparatus vibrates, a good recording/reproduction operation by the recording/reproduction unit is possible.

Insertion/Eject Operation of Recording Medium Cartridge With Respect to Holder

Referring to FIG. 18 to FIG. 33, the operations when the recording medium cartridge 100 is inserted into the holder 8 and when the recording medium cartridge 100 is ejected of the holder 8 will be described.

Figure 18:
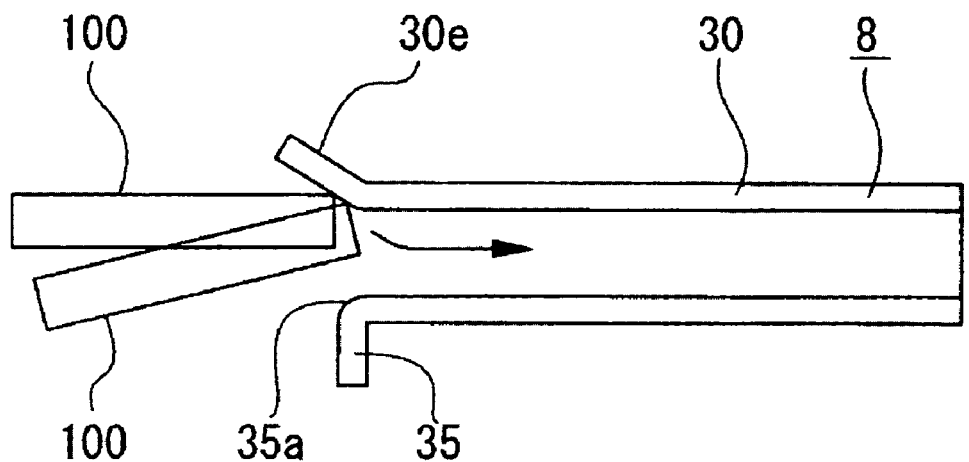
FIG. 18 to FIG. 25 are views showing states when a recording medium cartridge of an embodiment of the present invention is inserted into a holder of a recording medium drive device of an embodiment of the present invention.

FIG. 18 is a view of a case where a recording medium cartridge is inserted into a holder of a recording medium drive device while slightly tilted upward.

Figure 19:
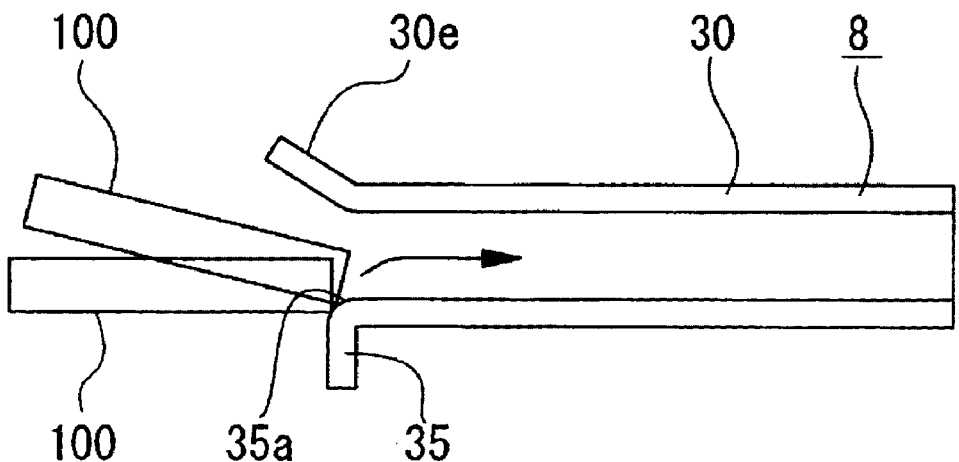

FIG. 19 is a view of a case where a recording medium cartridge is inserted into a holder while slightly tilted downward.

Figure 20:
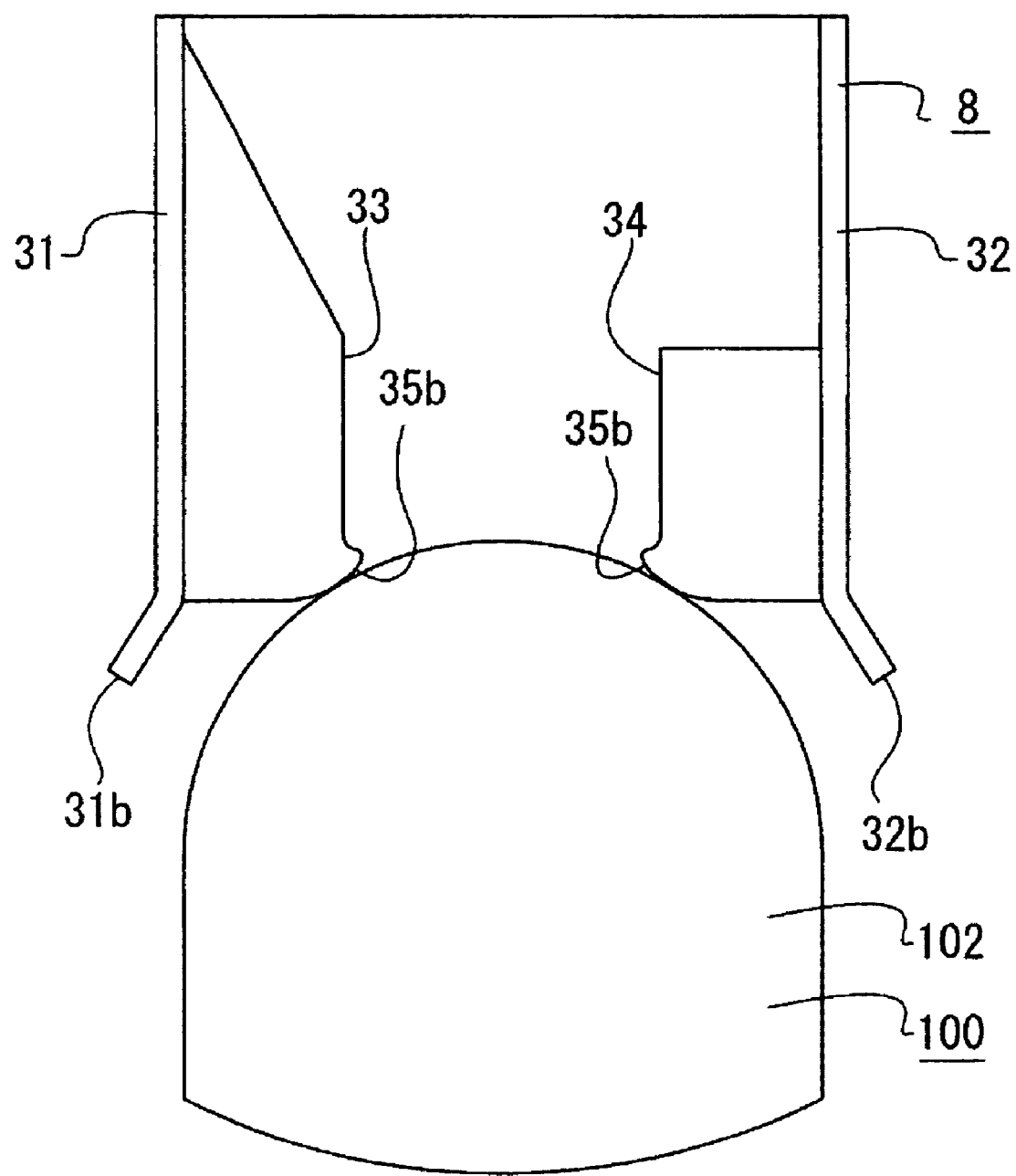
Figure 21:
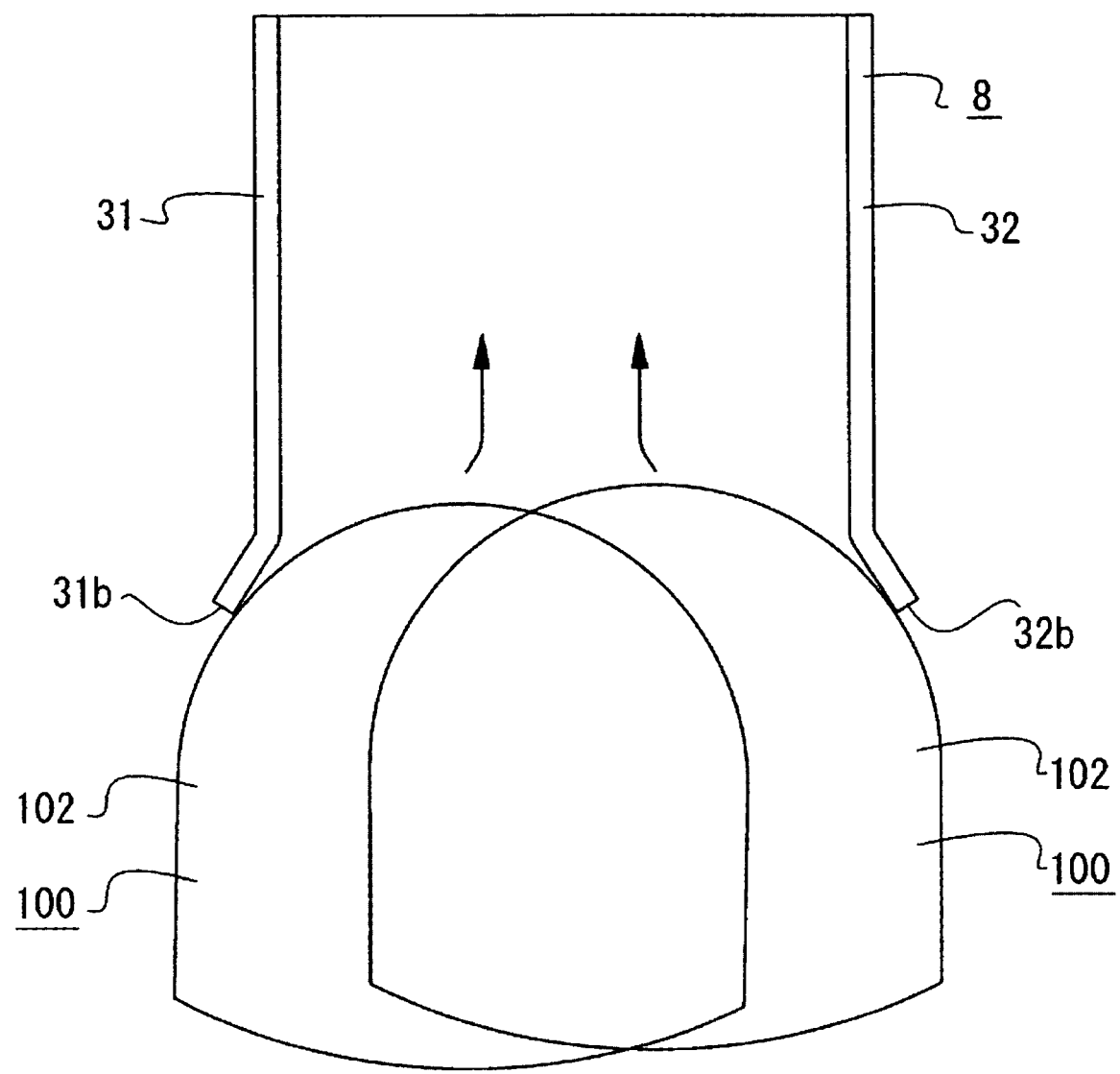

FIG. 20 is a view of a case where a recording medium cartridge contacts the receiving portions of the holder. FIG. 21 is a view of a case where a recording medium cartridge is inserted into a holder in the state where it is offset in the left-right direction or a state where it is tilted in the left-right direction.

Figure 22:
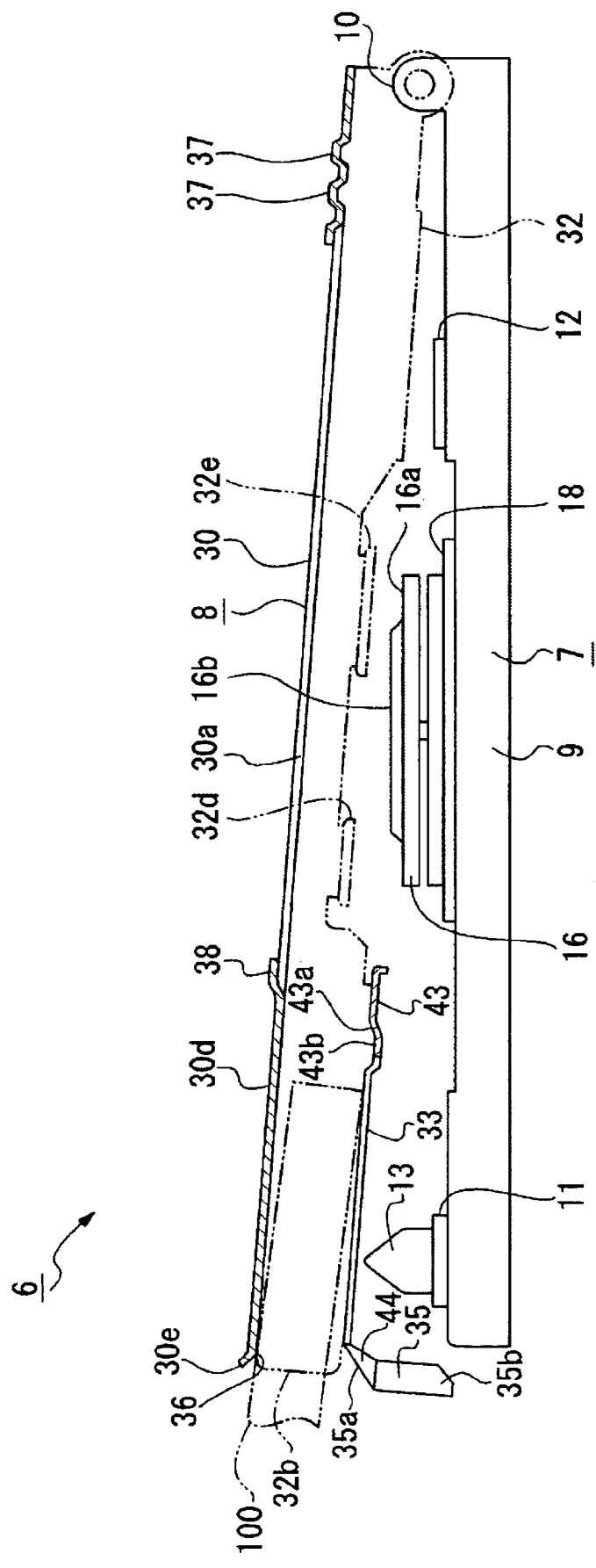
Figure 23:
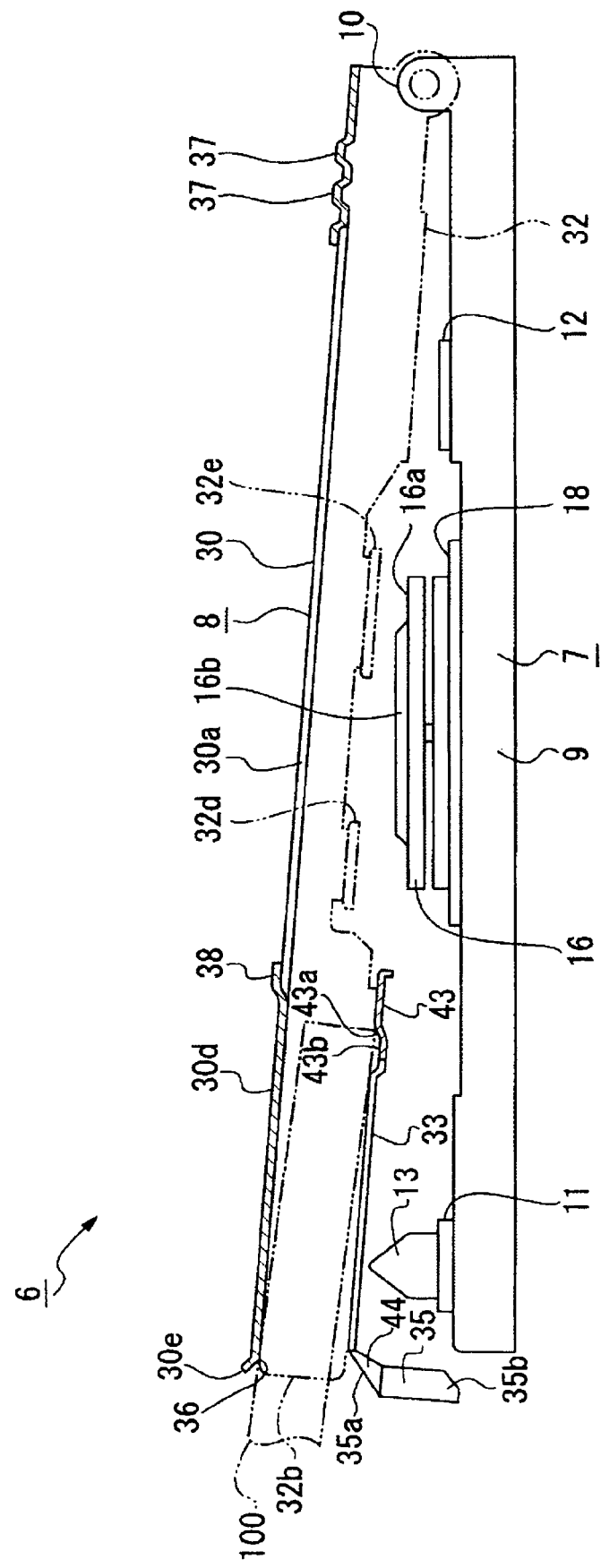

FIG. 22 is an enlarged side sectional view of a state where a recording medium cartridge is inserted into a holder in the state where it is tilted so that the rear portion is somewhat down with respect to the holder. FIG. 23 is an enlarged side view following FIG. 22, shown partially in cross-section, showing a state where the recording medium cartridge is inserted while being guided by the guide of the protrusion stopper.

Figure 24:
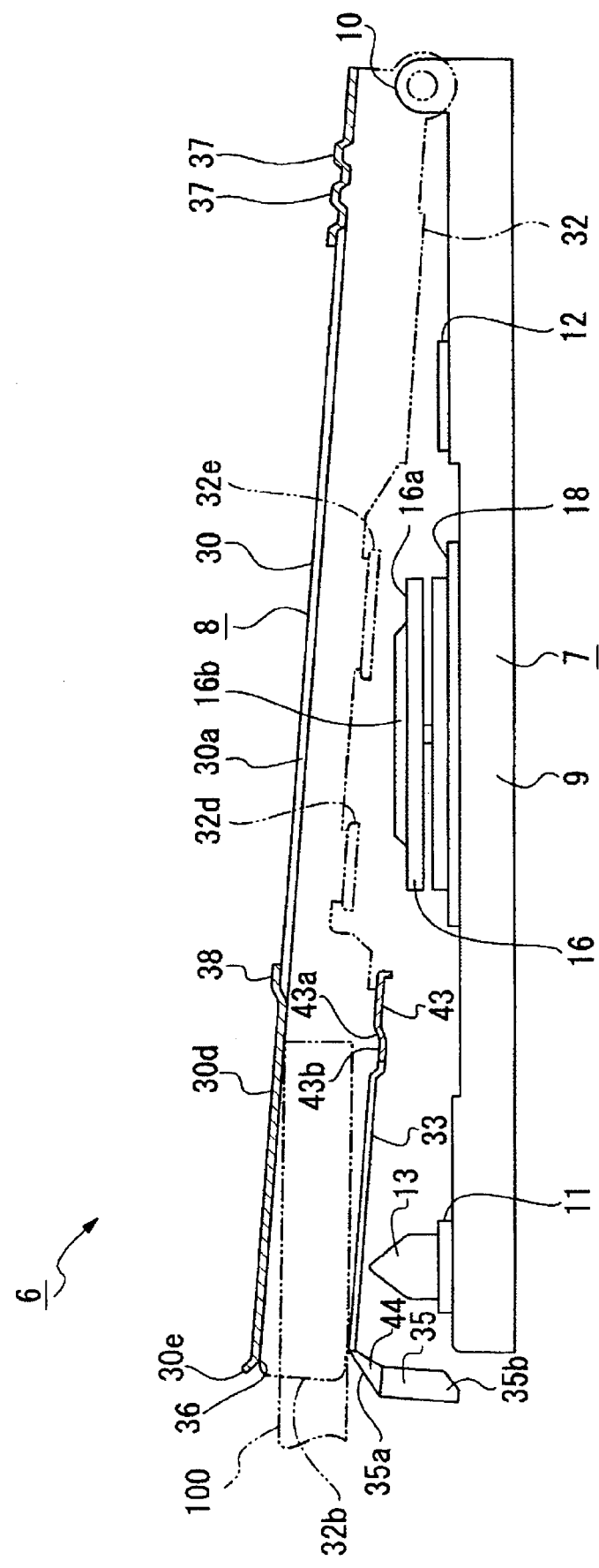
Figure 25:
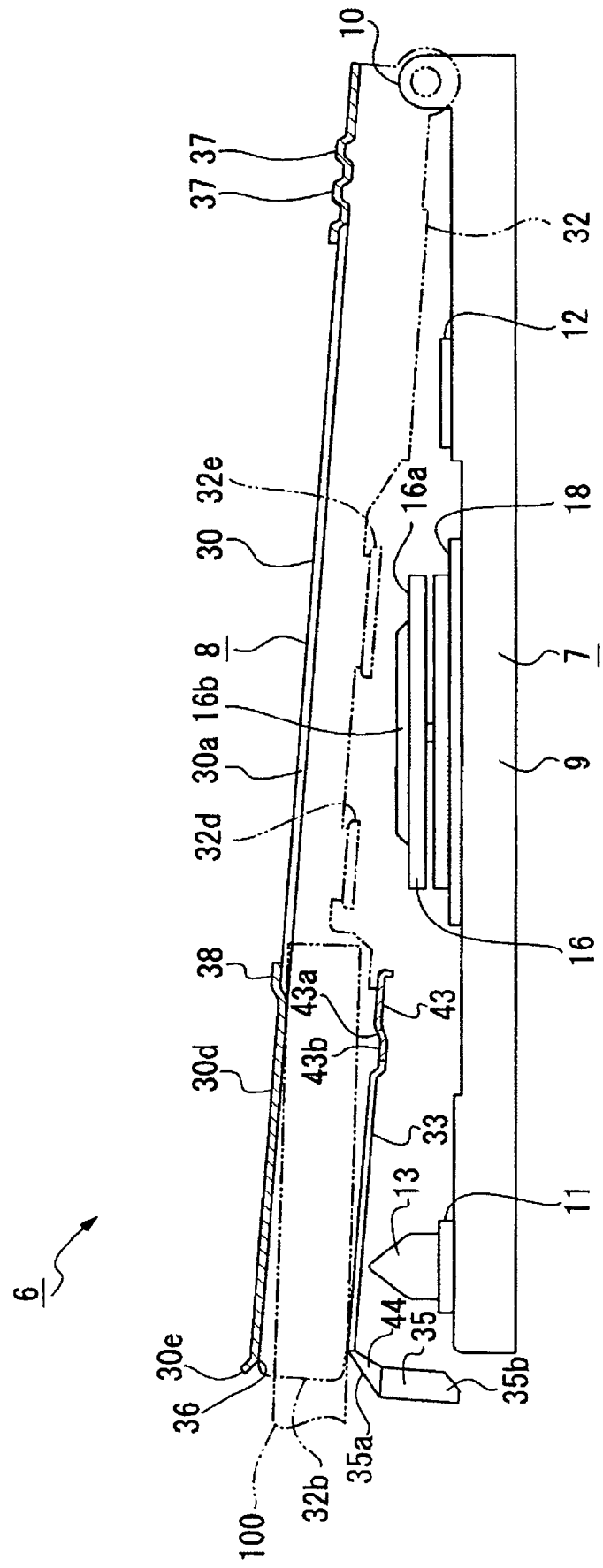

FIG. 24 is an enlarged side sectional view of a case where a recording medium cartridge is inserted into a holder in the state where it is tilted so that the rear portion is somewhat down with respect to the holder. FIG. 25 is an enlarged side view following FIG. 24, shown partially in cross-section, showing a state where the recording medium cartridge is inserted.

Figure 26:
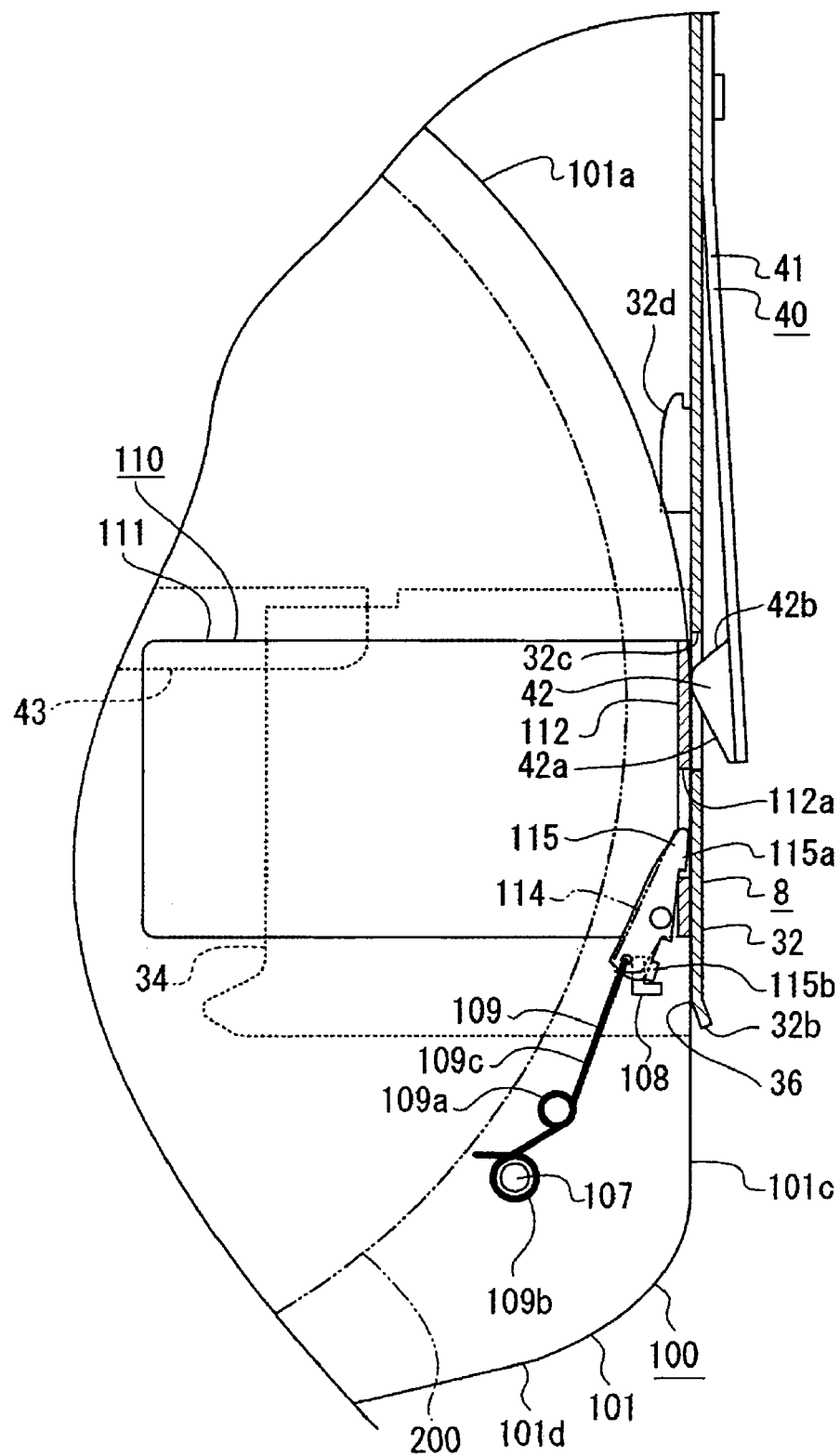
FIG. 26 to FIG. 33 are views illustrating various modes when a recording medium cartridge is inserted into a holder of a recording medium drive device.

FIG. 26 is an enlarged plan view, shown partially in cross-section, showing a state where a recording medium cartridge is inserted into a holder and an unlocking projection piece of the shutter spring runs above the shutter.

Figure 27:
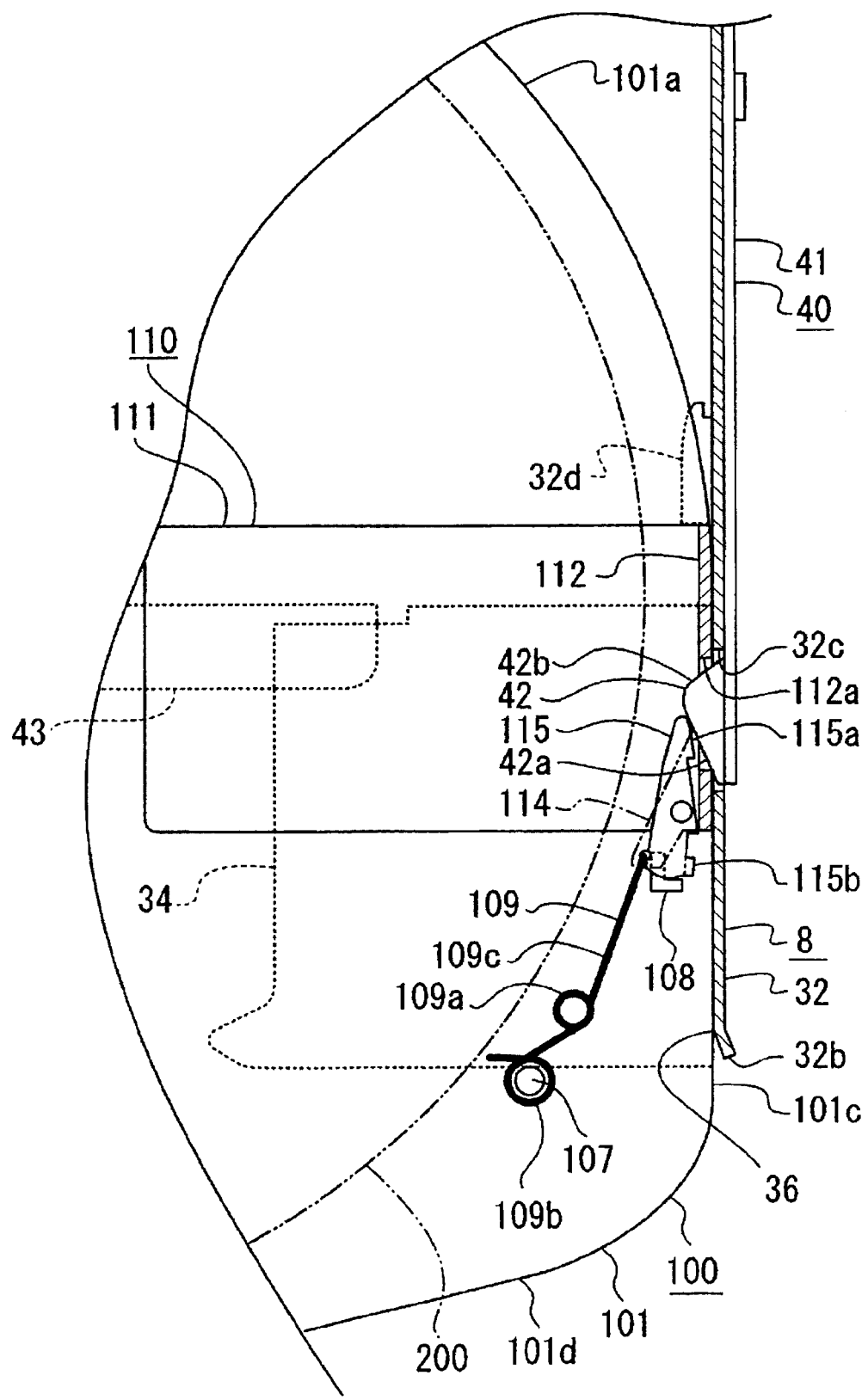

FIG. 27 is an enlarged plan view, shown partially in cross-section, showing a state where the lock at the closing position of the shutter is released.

Figure 28:
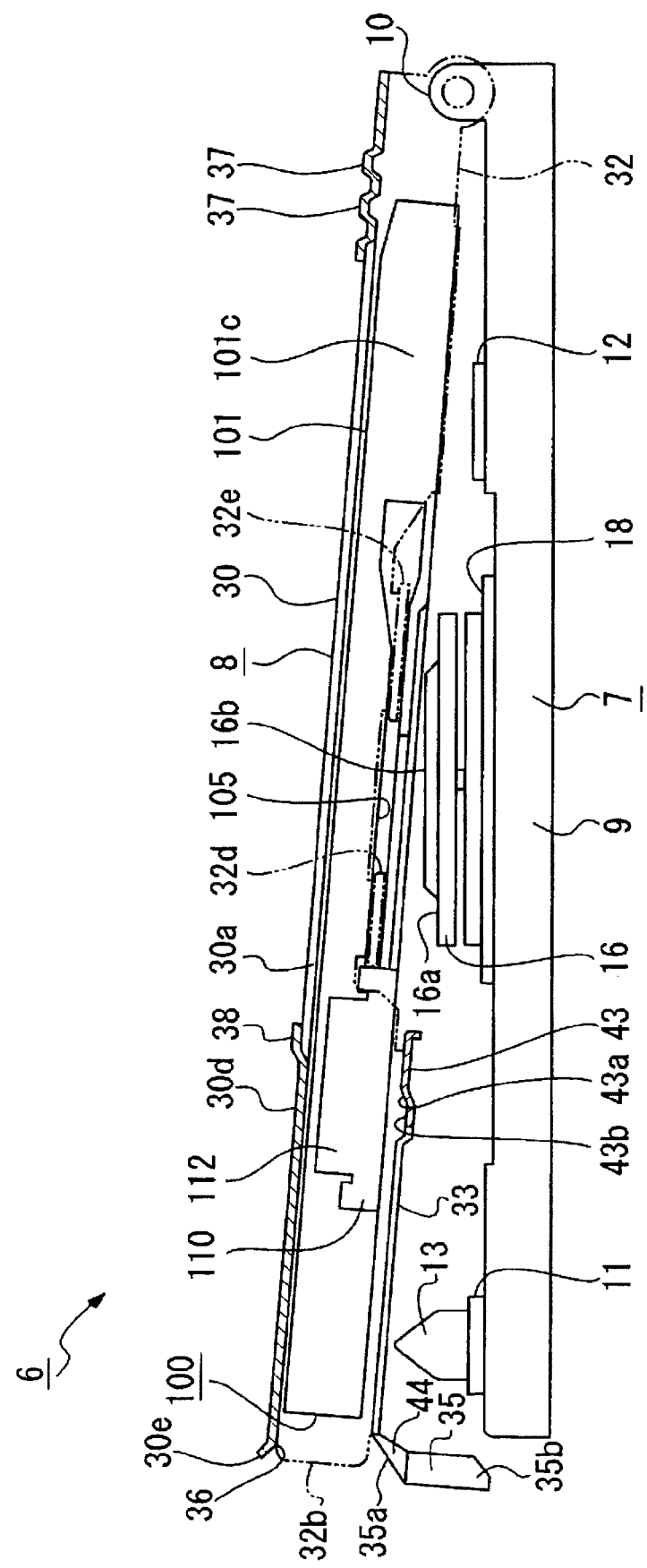

FIG. 28 is an enlarged side view, shown partially in cross-section, showing a state where the shutter opening piece and the posture holding piece are inserted into the insertion groove.

Figure 29:
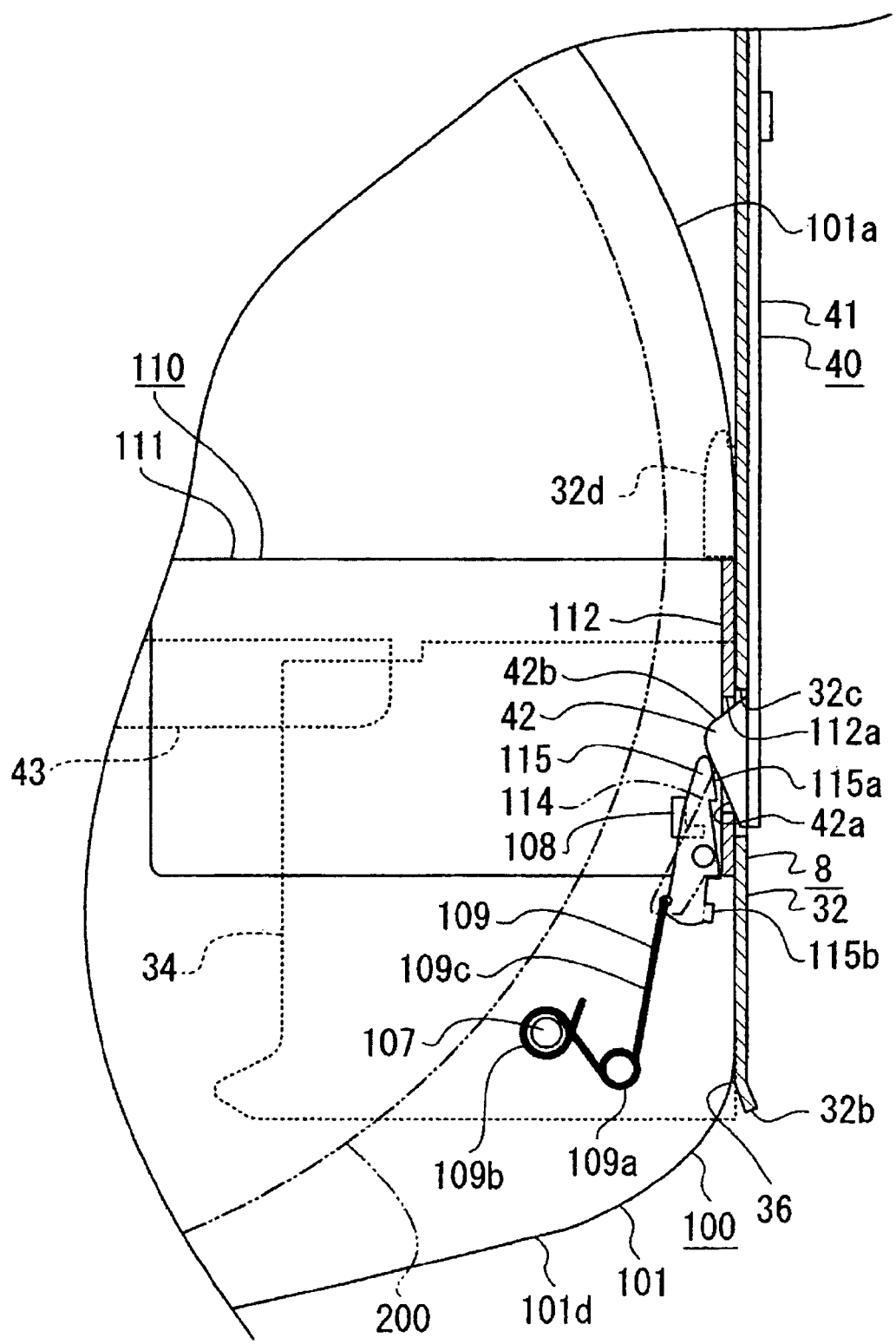

FIG. 29 is an enlarged plan view, shown partially in cross-section, showing part of the state in the middle of the opening of the shutter.

Figure 30:
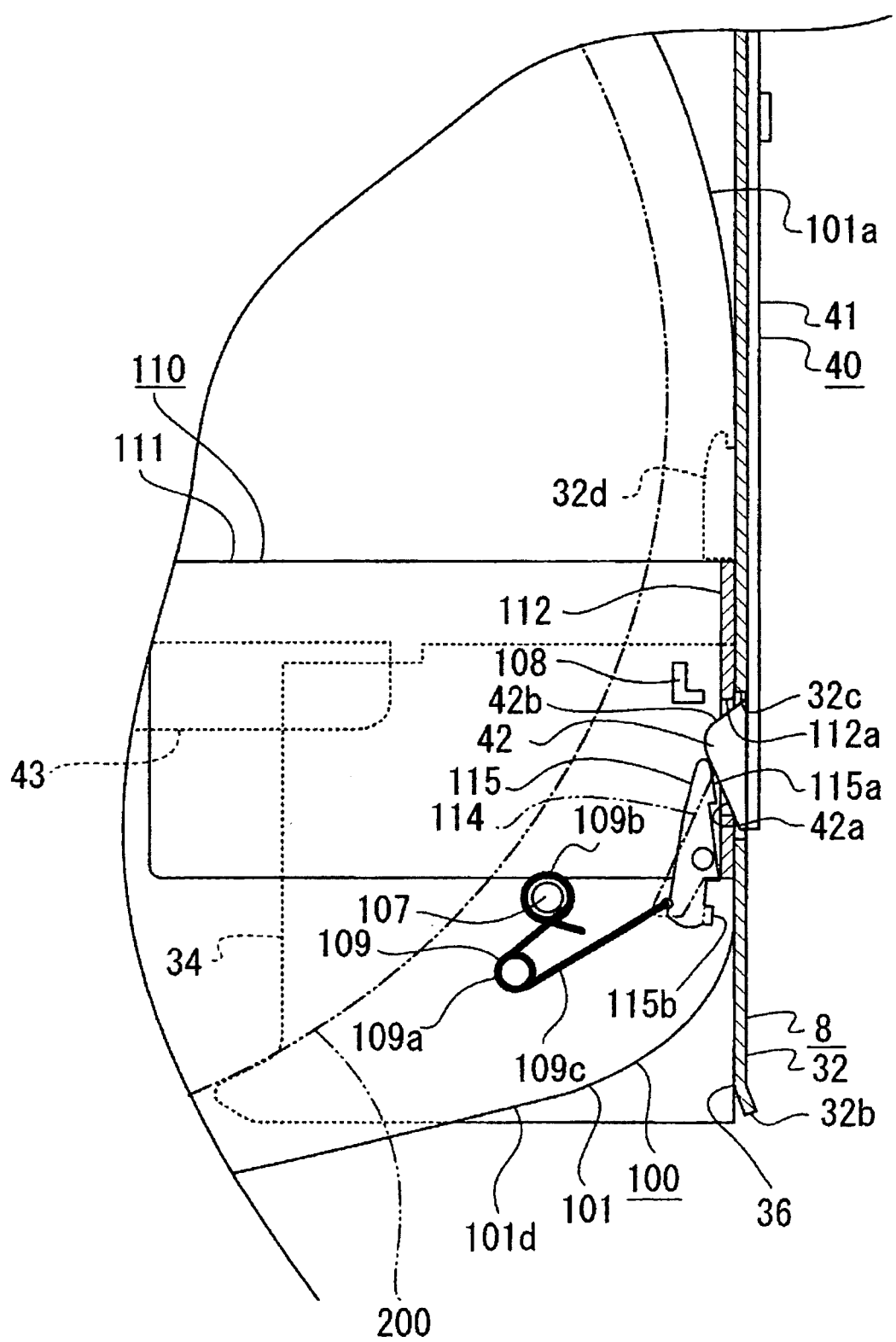

FIG. 30 is an enlarged plan view, shown partially in cross-section, showing a state where the shutter is moved up to the opening position.

Figure 31:
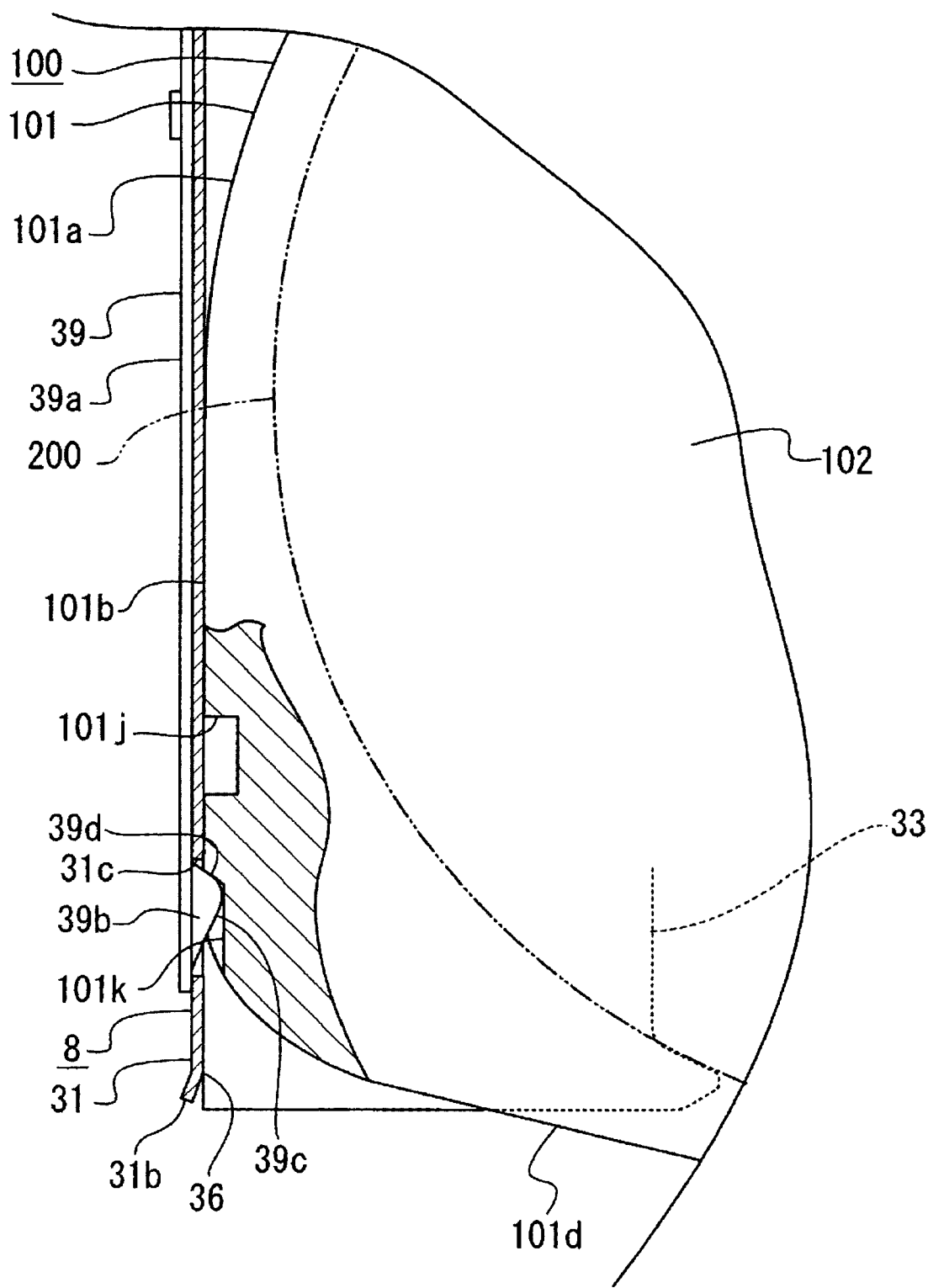

FIG. 31 is an enlarged plan view, shown partially in cross-section, showing a state where an engagement projection of a protrusion prevention spring is engaged with an engagement recess of the recording medium cartridge.

Figure 32:
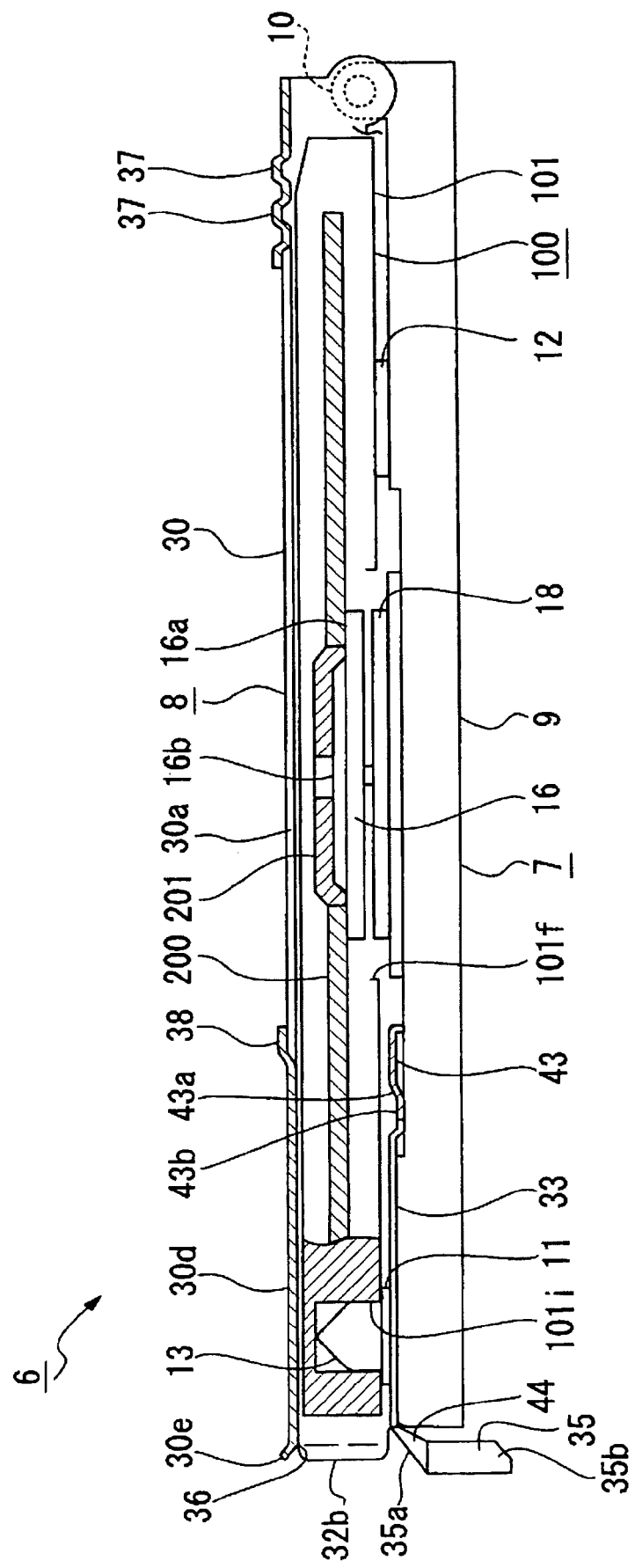

FIG. 32 is an enlarged side view, shown partially in cross-section, showing a state where the recording medium cartridge is positioned and the disk-shaped recording medium is mounted on the disk table.

Figure 33:
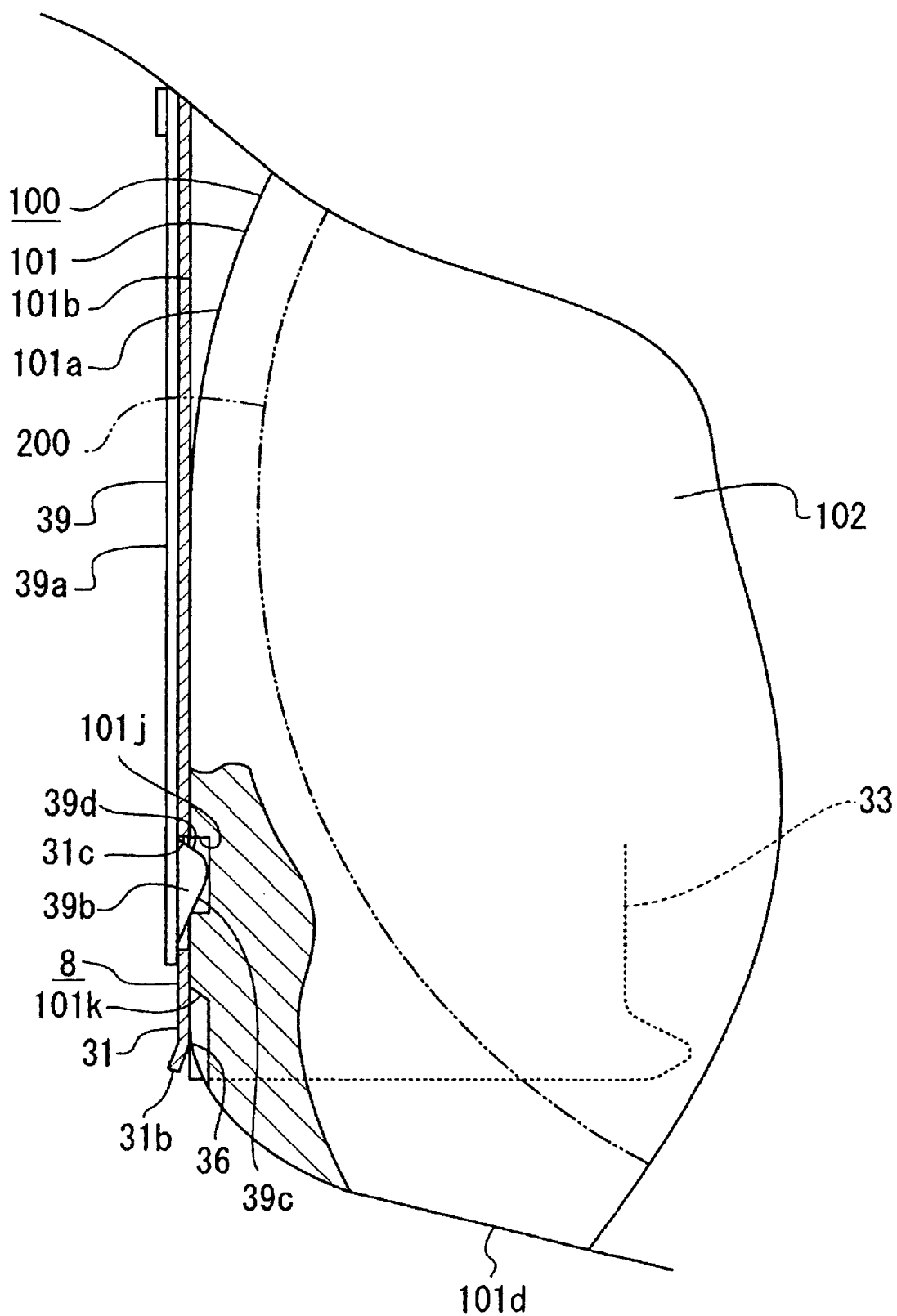

FIG. 33 is an enlarged plan view, shown partially in cross-section, showing a state where the engagement projection of the protrusion prevention spring is engaged with a relief recess of the recording medium cartridge.

In the state where a recording medium cartridge 100 is inserted into the holder 8 of the recording medium drive device, an engagement projection 115*b* of a lock lever 115 of the shutter 110 is engaged with the locking projection 108 provided in the mechanism portion 106 of the case 101 (FIG. 5), and the shutter 110 is locked at the closing position for closing the light transparent hole 101*h*.

When opening the lid 5 of the electronic apparatus 1, the holder 8 is simultaneously pivoted with respect to the chassis 7 and enters a state where insertion of the recording medium cartridge 100 is possible (FIG. 8).

At the time of start of the insertion of a recording medium cartridge 100 into the holder 8 of the recording medium drive device, for example, as shown in FIG. 18, when the recording medium cartridge 100 is tilted slightly upward with respect to the holder 8, the circumferential edge of the case 101 of the recording medium cartridge 100 slidingly contacts the dual-purpose reinforcing rib 30*e* formed at the front end of the connection surface 30, and the recording medium cartridge 100 is guided into the holder 8. Accordingly, the recording medium cartridge 100 can be smoothly inserted into the holder 8.

At the start of the insertion of a recording medium cartridge 100 into the holder 8, for example, as shown in FIG. 19, when the recording medium cartridge 100 is tilted slightly downward with respect to the holder 8, the circumferential edge of the case 101 of the recording medium cartridge 100 slidingly contacts the guide surfaces 35*a* and 35*a* or the guide surfaces 44, 44 (FIG. 14) formed at the upper ends of the receiving surfaces 35, 35, and the recording medium cartridge 100 is guided into the holder 8. As a result, the recording medium cartridge 100 can be smoothly inserted into the holder 8.

At the start of the insertion of a recording medium cartridge 100 into the holder 8, when the recording medium cartridge 100 is tilted further downward with respect to the holder 8, as shown in FIG. 20, the arc surface 101*a* of the case 101 contacts the receiving portions 35*b*, 35*b* formed at the inside ends of the receiving surfaces 35 and 35, so the recording medium cartridge 100 is not inserted into the holder 8. As a result, the user can recognize that the recording medium cartridge 100 was erroneously inserted into the holder 8. Further, the receiving portions 35*b*, 35*b* are formed as genteelly curved surfaces bent backward, so damage and scratching of the receiving surfaces 35, 35 and the case 101 can be prevented.

At the start of the insertion of a recording medium cartridge 100 into the holder 8, for example, as shown in FIG. 21, when the recording medium cartridge 100 is offset in the left-right direction with respect to the holder 8 or tilted in the left-right direction, the arc surface 101*a* of the case 101 slidingly contacts the insertion guides 31*b* and 32*b* formed at the front ends of the sides 31 and 32, and the recording medium cartridge 100 is guided into the holder 8.

Even when the insertion guides 31*b* and 32*b* are not provided at the sides 31 and 32 of the holder 8, at the time of the start of the insertion of the recording medium cartridge 100 into the holder 8, when the recording medium cartridge 100 is offset in the left-right direction or tilted in the left-right direction with respect to the holder 8, the recording medium cartridge 100 slidingly contacts the front edges of the sides 112, 112, so the recording medium cartridge 100 is guided into the holder 8.

The recording medium cartridge 100 is inserted into the holder 8 from the arc surface 101*a* side as described above, but there is space between the projection surfaces 33 and 34 and the case 101 has the arc surface 101*a*, therefore, as shown in FIG. 22, sometimes the recording medium cartridge 100 is tilted in a state where the rear portion is somewhat down with respect to the holder 8. However, due to contact of the recording medium cartridge 100 with the protrusion stopper 43 bridging the projection surfaces 33 and 34, protrusion toward the bottom of the holder 8 is prevented. Further, since the protrusion stopper 43 is arranged immediately in front of the recording/reproduction unit constituted by the optical pickup 18, the disk table 16, etc. as described above, contact between the case 101 and the recording/reproduction unit is avoided and improvement of the reliability of the recording/reproduction operation by the recording/reproduction unit can be achieved. In addition, the protrusion stopper 43 is provided at approximately the center portion between the sides 31 and 32 of the holder 8, therefore the portion most easily protruding down in the case 101, that is the center portion in the left-right direction, contacts the protrusion stopper 43, so the downward protrusion of the recording medium cartridge 100 from the space between the projection surfaces 33 and 34 can be reliably prevented.

When the recording medium cartridge 100 is inserted into the holder 8 and contacts the protrusion stopper 43, as illustrated in FIG. 23, the case 101 successively slidingly contacts the second guide 43*b* and the first guide 43*a* of the protrusion stopper 43 and is guided backward. As a result, due to the contact of the case 101 with the protrusion stopper 43, insertion of the recording medium cartridge 100 into the holder 8 can be suitably and reliably carried out without obstruction of smooth movement of the recording medium cartridge 100 in the holder 8.

Conversely to the above description, sometimes the recording medium cartridge 100 is tilted in a state where the rear portion is slightly up when inserted into the holder 8 as shown in FIG. 24. At this time, the end edge of the upper side of the arc surface 101*a* of the case 101 slidingly contacts the bottom surface of the center portion in the left-right direction of the connection surface 30, that is, the bottom surface of the portion 30*d*, but no recessed reinforcing rib 37 is formed at the portion 30*d*. As a result, the end edge of the upper side of the case 101 will not enter into any recessed reinforcing rib 37 and obstruct smooth movement of the recording medium cartridge 100 in the holder 8. The recording medium cartridge 100 can be suitably and reliably inserted into the holder 8 while maintaining at least a constant strength of the holder 8.

Further, as illustrated in FIG. 25, the opening side reinforcing rib 38 formed at the opening edge of the opening 30*a* of the connection surface 30 is formed so as to be projected on the opposite side to the first and second projection surfaces 33 and 34, therefore the end edge of upper side of the case 101 does not contact the opening side reinforcing rib 38 and smooth movement of the recording medium cartridge 100 in the holder 8 can be secured.

In FIG. 26, when the recording medium cartridge 100 is further inserted into the holder 8, the shutter opening piece 32*d* provided at the side 32 of the holder 8 is inserted into the insertion groove 105 of the recording medium cartridge 100.

At this time, the unlocking projection piece 42 of the shutter spring 40 attached to the side 32 of the holder 8 rides up above the outer surface of the side 112 of the shutter 110 and slides on the side 112. As a result, the shutter spring 40 is resiliently deformed.

As illustrated in FIG. 27, when the recording medium cartridge 100 is further inserted into the holder 8, the shutter opening piece 32d contacts the rear edge of the side 112 of the shutter 110. Simultaneously, the unlocking projection piece 42 riding up on the side 112 of the shutter 110 is inserted into the function hole 112a by the elastic restoration of the spring 41. When the unlocking projection piece 42 is inserted into the function hole 112a, the pushed part 115a of the lock lever 115 is pressed by the unlocking projection piece 42, and the lock lever 115 is pivoted against the biasing force of the bias spring. As a result, the engagement of the engagement projection 115b with the locking projection 108 is released, and the locking at the closing position of the shutter 110 is released.

At this time, as illustrated in FIG. 28, into the insertion groove 105 formed in the case 101 is inserted, in addition to the shutter opening piece 32d, the posture holding piece 32e provided in the rear portion thereof. As a result, the shutter opening piece 32d and the posture holding piece 32e hold the recording medium cartridge 100 horizontally in the holder 8, so a suitable state of insertion of the recording medium cartridge 100 can be secured.

Further, the shutter opening piece 32d functions, other than a unit for opening the shutter 110, as a unit for holding the posture of the recording medium cartridge 100 in the holder 8, so an improvement of the functionality can be achieved while achieving a reduction of the number of parts.

As illustrated in FIG. 29, when the lock at the closing position of the shutter 110 is released, the shutter opening piece 32d contacts the rear edge of the side 112, therefore, when the recording medium cartridge 100 is further inserted into the holder 8 from this, the shutter 110 is moved relatively forward with respect to the case 101, and the shutter 110 is opened.

When the recording medium cartridge 100 is inserted into the holder 8, the engagement projection 39b of the protrusion prevention spring 39 is temporarily inserted into the engagement recess 101j formed in the side 101b, but the opening edge of the front side of the engagement recess 101j sliding contacts the first inclined edge 39c of the engagement projection 39b by the backward movement of the recording medium cartridge 100, the spring 39a is deflected outward, and the engagement projection 39b is taken out of the engagement recess 101j.

As illustrated in FIG. 30, in the state where the recording medium cartridge 100 finishes being inserted into the holder 8, the shutter 110 is moved up to the opening position. As described above, the shutter 110 is biased in the inverse direction to the above insertion direction by the toggle spring 109, and the shutter 110 is held at the opening position.

As illustrated in FIG. 31, in the state where the recording medium cartridge 100 finishes being inserted into the holder 8, the engagement projection 39b of the protrusion prevention spring 39 is inserted into the relief recess 101k formed in the side 101b. As a result, the biasing force of the protrusion prevention spring 39 is not imparted to the case 101 of the recording medium cartridge 100, and the not required tension from the protrusion prevention spring 39 to the recording medium cartridge 100 can be prevented.

As illustrated in FIG. 32, when the recording medium cartridge 100 finishes being inserted into the holder 8 and the lid 5 of the outer housing 2 is closed, the holder 8 holding the recording medium cartridge 100 is pivoted in the direction approaching the chassis 7, the positioning pins 13 and 13 provided in the chassis 7 are inserted into the positioning holes 101i and 101i formed in the case 101, and the recording medium cartridge 100 is positioned with respect to the chassis 7. At this time, the disk table 16 is inserted into the table hole 101f of the case 101, the core 201 of the recording medium 200 is magnetically attracted (fixed) to the magnet provided in the center ring projection 16b, and the recording medium 200 is mounted on the disk table 16.

The recording medium cartridge 100 is held in the state where the case 101 is pressed against the chassis 7 side by the tension plates portions 30c 30c, . . . provided in the connection surface 30 of the holder 8, and the bottom surface of the case 101 contacts the mounts 11, 11, 12, and 12 provided at the chassis 7.

The disk-shaped recording medium 200 mounted on the disk table 16 is rotated along with the disk table 16, the optical pick-up 18 is driven based on an instruction from the disk drive controlling part (not illustrated) of the electronic apparatus 1, and an information signal is recorded on the disk-shaped recording medium 200 or information recorded on the disk-shaped recording medium 200 is read. The information to be recorded on the disk-shaped recording medium 200 is supplied from the signal processing part (not illustrated) of the electronic apparatus 1, while the information read out from the disk-shaped recording medium 200 is input to the signal processing unit and used for the desired signal processing.

When recording or reproduction of the information signal with respect to the disk-shaped recording medium 100 ends and the lid 5 of the electronic apparatus 1 is opened again, the holder 8 is pivoted to the side where it is away from the chassis 7, and the mounting of the recording medium 200 on the disk table 16 is released. At this time, the arc surface 101a of the case 101 is pressed by a not illustrated inject lever supported upon the chassis 7, and part of the recording medium cartridge 100 is projected to the front side from the holder 8. At this time, in the shutter 110, the unlocking projection piece 42 of the shutter spring 40 is inserted into the function hole 112a, therefore, by the projection of part of the recording medium cartridge 100 to the front side from the holder 8, the case 101 is moved front with respect to the shutter 110, and the shutter 110 is moved from the opening position to the closing position.

As described above, when the lid 5 is opened and the recording medium cartridge 100 is pressed by the inject lever and projected to the front side from the holder 8, the spring 39a of the protrusion prevention spring 39 is resiliently deformed due to the front movement of the recording medium cartridge 100, and the engagement projection 39b is taken out of the relief recess 101k formed in the side 101b. Thereafter, as illustrated in FIG. 33, when the engagement projection 39b is located facing the engagement recess 101j formed in the side 101b, the engagement projection 39b is engaged with the engagement recess 101j.

In the state where the engagement projection 39b is engaged with the engagement recess 101j, the pressing force from the inject lever with respect to the recording medium cartridge 100 has not already been imparted. By the engagement of the engagement projection 39b with the engagement recess 101j, the forward movement of the recording medium cartridge 100 is stopped. As a result, the recording medium cartridge 100 is brought to a state where only part is projected from the holder 8, and protrusion of the recording medium cartridge 100 from the holder 8 over the required level is prevented.

The user can grip the portion of the recording medium cartridge 100 projecting from the holder 8 and pull it to take out the recording medium cartridge 100 from the holder 8. At this time, by pulling the unlocking projection piece 42 out of the function hole 112a, the lock lever 115 is pivoted by the biasing force of the bias spring, the engagement projection 115b is engaged with the locking projection 108, and the shutter 110 is locked at the closing position again.

The second inclined edge 39d of the protrusion prevention spring 39 slidingly contacts the opening edge of the engagement recess 101j and the engagement projection 39b slidingly contacts the side 101b so that the recording medium cartridge 100 is taken out of the holder 8.

Prevention of Erroneous Insertion of Recording Medium Cartridge into Holder

Figure 34:
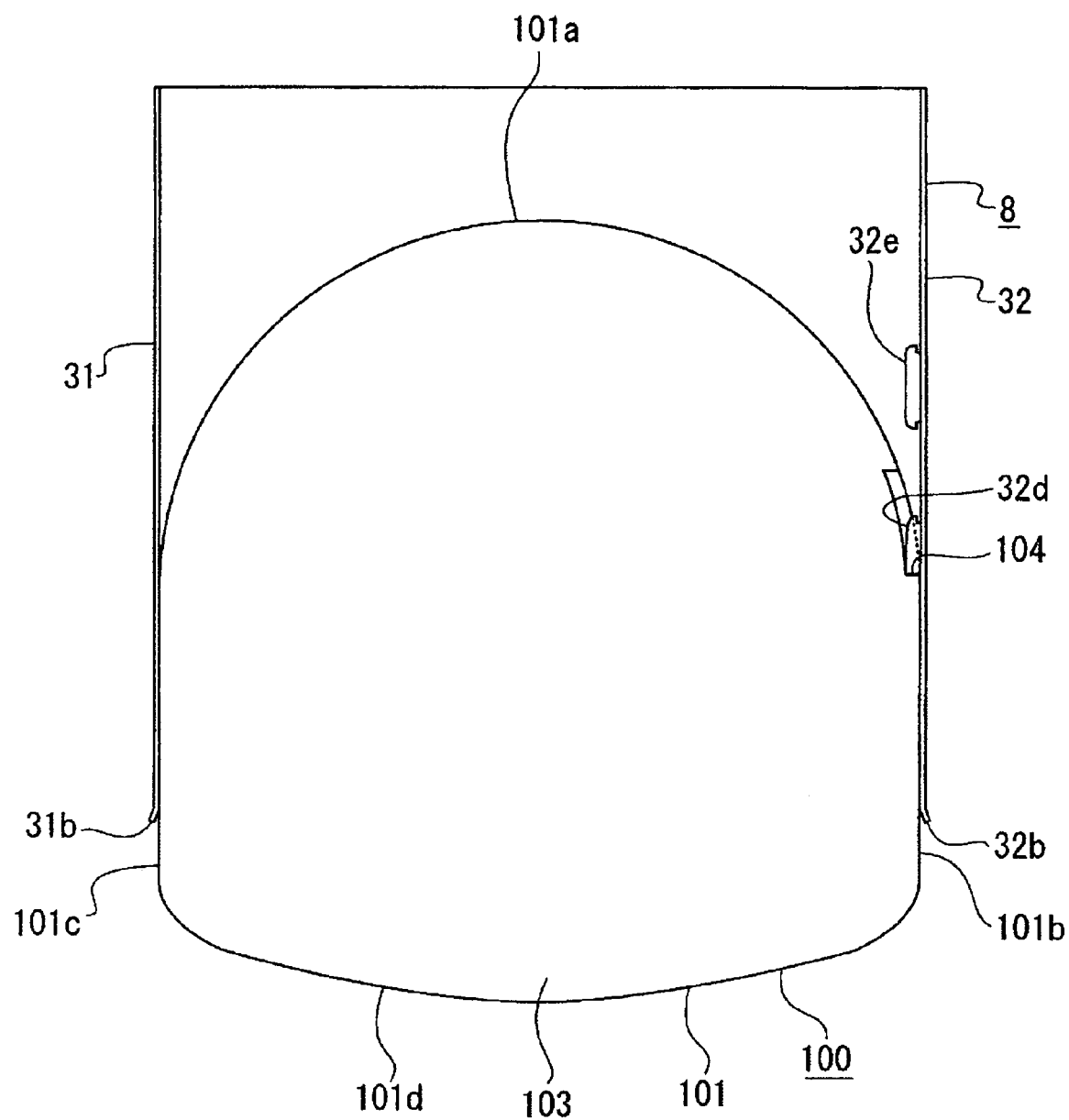
FIG. 34 to FIG. 36 are views of the state when a recording medium cartridge of an embodiment of the present invention is erroneously inserted into a holder of a recording medium drive device.
Figure 35:
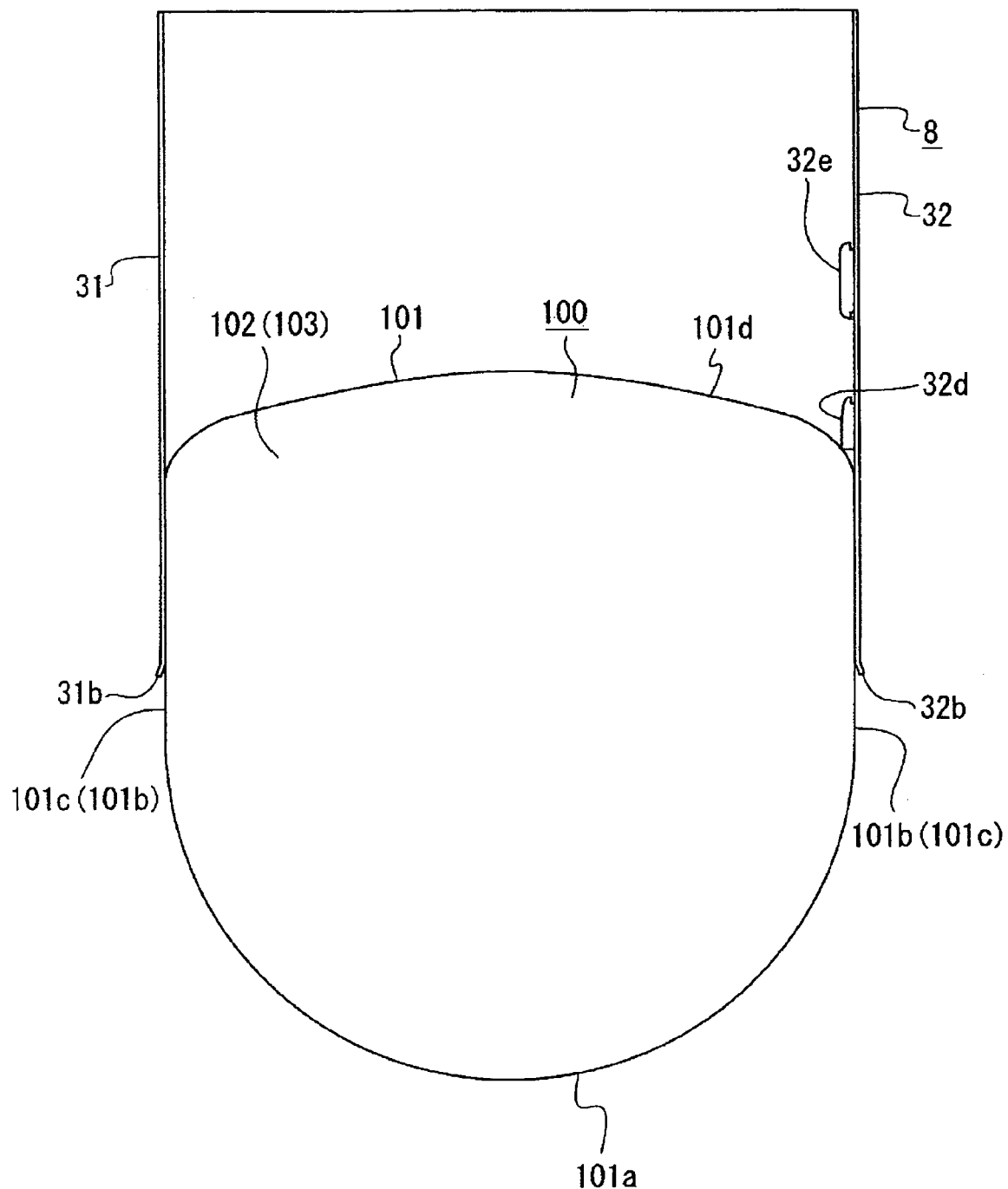
Figure 36:
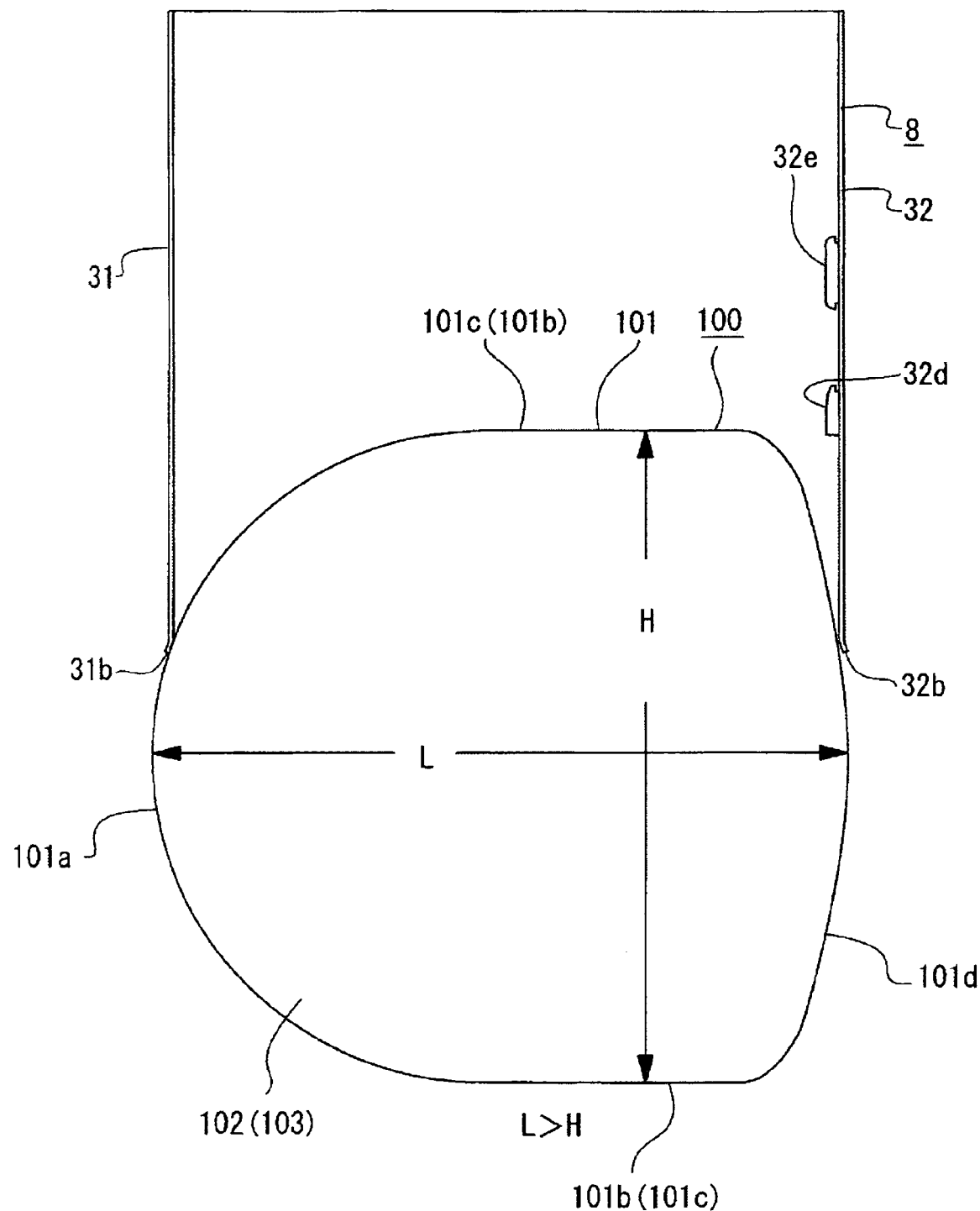

Referring to FIG. 34 to FIG. 36, the unit for preventing erroneous insertion of the recording medium cartridge 100 into the holder 8 will be described.

FIG. 34 is a view illustrating a case where the recording medium cartridge of the present embodiment is inserted into the holder of the recording medium drive device in a state just turned upside down.

FIG. 35 is a view showing a case where the recording medium cartridge of the present embodiment is inserted into the holder of the recording medium drive device in a state reversed in front-back direction.

FIG. 36 is a view showing a case where the recording medium cartridge of the present embodiment is inserted into the holder of the recording medium drive device in a state turned to the side.

Referring to FIG. 34, first the unit for preventing erroneous insertion in a state where the recording medium cartridge 100 is just turned upside down, that is, the upper shell 102 is located at the bottom and the lower shell 103 is located at the top, and the recording medium cartridge 100 is inserted into the holder 8 from the arc surface 101a side will be described.

When the recording medium cartridge 100 is inserted into the holder 8 in the state just turned upside down, the shutter opening piece 32d slidingly contacts the opening edge of the function expansion groove 104 formed in the arc surface 101a, so further insertion of the recording medium cartridge 100 into the holder 8 is stopped.

In this way, in the recording medium drive device 6, the shutter opening piece 32d for opening the shutter 110 of the recording medium cartridge 100 is used as the unit for preventing erroneous insertion, therefore it is not necessary to provide another special unit for preventing erroneous insertion, so a reduction of the manufacturing cost can be achieved.

Further, the function expansion groove 104 able to achieve an expansion of the function as the recording medium cartridge is used for preventing erroneous insertion of the recording medium cartridge 100, therefore the recording medium cartridge 100 is not necessary to provide special recess for preventing erroneous insertion thereof, so a reduction of the manufacturing cost can be achieved by that amount.

Referring to FIG. 35, the unit for preventing erroneous insertion in the state where recording medium cartridge 100 is reversed in front-back direction, that is, where the recording medium cartridge is inserted into the holder 8 from the curved surface 101d side, will be described. Note that, the up/down direction is not of concern here.

When the recording medium cartridge 100 is inserted into the holder 8 in the state reversed in front-back direction, one end of the curved surface 101d contacts the shutter opening piece 32d, so further insertion of the recording medium cartridge 100 into the holder 8 is stopped.

Referring to FIG. 36, the unit for preventing erroneous insertion in the state where the recording medium cartridge 100 is turned to the side, that is, when the recording medium cartridge is inserted into the holder 8 in the state where the arc surface 101a and the curved surface 101d are located at the left and right will be described. Note that, the up/down orientation is not of concern here.

Even if trying to insert the recording medium cartridge 100 into the holder 8 in the state, as described by referring to FIG. 1, since the first length L in the insertion direction A is formed slightly longer than the second length H in the direction perpendicular to the insertion direction A of the case 101 (L>H), the recording medium cartridge cannot be inserted into the holder 8 due to the difference between the first length L and the second length H.

Modifications of Recording Medium Cartridge

Referring to FIG. 37 to FIG. 42, a modification of the recording medium cartridge will be described.

A recording medium cartridge 300 according to this modification of the recording medium cartridge of the present invention differs from the recording medium cartridge 100 only in the points that the shutter is not provided and the shape of the right side is different and the shape of the bottom surface are different, therefore only the parts different from the recording medium cartridge 100 will be described in detail. The rest of the parts are assigned the same notations as in the recording medium cartridge 100, and detailed descriptions will be omitted.

Figure 37:
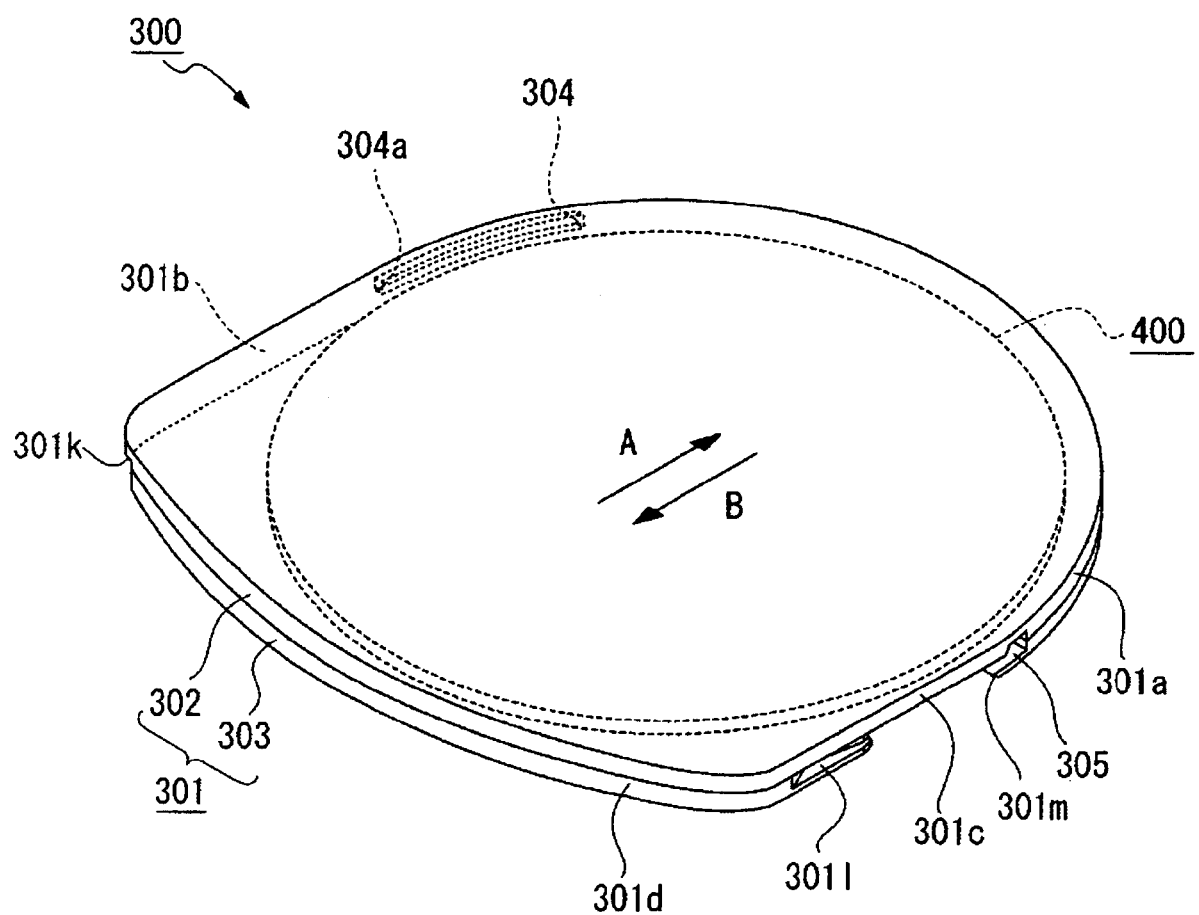
FIG. 37 to FIG. 42 are views illustrating modifications of the recording medium cartridge of an embodiment of the present invention.
Figure 38:
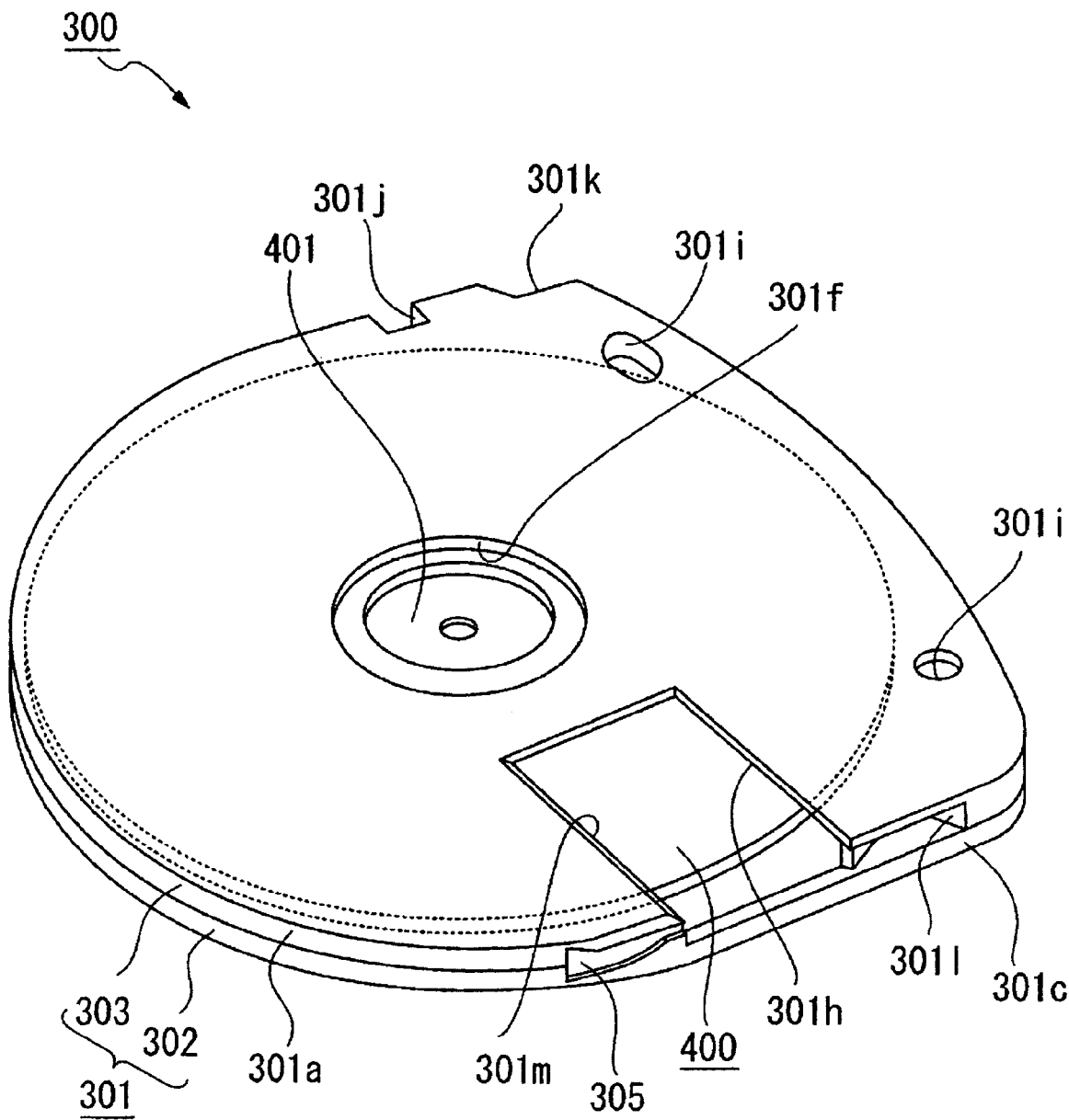
Figure 39:
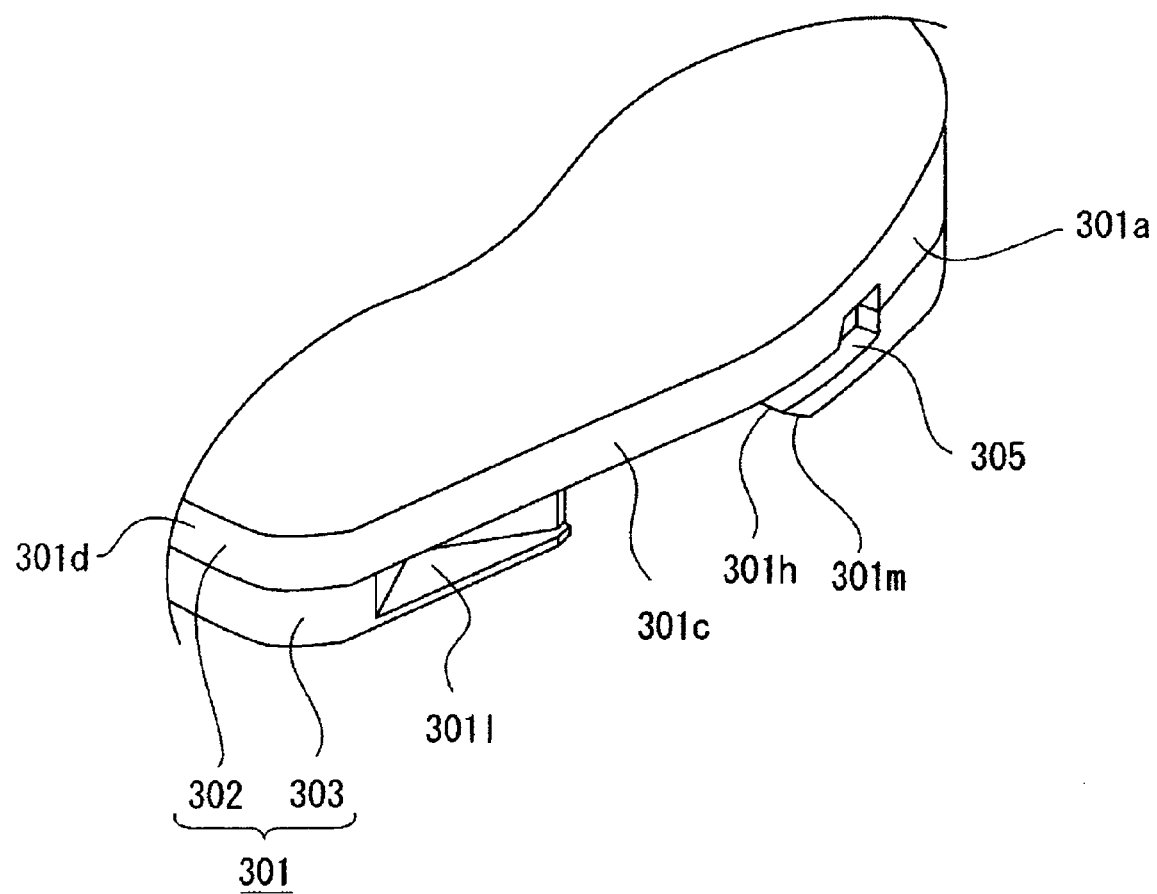

FIG. 37 is an enlarged perspective view of a modification of the recording medium cartridge, FIG. 38 is an enlarged perspective view of the back side of the recording medium cartridge, and FIG. 39 is an enlarged perspective view of part of the recording medium cartridge.

As illustrated in FIG. 37 and FIG. 38, the recording medium cartridge 300 of this modification includes a flat case 301 in which a disk-shaped recording medium 400 is rotatably accommodated.

The case 301 is formed by an upper shell 302 and a lower shell 303 vertically connected to each other. A half portion of the case 301 in the insertion direction A is formed in an approximately semi-circular shape, while the circumferential surface thereof is formed as an arc surface 301a. The half portion in the eject direction B of the case 301 is formed in as a laterally long shape where the surfaces connected to the two ends of the arc surface 301a are formed as sides 301b and 301c extending in the insertion and eject direction A and B. The circumferential surface between the ends of the side 301b and the side 301c at the back of the recording medium 400 is formed as a curved surface 301d forming a gentle outward curve.

The arc surface 301a of the case 301 is formed with a function expansion groove 304 of the recording medium cartridge at a position nearer the left side 301b. An opening edge 304a on the side 301b side of the function expansion groove 304 is located at the connecting portion of the arc surface 301a and the side 301b.

In the case 301 of the recording medium cartridge 300, as shown in FIG. 38, a table hole 301f is formed in the center portion of the bottom surface thereof, and a light transparent hole 301h is formed at the right of the table hole 301f of the bottom surface. The light transparent hole 301h is made larger than the light transparent hole 101h in the recording medium cartridge 100.

Note that, when the recording medium 400 used is an optical recording medium such as an optical disk or magneto-optic disk, the light transparent hole 301h becomes the opening, but when the recording medium 400 used is a magnetic disk, for example, a hard disk, the magnetic flux passing hole becomes the opening.

The bottom surface of the case 301 is formed with positioning holes 301i and 301i at positions to the left and right in the vicinity of the curved surface 301d.

At the approximately center portion of the side 301b on the left side in the insertion direction A, an engagement recess 301j is formed. At the end (entrance of the recording medium 400) in the eject direction B opposite to the insertion direction A of the side 301b, a relief recess 301k is formed.

In FIG. 39, the side 301c on the right side is formed with an escape groove 301l opened sideward at a position connecting with the light transparent hole 301h in the eject direction B.

As illustrated in FIG. 38 and FIG. 39, at the opening edge of the light transparent hole 301h, the end on the insertion direction A side is formed as an inclined portion 301m offset more to the upper shell 302 side as it approaches the light transparent hole 301h.

In the case 301, the portion from the side 301c on the right side to the arc surface 301a is formed with an insertion groove 305 contiguous with the escape groove 301l. The insertion groove 305 is communicated with the light transparent hole 301h.

The center portion of the recording medium 400 accommodated inside the case 301 has a core 401 made of a magnetic metal material attached to it (FIG. 38). The core 401 is located facing the table hole 301f of the case 301.

Figure 40:
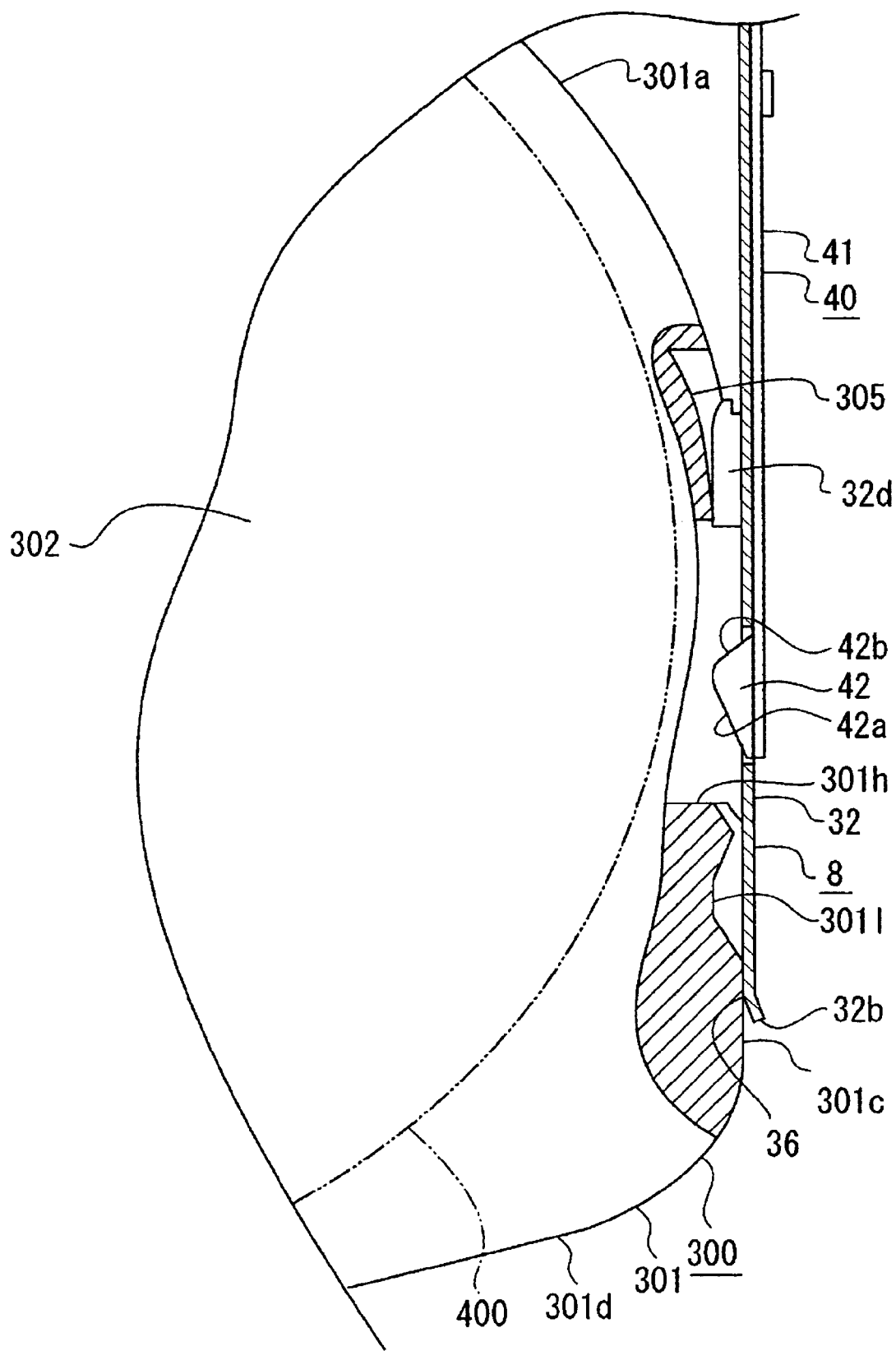
Figure 41:
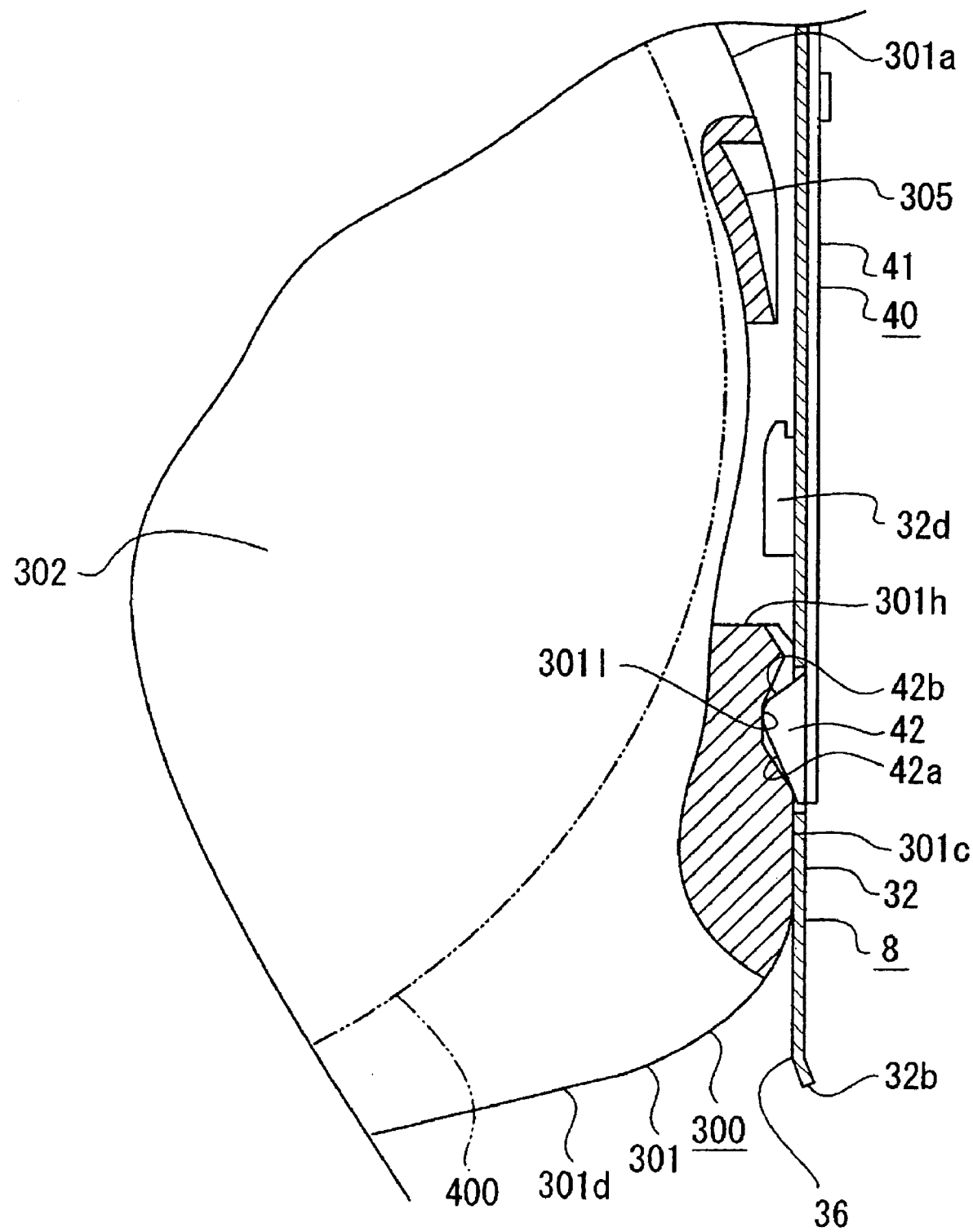
Figure 42:
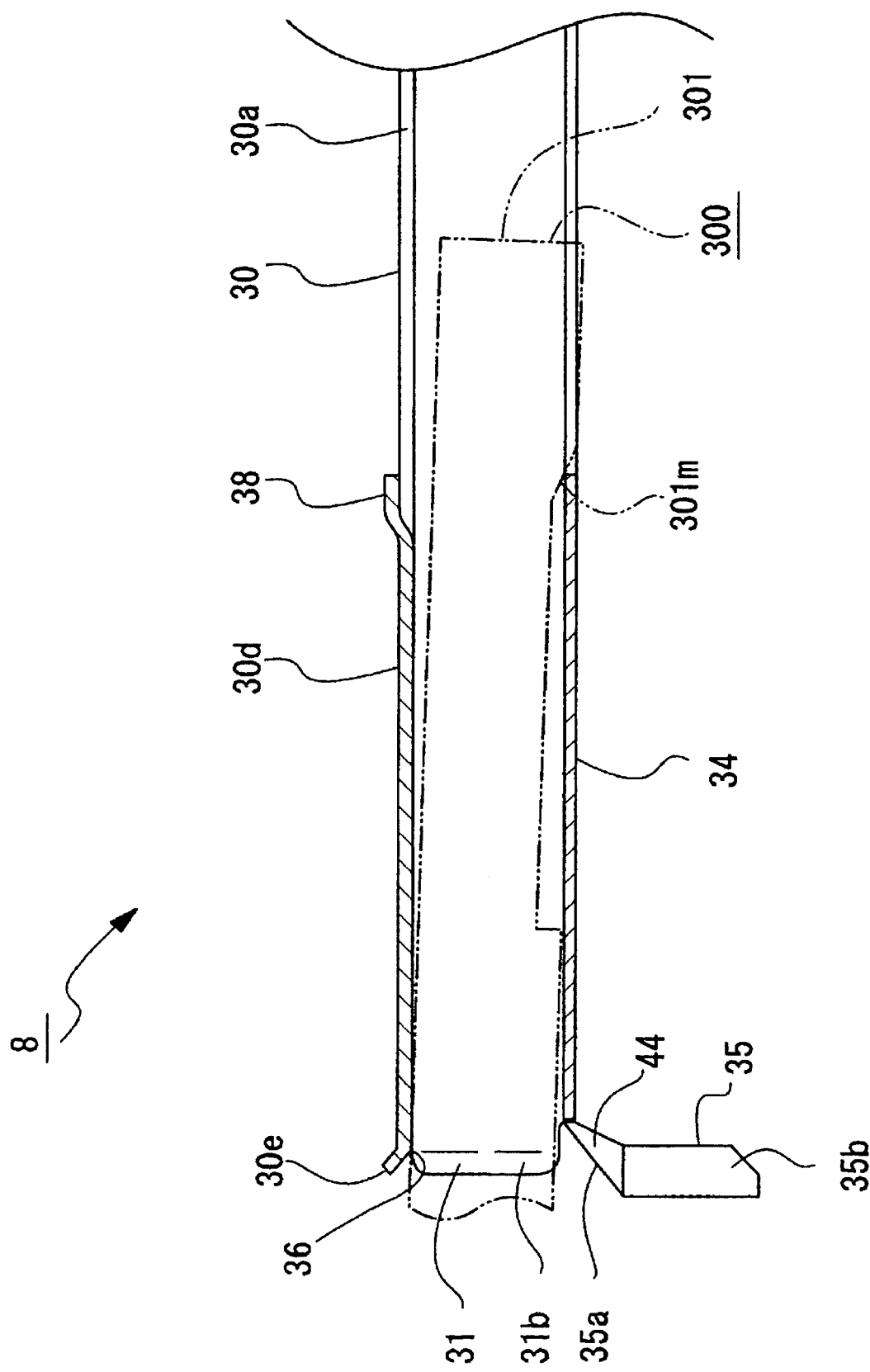

Referring to FIG. 40 to FIG. 42, the operations when the recording medium cartridge 300 is inserted into the holder 8 and when the recording medium cartridge 300 is taken out of the holder 8 will be described.

FIG. 40 is an enlarged plan view, shown partially in cross-section, showing a state where the unlocking projection of the shutter spring in the recording medium cartridge is inserted into the insertion groove, FIG. 41 is an enlarged plan view, shown partially in cross-section, showing a state where the unlocking projection of the shutter spring is inserted into the escape groove, and FIG. 42 is an enlarged side view, shown partially in cross-section, showing a state where the inclined portion of the case slidingly contacts the projection surface.

Note that, when describing the operation relating to the recording medium cartridge 300, the recording medium cartridge 300 does not have a shutter, so there is no operation relating to the shutter, so only the operation different from the operation for the recording medium cartridge 100 will be described in detail.

When the recording medium cartridge 300 is inserted into the holder 8 of the recording medium drive device, the shutter opening piece 32d provided at the side 32 of the holder 8 is inserted into the insertion groove 305 of the recording medium cartridge 300 (FIG. 40). At this time, the unlocking projection piece 42 of the shutter spring 40 attached to the side 32 of the holder 8 is inserted into the insertion groove 305.

Into the insertion groove 305 is inserted, other than the shutter opening piece 32d, the posture holding piece 32e provided in the rear portion thereof.

When the recording medium cartridge 300 is inserted into the holder 8 of the recording medium drive device, in the same way as the case of the recording medium cartridge 100, the engagement projection 39b of the protrusion prevention spring 39 is temporarily inserted into the engagement recess 301j formed in the side 301b, but by the backward movement of the recording medium cartridge 300, the opening edge on the front side of the engagement recess 301j slidingly contacts the first inclined edge 39c of the engagement projection 39b, the spring 39a is deflected outward, and the engagement projection 39b is taken out of the engagement recess 301j.

In the state where the insertion of the recording medium cartridge 300 into the holder 8 in the recording medium drive device ends, in the same way as the case of the recording medium cartridge 100, the engagement projection 39b of the protrusion prevention spring 39 is inserted into the relief recess 301k formed in the side 301b.

At this time, simultaneously, the unlocking projection 42 of the shutter spring 40 is inserted into the escape groove 301l formed in the side 301c (FIG. 41). Accordingly, the biasing force of the shutter spring 40 is not imparted to the case 301 of the recording medium cartridge 300, and the occurrence of unrequited tension with respect to the recording medium cartridge 300 from the shutter spring 40 can be prevented.

When the insertion of the recording medium cartridge 300 into the holder 8 ends and the lid 5 of the outer housing 2 is closed, the recording medium 400 is mounted on the disk table 16. By the rotation of the disk table 16 and the drive of the optical pick-up 18, the recording or reproduction of the information signal with respect to the disk-shaped recording medium 400 is carried out.

Note that when the recording medium 400 is a magnetic recording medium, in place of the optical pick-up 18, the information is recorded on and reproduced from the recording medium 400 by a magnetic recording/reproducing unit.

When the recording or reproduction of the information signal with respect to the disk-shaped recording medium 300 ends and the lid 5 is opened again, the recording medium cartridge 300 is pressed by the inject lever and projected to the front side from the holder 8. At this time, by the forward movement of the recording medium cartridge 300, the protrusion prevention spring 39 is resiliently deformed and the engagement projection 39b is taken out of the relief recess 301k formed in the side 301b. Thereafter, when the engaged projection 39b is located facing the engagement recess 301j formed in the side 301b, the engagement projection 39b is engaged with the engagement recess 301j.

Simultaneously, by the forward movement of the recording medium cartridge 300, the shutter spring 40 is resiliently deformed and the unlocking projection 42 is taken out of the escape groove 301l formed in the side 301c.

The user can grip the portion of the recording medium cartridge 300 projecting from the holder 8 and pull it to take out the recording medium cartridge 300 from the holder 8.

As described above, in the electronic apparatus 1 of the present embodiment, other than the recording medium cartridge 100 having the shutter 110, a recording medium cartridge 300 not having a shutter can be used, and improvement of handling by the user can be achieved.

Note that, in the recording medium cartridge 300, as described above, the inclined portion 301m displaced to the upper shell 302 side as it approaches the light transparent hole 301h is formed at the opening edge of the light transparent hole 301h. Accordingly, at the time of the insertion and the time of ejection of the recording medium cartridge 300 with respect to the holder 8, even in a case where the recording medium cartridge 300 moves upward or downward or is inclined with respect to the holder 8 due to the difference between the thickness of the recording medium cartridge 300 and the vertical height of the internal space of the holder 8, the end edge of the projection surface 34 of the holder 8 or, the protrusion stopper 43 slidingly contacts the inclined portion 301m (FIG. 42), and a smooth insertion operation and ejection operation of the recording medium cartridge 300 with respect to the holder 8 can be secured.

The specific shapes and structures of the portions shown in the best embodiments of the present invention are shown only as specific examples for working the present invention. The technical scope of the present invention must not be restrictedly interpreted by them.

For example, in the above embodiments, as the recording medium, a magneto-optic disk was mainly exemplified, but the recording medium of the present invention can also be applied to a magnetic recording medium such as a hard disk. In that case, the optical pick-up or other optical unit explained above is replaced by a magnetic unit.

The invention claimed is:

1. A disk cartridge drive apparatus, comprising:
a holder configured to receive a disk cartridge therein and to hold the same, the disk cartridge including
a disk,
a case configured to accommodate the disk, and including
an arc-shaped surface formed at an insertion direction side of the holder, and side surfaces continuing both ends of the arc-shaped surface and respectively formed as direct lines at the insertion direction,
a light transparent aperture formed contiguous with one side surface of the side surfaces and configured to input a laser beam,
an insertion groove formed between the arc-shaped surface and a portion at an ejection direction side of the light transparent aperture in the one side surface, and
a function expansion groove formed between the arc-shaped surface and a continuous portion of the arc-shaped surface and another side surface; and
a shutter opening piece provided at a position opposed to the one side surface of the disk cartridge, in the holder,
wherein when the disk cartridge is inserted into the holder, if the shutter opening piece is inserted into the insertion groove, the shutter opening piece is moved to a portion of the ejection direction side of the insertion groove, and if the shutter opening piece is inserted into the function expansion groove, the shutter opening piece is contacted with an aperture edge of the function expansion groove formed at the continuous portion to thereby prevent the insertion of the disk cartridge into the holder.

2. The disk cartridge drive apparatus as set forth in claim 1, further comprising a posture holding piece provided at an insertion direction side of the shutter opening piece of the holder, and configured to hold a posture of the disk cartridge in the holder when the posture holding piece is inserted into the insertion groove.

3. The disk cartridge drive apparatus as set forth in claim 1, wherein the holder inserts a disk cartridge with a shutter, said disk cartridge having the disk, the case configured to accommodate the disk, and including the arc-shaped surface formed at the insertion direction side of the holder, and side surfaces continuing both ends of the arc-shaped surface and respectively formed as the direct lines at the insertion direction, the light transparent aperture formed contiguous with the one side surface of the side surface and configured to input a laser beam, the shutter slidably mounted on the one side surface and opening or closing the light transparent aperture, the insertion groove formed between the arc-shaped surface and the portion at the ejection direction side of the light transparent aperture in the one side surface, and the function expansion groove formed between the arc-shaped surface and the continuous portion of the arc-shaped surface and another side surface.

4. A disk cartridge drive apparatus, comprising:
a holder configured to receive and hold a disk cartridge having a disk, a case configured to accommodate the disk, and including an arc-shaped surface formed at an insertion direction side of the holder, and side surfaces continuing both ends of the arc-shaped surface and respectively formed as direct lines at the insertion direction, a light transparent aperture formed contiguous with one side surface of the side surfaces and configured to input a laser beam, an insertion groove formed between the arc-shaped surface and a portion at an ejection direction side of the light transparent aperture in the one side surface, and a function expansion groove formed between the arc-shaped surface and a continuous portion of the arc-shaped surface and another side surface;
a shutter opening piece provided at a position opposed to the side surface of the disk cartridge; and
a recording/reproducing means for executing a recording a data to, and/or, a reproducing a data from the disk accommodated in the disk cartridge held in the holder,
wherein when the disk cartridge is inserted into the holder, if the shutter opening piece is inserted into the insertion groove, the shutter opening piece is moved to a portion of the ejection direction side of the insertion groove, and if the shutter opening piece is inserted into the function expansion groove, the shutter opening piece is contacted with an aperture edge of the function expansion groove formed at the continuous portion to thereby prevent the insertion of the disk cartridge into the holder.

5. The disk cartridge drive apparatus as set forth in claim 4, further comprising a disk table mounting the disk,
wherein when the disk cartridge is inserted into the holder, if the shutter opening piece is inserted into the insertion groove, the shutter opening piece is moved to a portion of the ejection direction side of the insertion groove to mount the disk on the disk table, and if the shutter opening piece is inserted into the function expansion groove, the shutter opening piece is contacted with an aperture edge of the function expansion groove formed at the continuous portion to thereby prevent the insertion of the disk cartridge into the holder.

6. A recording medium drive device which can be loaded with a recording medium cartridge rotatably accommodating a disk-shaped recording medium therein, wherein
said recording medium cartridge has, in planar shape, a semi-circular portion and a substantially rectangular portion contiguous with the semi-circular portion,
said semi-circular portion has a first arc surface following along the planar shape of said disk-shaped recording medium and accommodates substantially half of said recording medium,
said substantially rectangular portion has parallel sides contiguous with ends of said semi-circular portion and a second arc surface connecting the two ends of the sides and having a larger curvature than said first arc surface,
a function expansion groove is provided at said arc surface of said semi-circular portion in the vicinity of at least one side of said substantially rectangular portion,
an opening for recording information from the recording medium drive device onto said recording medium or reading information recorded on said recording medium is provided in said semi-circular portion or said substantially rectangular portion,
said recording medium drive device comprises:
a chassis;
a holder which is provided so that it can be opened or closed using one end of the chassis as a pivot and enables insertion or ejection of said recording medium cartridge with respect to said chassis when in the open state;

recording/reading means for recording information onto said recording medium or for reading information from said recording medium via said opening of said recording medium cartridge when said recording medium cartridge is inserted into said holder; and a projection engaging with said function expansion groove provided at said arc surface of said recording medium cartridge to prevent erroneous insertion of said recording medium cartridge when said recording medium cartridge is inserted into said holder in a backward direction.

7. An electronic apparatus provided with a recording medium drive device which can be loaded with a recording medium cartridge rotatably accommodating a disk-shaped recording medium therein, wherein said electronic apparatus comprising:

a main body; and an outer housing configured to be freely opened or closed with respect to said main body, wherein said recording medium drive device is accommodated in a recess of said main body, said disk-shaped recording medium includes a chassis, a holder configured to be opened or closed using one end of the chassis as a pivot and to enable insertion or ejection of said recording medium cartridge when it is opened with respect to said chassis, and recording/reading means for recording information onto said recording medium or for reading information from said recording medium via said opening of said recording medium cartridge when said recording medium cartridge is inserted into said holder, wherein said holder of said disk-shaped recording medium accommodated in said recess is configured to be opened with respect to said chassis in response to the opening/closing of said outer housing and to enable insertion of said recording medium cartridge into said holder or ejection of the recording medium cartridge from said holder, said recording medium cartridge includes, in planar shape, a semi-circular portion and an substantially rectangular portion contiguous with the semi-circular portion, said semi-circular portion has a first arc surface following along the planar shape of said disk-shaped recording medium and accommodates substantially half of said recording medium, said substantially rectangular portion has parallel sides contiguous with ends of said semi-circular portion and a second arc surface connecting the two ends of the sides and having a larger curvature than said arc surface, a function expansion groove is provided in the vicinity of at least one said side of said substantially rectangular portion of said arc surface of said semi-circular portion, an opening for recording information from the recording medium drive device onto said recording medium or reading information recorded on said recording medium is provided in said semi-circular portion or said substantially rectangular portion, and provision is further made of a projection engaged with said function expansion groove provided in said arc surface of said recording medium cartridge and suppressing erroneous insertion of said recording medium cartridge when said recording medium cartridge is inserted into said holder upside down.

8. A recording medium drive device able to be loaded with a recording medium cartridge including a case on which is slidably supported a shutter for opening or closing an opening for recording information onto a disk-shaped recording medium or reading information recorded on said recording medium, in which is formed a function expansion groove, and in which said recording medium is accommodated, said recording medium drive device comprising:

a holder configured to hold said recording medium cartridge when said recording medium cartridge is inserted; and a shutter opening piece provided in said holder configured to slide said shutter supported upon the case of said recording medium cartridge to open said opening when said recording medium cartridge is normally inserted into said holder and to strike the opening edge of said function expansion groove of said case of said recording medium cartridge when said recording medium cartridge is inserted into said holder in an erroneous direction preventing erroneous insertion of said recording medium cartridge into said holder.

9. A recording medium cartridges, comprising:

a flat case in which a disk-shaped recording medium is rotatably accommodated and is used mounted on a holder of a recording medium drive device provided with the holder having a shutter opening piece (32d), wherein a surface on an insertion direction side of said case to said holder of said recording medium drive device is formed as a substantially arc surface of an arc state having a center angle of substantially 180°, two surfaces contiguous with two ends of said arc surface are formed as straight sides, said arc surface of said case is formed with a function expansion groove for expanding a function as a recording medium cartridge, said case is formed with an opening for establishing a signal path for recording information onto said disk-shaped recording medium or reading information recorded on said recording medium at a position nearer one side, an opening edge of an eject direction side of the function expansion groove opposite to said insertion direction is located at a connecting portion of an other side located opposite to the one side and the arc surface, and when said recording medium cartridge is inserted into said holder of said recording medium drive device in an erroneous direction, the opening edge of said function expansion groove of said case contacts the shutter opening piece of the recording medium drive device to prevent erroneous insertion into the holder.

10. A recording medium cartridge rotatably accommodating a disk-shaped recording medium and used loaded in a recording medium drive device, said recording medium cartridge comprising:

in its planar shape, a semi-circular portion and a substantially rectangular portion contiguous with the semi-circular portion, wherein said semi-circular portion has a first arc surface following along the planar shape of said disk-shaped recording medium and accommodates substantially half of said recording medium, said substantially rectangular portion has parallel sides contiguous with ends of said semi-circular portion and a second arc surface connecting the two ends of said sides and having a larger curvature than said first arc surface, a function expansion groove is provided in the arc surface of said semi-circular portion in the vicinity of at least one side of said substantially rectangular portion, an opening for recording information from said recording medium drive device onto said recording medium or reading information recorded on said recording medium is provided in said semi-circular portion or said substantially rectangular portion, and when said recording medium cartridge is inserted into said holder in an upside-down direction, a projection provided on said holder is engaged with said function expansion groove provided in said arc surface of said recording medium cartridge to prevent the erroneous insertion of said recording medium cartridge.

* * * * *